US012205227B2

(12) United States Patent
Katsuki et al.

(10) Patent No.: US 12,205,227 B2
(45) Date of Patent: Jan. 21, 2025

(54) SURGICAL IMAGE DISPLAY SYSTEM, IMAGE PROCESSING DEVICE, AND IMAGE PROCESSING METHOD

(71) Applicant: SONY GROUP CORPORATION, Tokyo (JP)

(72) Inventors: Shinji Katsuki, Tokyo (JP); Masahiro Take, Tokyo (JP); Motoaki Kobayashi, Tokyo (JP); Takuya Nakamura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 389 days.

(21) Appl. No.: 17/631,568

(22) PCT Filed: Jul. 27, 2020

(86) PCT No.: PCT/JP2020/028636
§ 371 (c)(1),
(2) Date: Jan. 31, 2022

(87) PCT Pub. No.: WO2021/024827
PCT Pub. Date: Feb. 11, 2021

(65) Prior Publication Data
US 2022/0277522 A1    Sep. 1, 2022

(30) Foreign Application Priority Data
Aug. 8, 2019   (JP) .................................. 2019-146399

(51) Int. Cl.
*G06T 7/00*        (2017.01)
*G06T 5/50*        (2006.01)
(Continued)

(52) U.S. Cl.
CPC ............ *G06T 19/00* (2013.01); *H04N 13/128* (2018.05); *H04N 13/239* (2018.05); *H04N 13/344* (2018.05)

(58) Field of Classification Search
CPC ..... G06T 19/00; H04N 13/128; H04N 13/344; H04N 13/239
See application file for complete search history.

(56) References Cited

U.S. PATENT DOCUMENTS 6,016,439 A * 1/2000 Acker ..................... A61B 90/36
                                                 600/414
8,116,557 B2 * 2/2012 Ha ........................ H04N 13/144
                                                 382/154
(Continued)

FOREIGN PATENT DOCUMENTS

CN      107077002 A    8/2017
EP      3211471 A1     8/2017
(Continued)

OTHER PUBLICATIONS

International Search Report and Written Opinion of PCT Application No. PCT/JP2020/028636, issued on Oct. 13, 2020, 09 pages of ISRWO.

*Primary Examiner* — Gregory M Desire
(74) *Attorney, Agent, or Firm* — CHIP LAW GROUP

(57) ABSTRACT

The present technology is a surgical image display system, an image processing device, and an image processing method that enable to assist grasping of a distance in a depth direction in a space in which a stereoscopic image is reproduced when a three-dimensional image is stereoscopically viewed. An image of an observation region is shot from two different viewpoints, and a three-dimensional image that reproduces a stereoscopic image of the observation region is acquired. There is generated an output image that outputs the acquired three-dimensional image and depth distortion (Continued)

information that represents magnitude of distortion in a depth direction in a stereoscopic image space in which a stereoscopic image of the observation region is reproduced by stereoscopically viewing the three-dimensional image. The present technology can be applied to an operative field camera system for medical facilities that shoots an image of a field of view (operative field) of a surgical site.

17 Claims, 44 Drawing Sheets

(51) Int. Cl.
  *G06T 19/00* (2011.01)
  *G06V 10/20* (2022.01)
  *G06V 10/25* (2022.01)
  *H04N 13/128* (2018.01)
  *H04N 13/239* (2018.01)
  *H04N 13/344* (2018.01)

(56) References Cited

U.S. PATENT DOCUMENTS

| | | | | |
|---|---|---|---|---|
| 8,784,301 | B2* | 7/2014 | McDowall | H04N 13/243 600/129 |
| 9,288,476 | B2* | 3/2016 | Sandrew | H04N 13/271 |
| 9,398,289 | B2* | 7/2016 | Lee | H04N 13/261 |
| 9,460,548 | B2* | 10/2016 | Kim | G06T 15/08 |
| 9,549,163 | B2* | 1/2017 | D'Amato | H04N 13/161 |
| 9,800,864 | B2* | 10/2017 | Aronsson | H04N 13/383 |
| 11,207,139 | B2* | 12/2021 | Piron | A61B 5/742 |
| 11,351,006 | B2* | 6/2022 | Aferzon | A61B 90/37 |
| 11,617,492 | B2* | 4/2023 | Refai | G06T 7/33 600/424 |
| 2015/0292871 | A1* | 10/2015 | Kaneko | G01B 11/22 348/135 |
| 2017/0255021 | A1 | 9/2017 | Oto | |

FOREIGN PATENT DOCUMENTS

| | | |
|---|---|---|
| JP | 2005-026756 A | 1/2005 |
| JP | 2014-027391 A | 2/2014 |
| JP | 2014-236340 A | 12/2014 |
| JP | 2018-029980 A | 3/2018 |
| JP | 2018-152789 A | 9/2018 |
| JP | 2018-161377 A | 10/2018 |
| WO | 2016/063620 A1 | 4/2016 |

* cited by examiner

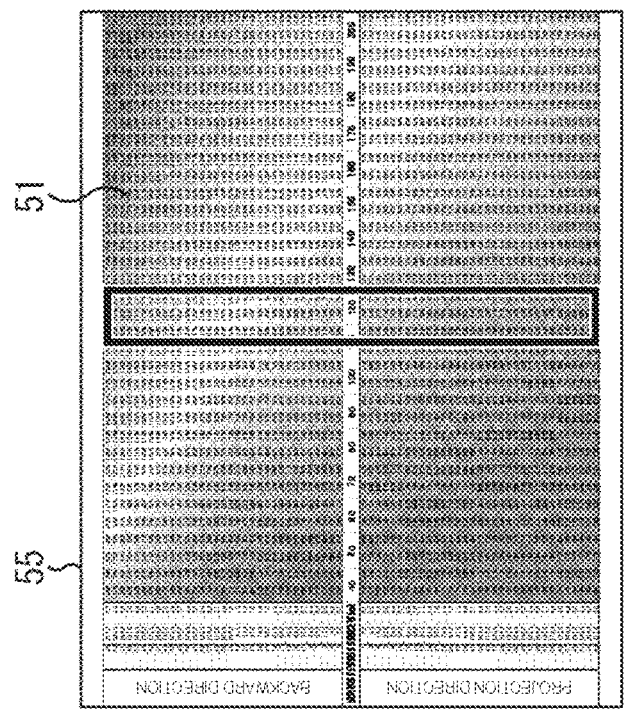
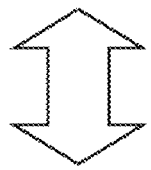
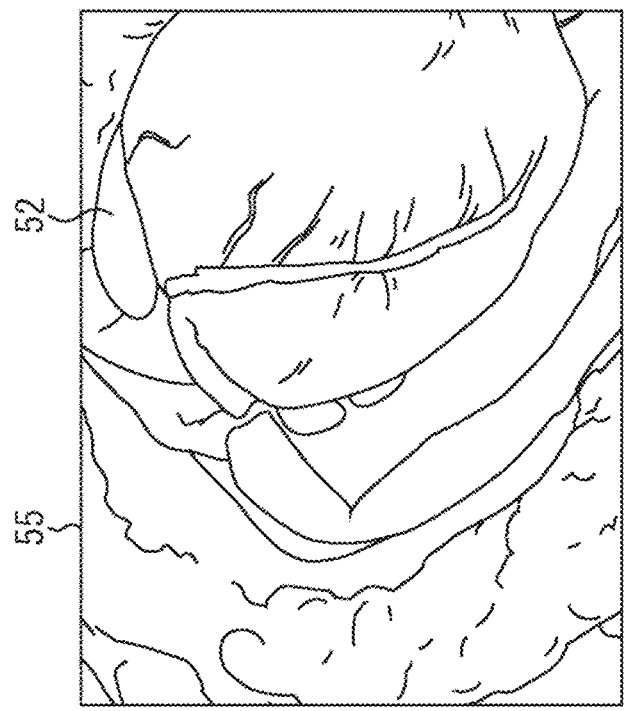
FIG. 5

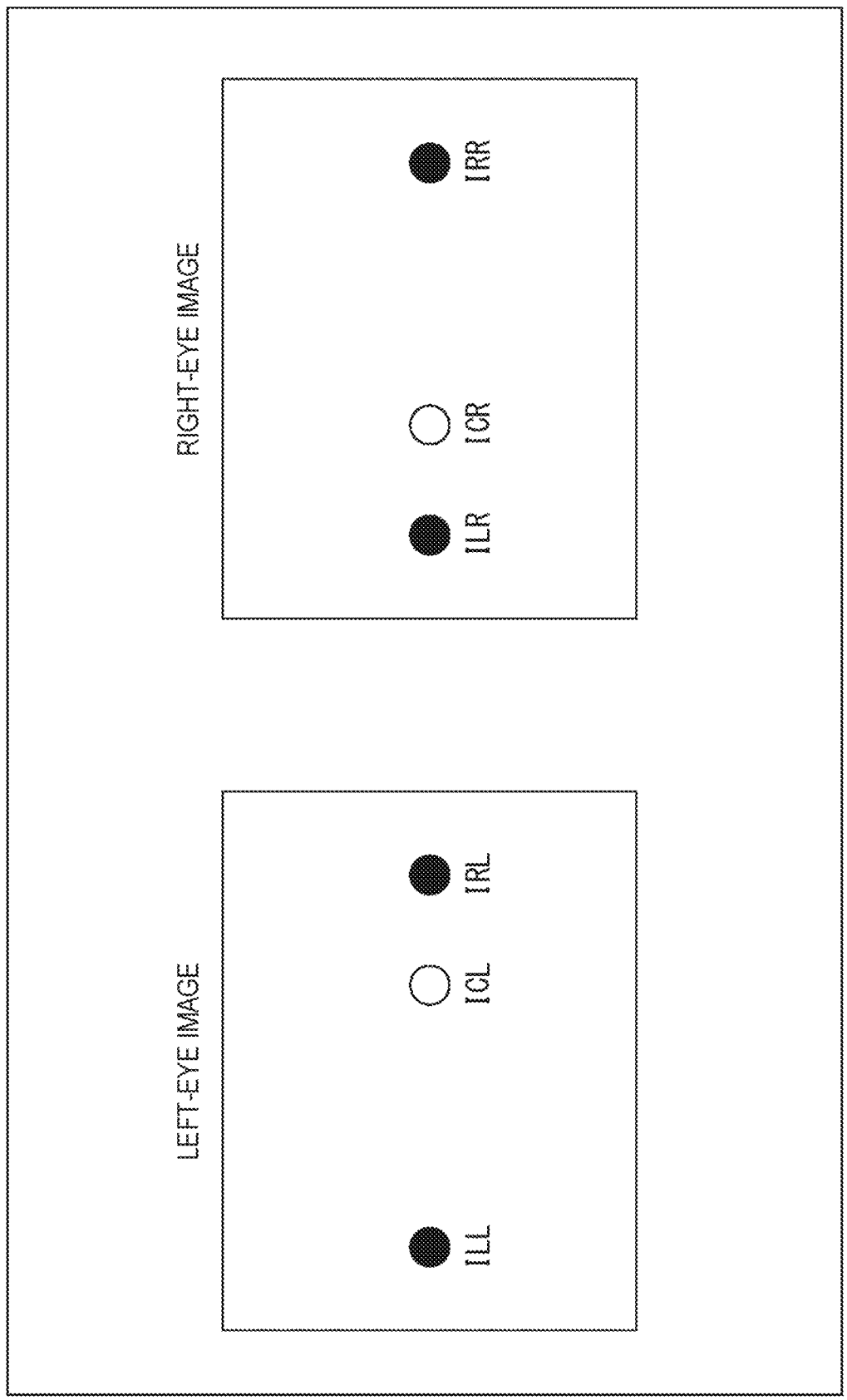

IMAGE SHOOTING EQUIVALENT VIEW

VIEWING DISTANCE CHANGED

ENLARGED (BY A TIMES)

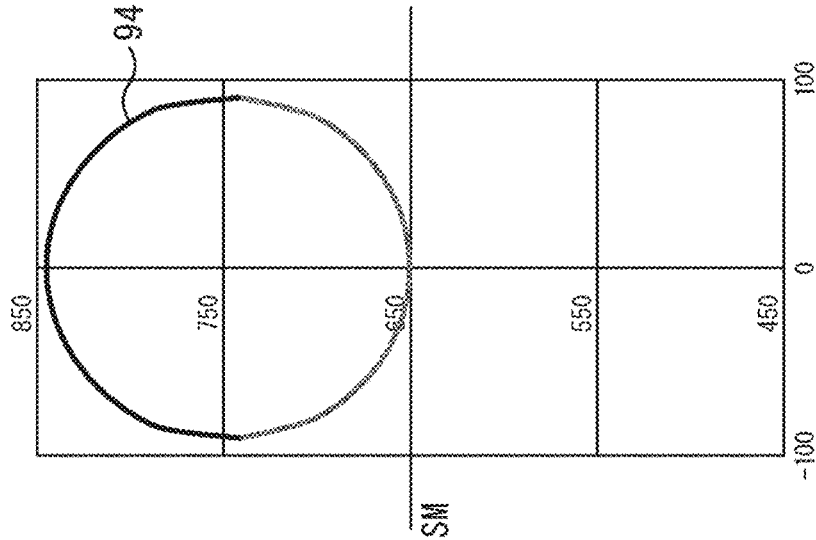
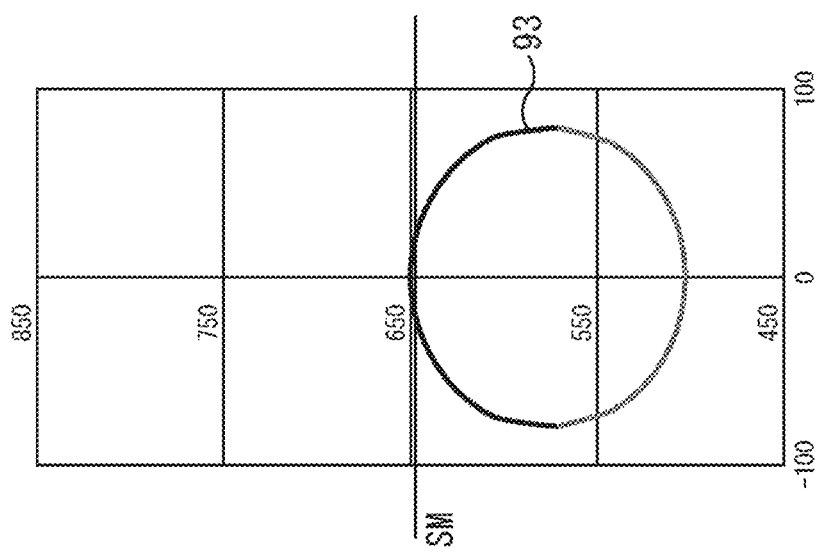

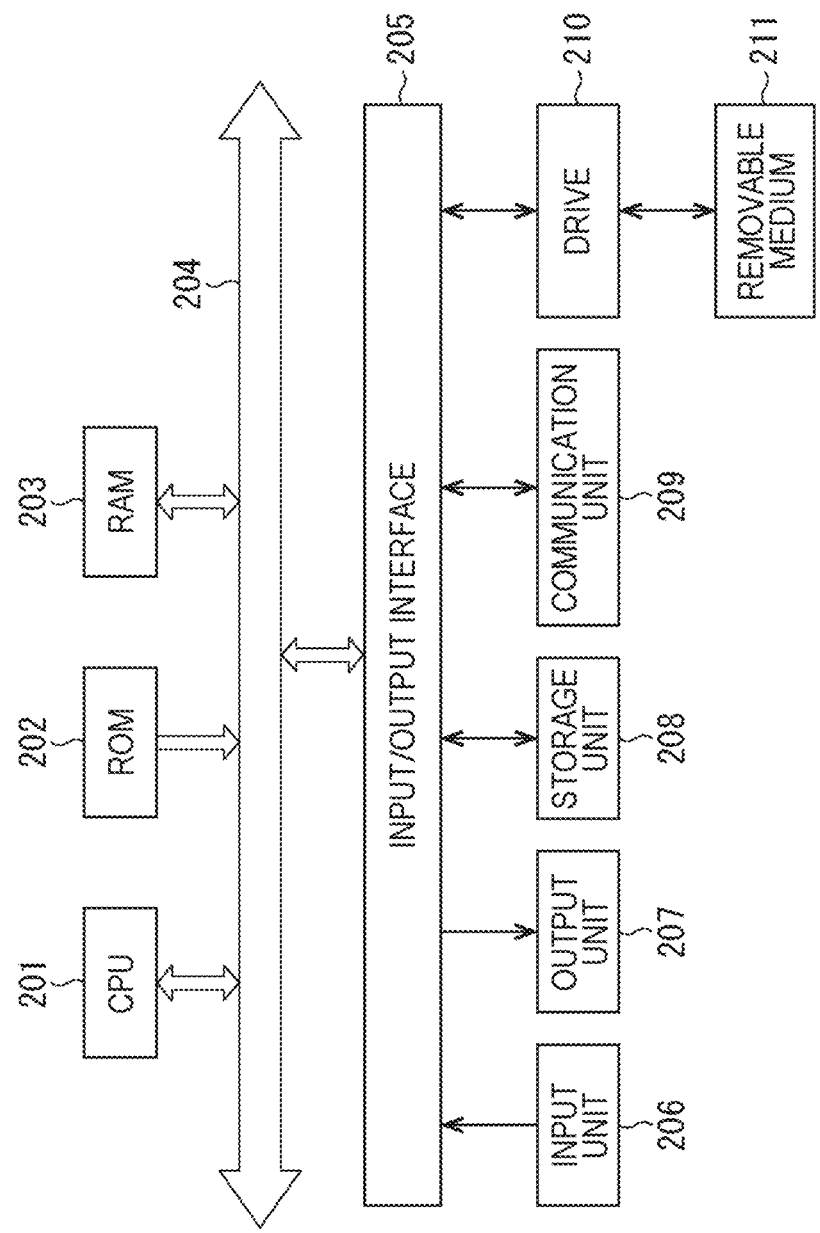

SURGICAL IMAGE DISPLAY SYSTEM, IMAGE PROCESSING DEVICE, AND IMAGE PROCESSING METHOD

CROSS REFERENCE TO RELATED APPLICATIONS

This application is a U.S. National Phase of International Patent Application No. PCT/JP2020/028636 filed on Jul. 27, 2020, which claims priority benefit of Japanese Patent Application No. JP 2019-146399 filed in the Japan Patent Office on Aug. 8, 2019. Each of the above-referenced applications is hereby incorporated herein by reference in its entirety.

TECHNICAL FIELD

The present technology relates to a surgical image display system, an image processing device, and an image processing method, and, in particular to a surgical image display system, an image processing device, and an image processing method that display a three-dimensional image of an observation region stereoscopically viewable.

BACKGROUND ART

Patent Documents 1 and 2 describe a technique in which a trocar is inserted into an abdominal wall, a laparoscope is inserted into a hole of the trocar, and an observation image of an abdominal cavity shot by the laparoscope is displayed on a monitor. Furthermore, Patent Document 1 describes displaying on a monitor an observation image as a three-dimensional image.

Patent Document 3 describes stereoscopically displaying volume data obtained by a CT device or the like.

CITATION LIST

Patent Document

Patent Document 1: Japanese Patent Application Laid-Open No. 2018-161377
Patent Document 2: Japanese Patent Application Laid-Open No. 2018-29980
Patent Document 3: Japanese Patent Application Laid-Open No. 2014-236340

SUMMARY OF THE INVENTION

Problems to be Solved by the Invention

When an observer stereoscopically views a three-dimensional image, there is distortion in a depth direction in a space in which a stereoscopic image is reproduced, and therefore it may be difficult to grasp distance in the depth direction.

The present technology has been developed in view of such a situation, and in particular, an object thereof is to enable to assist grasping of a distance in a depth direction in a space in which a stereoscopic image is reproduced when a three-dimensional image is stereoscopically viewed.

Solutions to Problems

A surgical image display system according to a first aspect of the present technology is a surgical image display system including an image shooting unit that shoots an image of a living body from two viewpoints, and acquires a three-dimensional image that reproduces a stereoscopic image of an observation region shot from the two viewpoints, and an output image generation unit that generates an output image that presents the three-dimensional image acquired from the image shooting unit and depth distortion information that represents magnitude of depth distortion in a depth direction of a stereoscopic image space in which a stereoscopic image of the observation region is reproduced by stereoscopically viewing the three-dimensional image.

In the surgical image display system according to the first aspect of the present technology, an image of a living body is shot from two different viewpoints, and a three-dimensional image that reproduces a stereoscopic image of an observation region of which image is shot from the two different viewpoints is acquired. Then, there is generated an output image that outputs the acquired three-dimensional image and depth distortion information that represents magnitude of distortion in a depth direction in a stereoscopic image space in which a stereoscopic image of the observation region is reproduced by stereoscopically viewing the three-dimensional image.

An image processing device according to a second aspect of the present technology is an image processing device including an output image generation unit that generates an output image presenting a three-dimensional image obtained by shooting an image of a surgical point from two different viewpoints, and information indicating magnitude of difference between a stereoscopic image in the three-dimensional image and a depth direction in a physical three-dimensional space of the surgical point.

In the image processing device according to the second aspect of the present technology, there is generated an output image presenting a three-dimensional image obtained by shooting an image of a surgical point from two different viewpoints, and information indicating magnitude of difference between a stereoscopic image in the three-dimensional image and a depth direction in a physical three-dimensional space of the surgical point.

An image processing method according to a third aspect of the present technology is an image processing method in which an image processing device includes an output image generation unit, and the output image generation unit generates a three-dimensional image that is a three-dimensional image obtained by shooting an image of a living body from two different viewpoints and that reproduces a stereoscopic image of an observation region shot from the two viewpoints, and an output image that presents depth distortion information representing magnitude of depth distortion in a depth direction of a stereoscopic image space in which the stereoscopic image of the observation region is reproduced by stereoscopically viewing the three-dimensional image.

In the image processing method according to the third aspect of the present technology, there is generated an output image that is a three-dimensional image obtained by shooting an image of a living body from two different viewpoints and that reproduces a stereoscopic image of an observation region shot from the two viewpoints, and an output image that presents depth distortion information representing magnitude of depth distortion in a depth direction of a stereoscopic image space in which the stereoscopic image of the observation region is reproduced by stereoscopically viewing the three-dimensional image.

BRIEF DESCRIPTION OF DRAWINGS

FIG. 5 is a diagram describing a form of an output image.

FIG. 7 is a diagram illustrating a right-eye image and a left-eye image obtained in FIG. 6 by an image shooting unit.

FIGS. 19A and 19B are diagrams illustrating the second form of the depth distortion information.

FIG. 44 is a block diagram illustrating a configuration example of hardware of a computer.

MODES FOR CARRYING OUT THE INVENTION

Hereinafter, embodiments of the present technology will be described with reference to the drawings.

<<First Embodiment of Surgical Image Display System>>

A surgical image display system to which the present technology is applied shoots an image of a living body from two different viewpoints, displays a three-dimensional image that reproduces a stereoscopic image of an observation region of which image is shot from the two viewpoints, and displays depth distortion information that assists grasping of a distance in a depth direction of a space (referred to as a stereoscopic image space) in which a stereoscopic image is reproduced when the three-dimensional image is stereoscopically viewed.

Figure 1:
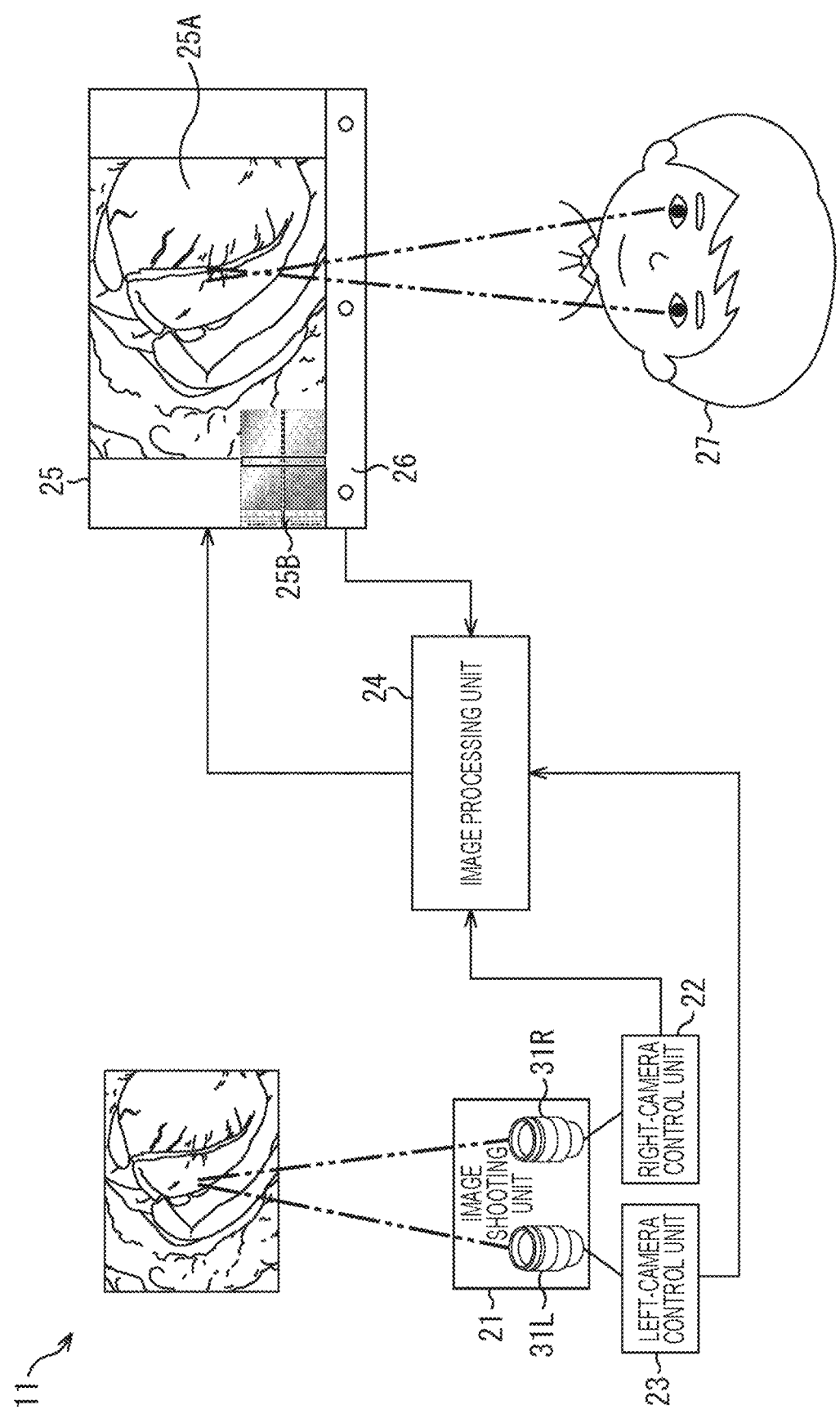
FIG. 1 is a block diagram illustrating a configuration example of a first embodiment of a surgical image display system to which the present technology is applied.

FIG. 1 is a block diagram illustrating a configuration example of a first embodiment of the surgical image display system to which the present technology is applied.

A surgical image display system 11 in FIG. 1 has an image shooting unit 21, a right-camera control unit 22, a left-camera control unit 23, an image processing unit 24, a three-dimensional display unit 25, and a viewpoint detection sensor 26.

The image shooting unit 21 includes a camera that shoots images of a living body from two different viewpoints, and for example, is installed in an operating room and shoots an image of an observation region, such as a region (surgical point) of a patient on which surgery is performed. Note that a space in which image shooting is performed by the image shooting unit 21 is referred to as an image shooting space.

Furthermore, the image shooting unit 21 has a right camera 31R and a left camera 31L for acquiring a right-eye image and a left-eye image constituting a three-dimensional image of the observation region.

The right camera 31R shoots an image of the observation region from a position of a right viewpoint of two right and left viewpoints in the image shooting space, and supplies the right-camera control unit 22 with a right-eye image obtained by image shooting.

The left camera 31L shoots an image of the observation region from a position of a left viewpoint of the two right and left viewpoints in the image shooting space, and supplies the left-camera control unit 23 with a left-eye image obtained by image shooting.

Note that the three-dimensional image (right-eye image and left-eye image) obtained in the image shooting unit 21 may be either a color image or a black-and-white image, or may be either a moving image or a still image.

The right-camera control unit 22 performs processing such as white balance, brightness adjustment, or color tone adjustment on the right-eye image from the right camera 31R, and supplies the image processing unit 24 with the right-eye image subjected to the processing.

The left-camera control unit 23 performs processing such as white balance, brightness adjustment, or color tone adjustment on the left-eye image from the left camera 31L, and supplies the image processing unit 24 with the left-eye image subjected to the processing.

With respect to the three-dimensional image of the observation region, the three-dimensional image including the right-eye image from the right-camera control unit 22 and the left-eye image from the left-camera control unit 23, the image processing unit 24 generates and supplies the three-dimensional display unit 25 with an output image on which depth distortion information, which will be described in detail later, is, for example, superimposed.

Furthermore, the image processing unit 24 generates depth distortion information on the basis of an image shooting condition regarding image shooting by the image shooting unit 21, and observation conditions regarding display of the three-dimensional image and an observer (a surgeon who performs surgery, or the like) who observes the three-dimensional image.

The three-dimensional display unit 25 displays the output image from the image processing unit 24. Of the right-eye image and left-eye image constituting the three-dimensional image, the three-dimensional display unit 25 causes a right eye of an observer 27 to visually recognize the right-eye image and causes a left eye of the observer 27 to visually recognize the left-eye image. As the three-dimensional display unit 25, a lenticular-lens type display or a head-mounted display (HMD) may be adopted, or a display of a type in which the observer wears polarized glasses or liquid-crystal shutter glasses may be adopted. On a display surface of the three-dimensional display unit 25 in FIG. 1, a three-dimensional image 25A of the observation region and depth distortion information 25B superimposed on the three-dimensional image 25A are exemplified.

The viewpoint detection sensor 26 is installed, for example, below the display surface (display panel) of the three-dimensional display unit 25, the display surface displaying an image, and detects positions of the right eye and left eye of the observer 27. The viewpoint detection sensor 26 supplies the image processing unit 24 with the detected positions of the right eye and left eye. The image processing unit 24 calculates, as observation conditions, a pupillary distance of the observer 27 and a viewing distance, which is distance from the eyes of the observer 27 to the display surface of the three-dimensional display unit 25, on the basis of the positions of the right eye and left eye from the viewpoint detection sensor 26.

<Configuration Example of Image Processing Unit 24>

Figure 2:
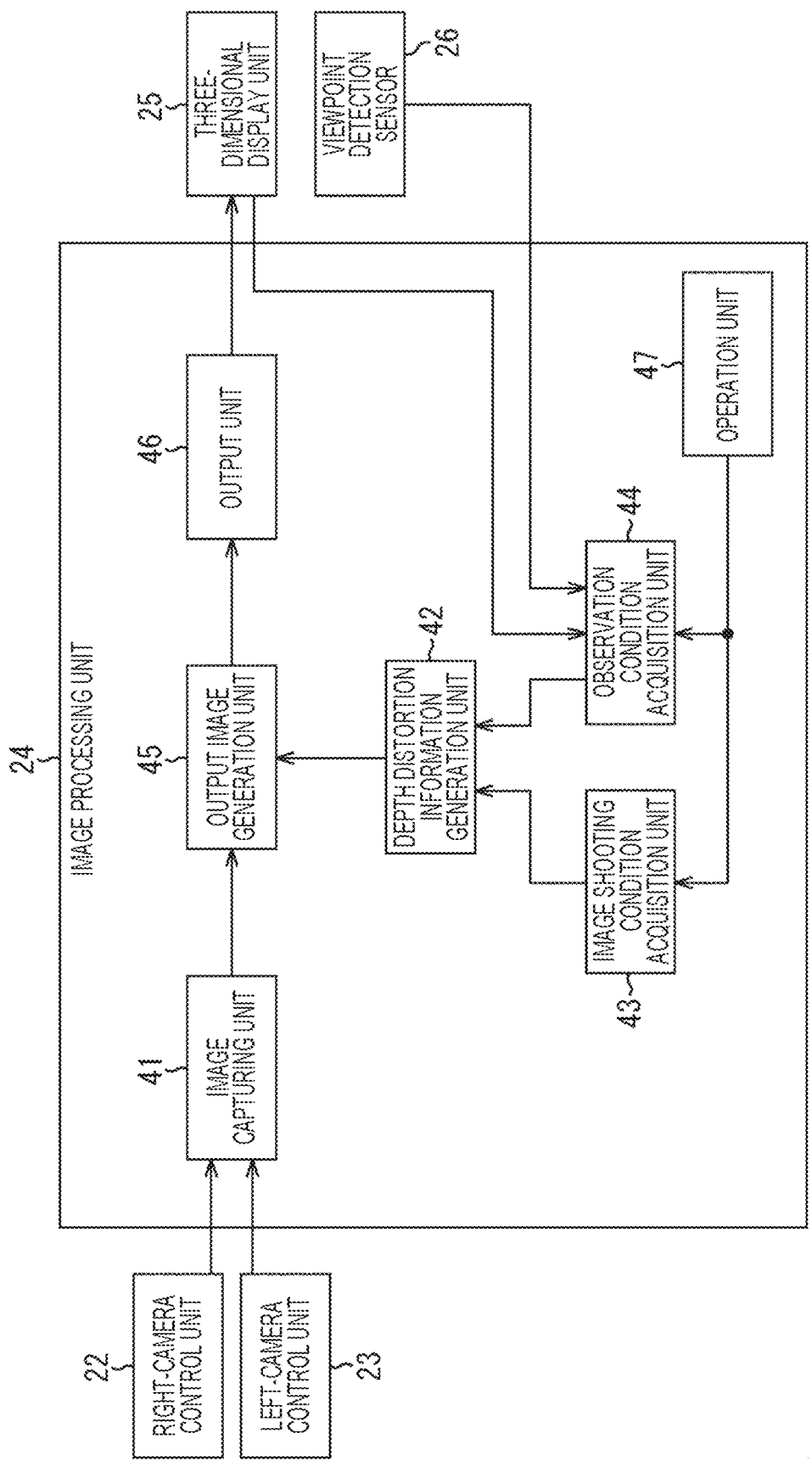
FIG. 2 is a block diagram illustrating a configuration example of an image processing unit.

FIG. 2 is a block diagram illustrating a configuration example of the image processing unit 24.

The image processing unit 24 has an image capturing unit 41, a depth distortion information generation unit 42, an image shooting condition acquisition unit 43, an observation condition acquisition unit 44, an output image generation unit 45, an output unit 46, and an operation unit 47.

The image capturing unit 41 captures the right-eye image and left-eye image from the right-camera control unit 22 and left-camera control unit 23 in FIG. 1, and stores one frame each of a latest right-eye image and latest left-eye image. The image capturing unit 41 supplies the output image generation unit 45 with the stored right-eye image and left-eye image at a constant cycle.

The depth distortion information generation unit 42 obtains magnitude of distortion (depth distortion) in the depth direction of the stereoscopic image space on the basis of image shooting conditions from the image shooting condition acquisition unit 43 and the observation conditions from the observation condition acquisition unit 44, and generates depth distortion information for displaying the obtained magnitude of the depth distortion on the three-dimensional display unit 25. Then, the depth distortion information generation unit 42 supplies the generated depth distortion information to the output image generation unit 45. Note that the depth distortion information is information indicating magnitude of difference between the stereoscopic image of the three-dimensional image of the observation region such as the surgical point, and a depth direction of a physical three-dimensional space of the observation region, and is not necessarily limited to information directly indicating magnitude of distortion in the depth direction.

The image shooting condition acquisition unit 43 acquires a base length, working distance, and image shooting range diagonal view angle size of the image shooting unit 21 as image shooting conditions, and supplies the image shooting conditions to the depth distortion information generation unit 42.

The base length of the image shooting unit 21 represents a distance between a viewpoint of the right camera 31R (a principal point of an optical system) and a viewpoint of the left camera 31L (a principal point of the optical system).

The working distance represents a distance from the right camera 31R and the left camera 31L to a reference plane, and corresponds to a distance to a focused position, because focus is usually drawn to a reference plane. Note that the reference plane represents a position of an object point in the image shooting space, the object point of which image being shot as image points that are at the same position between the right-eye image and the left-eye image.

The image shooting range diagonal view angle size represents a diagonal length of the image shooting range on the reference plane of the right camera 31R and the left camera 31L.

The information of the base length, the working distance, and the image shooting range diagonal view angle size is supplied from at least one of the image shooting unit 21, the right-camera control unit 22, or the left-camera control unit 23. In this regard, information of some or all of the base length, the working distance, and the image shooting range diagonal view angle size may be input by a user operating the operation unit 47 and given from the operation unit 47 to the image shooting condition acquisition unit 43.

Furthermore, instead of acquiring the image shooting range diagonal view angle size, the image shooting condition acquisition unit 43 may acquire focal lengths of the right camera 31R and left camera 31L and a diagonal size of an imaging surface of an image sensor, and calculate the image shooting range diagonal view angle size on the basis of the focal length, the diagonal size, and the working distance.

The observation condition acquisition unit 44 acquires a diagonal screen size of the three-dimensional display unit 25 from the three-dimensional display unit 25 as an observation condition, and supplies the diagonal screen size to the depth distortion information generation unit 42. Note that in a case where the three-dimensional image is displayed on a partial region with respect to the screen of the three-dimensional display unit 25, the diagonal screen size indicates a diagonal length of the region where the three-dimensional image is displayed.

Furthermore, the observation condition acquisition unit 44 acquires, as observation conditions, the pupillary distance of the observer 27 who is stereoscopically viewing the three-dimensional image of the three-dimensional display unit 25 and the viewing distance that is a distance from the eyes of the observer 27 to the display surface of the three-dimensional display unit 25, on the basis of the positions of the right eye and left eye of the observer 27, the positions being detected by the viewpoint detection sensor 26. Then, the observation condition acquisition unit 44 supplies the acquired pupillary distance and viewing distance to the depth distortion information generation unit 42.

In this regard, the viewpoint detection sensor 26 is not necessarily needed to be provided, and the information of the pupillary distance and viewing distance may be input by the user by user operation of the operation unit 47 and may be given to the observation condition acquisition unit 44.

Furthermore, the diagonal screen size of the three-dimensional display unit 25 may also be input by the user by user operation of the operation unit 47 and may be given to the observation condition acquisition unit 44.

The output image generation unit 45 generates an output image that presents the three-dimensional image (right-eye image and left-eye image) from the image capturing unit 41 and the depth distortion information from the depth distortion information generation unit 42, and supplies the output image to the output unit 46.

Figure 3:
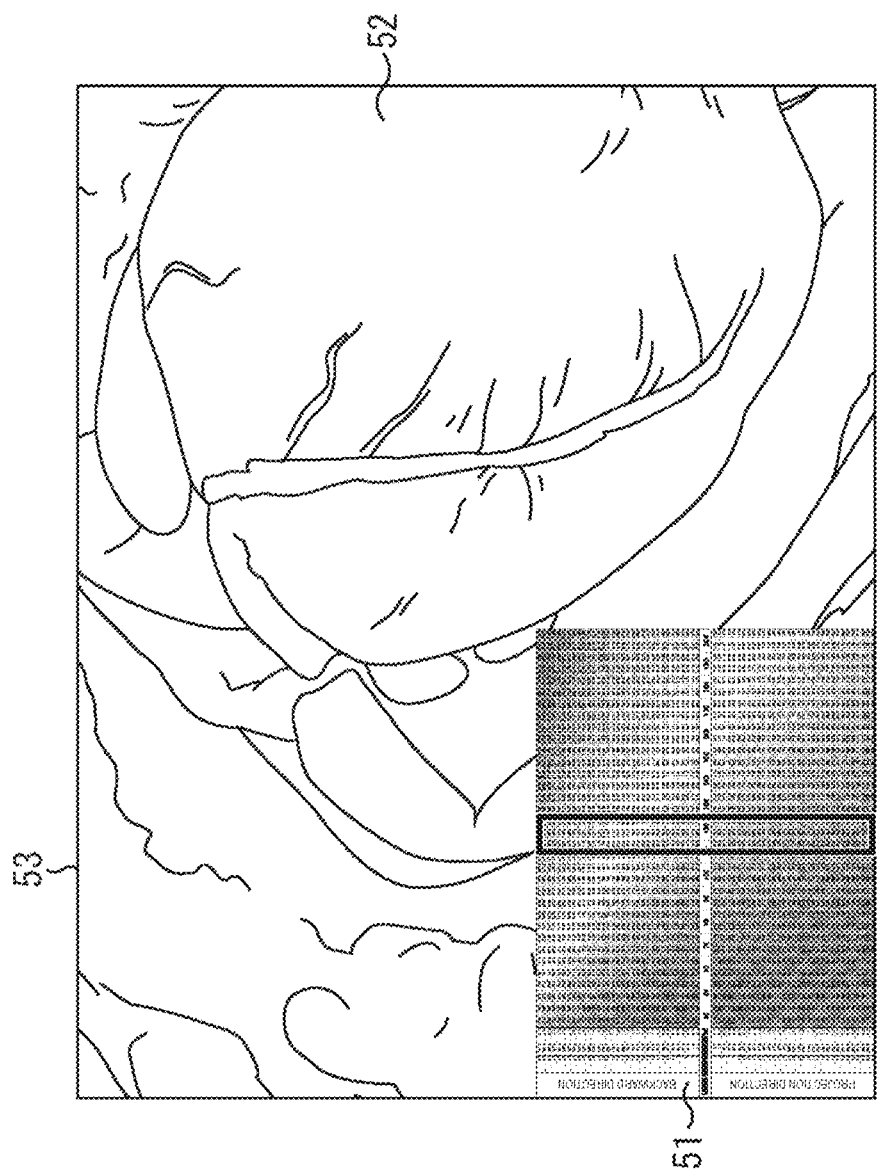
FIG. 3 is a diagram describing a form of an output image.
Figure 4:
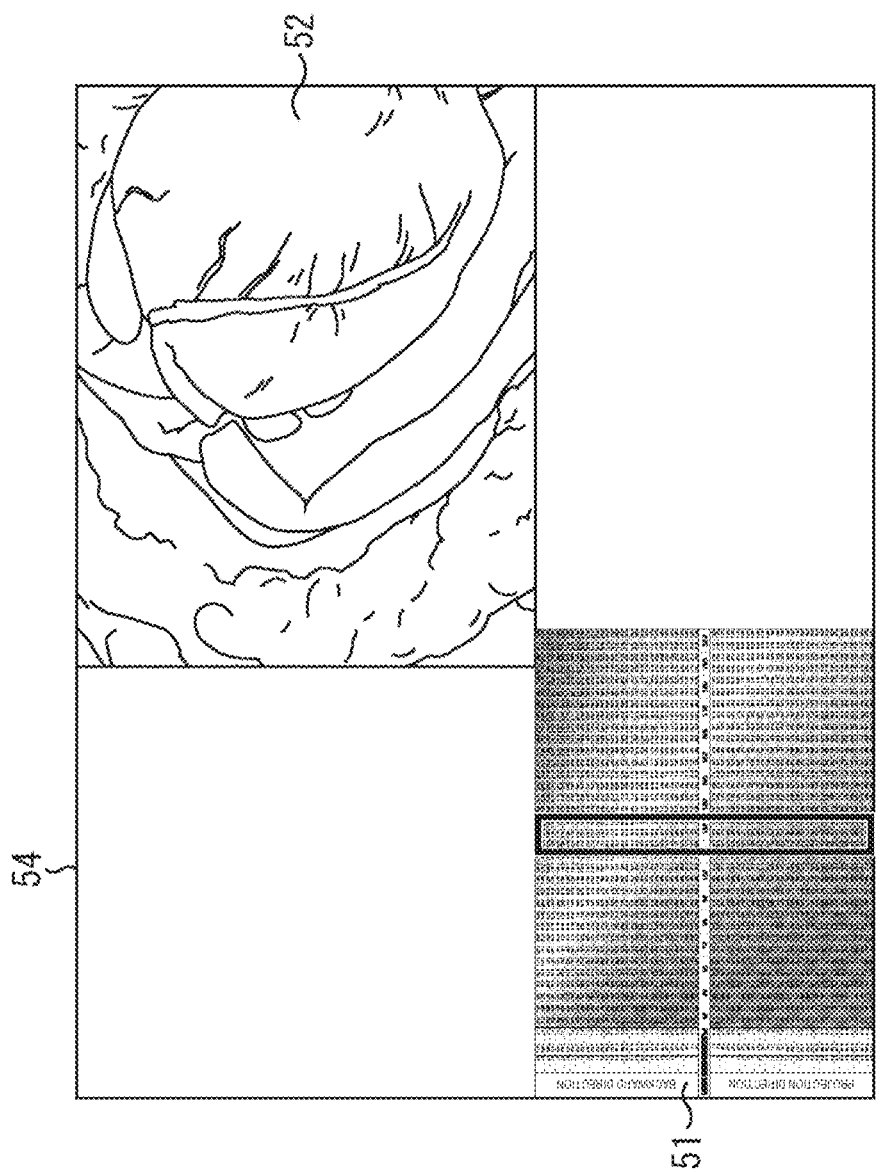
FIG. 4 is a diagram describing a form of an output image.

Specifically, the output image generation unit 45 generates an output image 53 in FIG. 3, an output image 54 in FIG. 4, or an output image 55 in FIG. 5. The output image 53 in FIG. 3 indicates an image in which depth distortion information 51 is superimposed on a partial region of the three-dimensional image 52. Note that, as the output image 53 in which the depth distortion information 51 is superimposed on a partial region of the three-dimensional image 52, not only a case where an entire region of the image representing the depth distortion information 51 is superimposed on the three-dimensional image, but also a case where a partial region of the image representing the depth distortion information 51 is superimposed on the three-dimensional image is included.

The output image 54 in FIG. 4 indicates an image in which the three-dimensional image 52 and the depth distortion information 51 are disposed in individual regions. The output image 55 in FIG. 5 indicates either the three-dimensional image 52 or the depth distortion information 51, whichever is selected by, for example, the user operating the operation unit 47. That is, the form in FIG. 5 can switch between the output image 55 including only the three-dimensional image 52 and the output image 55 including only the depth distortion information 51.

The output image generation unit 45 may generate an output image in any one of the forms of the output images 53, 54, and 55, or may generate an output image in any two or all of the forms from among the output images 53, 54, and 55 whichever is selected by, for example, the user operating the operation unit 47.

In this regard, in the following description, it is assumed that the output image generation unit 45 generates an output image in which depth distortion information is superimposed on a three-dimensional image as in the output image 53 in FIG. 3.

The output unit 46 converts the right-eye image and left-eye image from the output image generation unit 45 into image signals in a signal format to display the right-eye image and left-eye image on the three-dimensional display unit 25, and supplies the image signals to the three-dimensional display unit 25.

<Depth Distortion Information>

Next, depth distortion information generated in the depth distortion information generation unit 42 will be described. First, depth distortion will be described in detail.

<Depth Distortion in Front of Display Surface>

Figure 6:
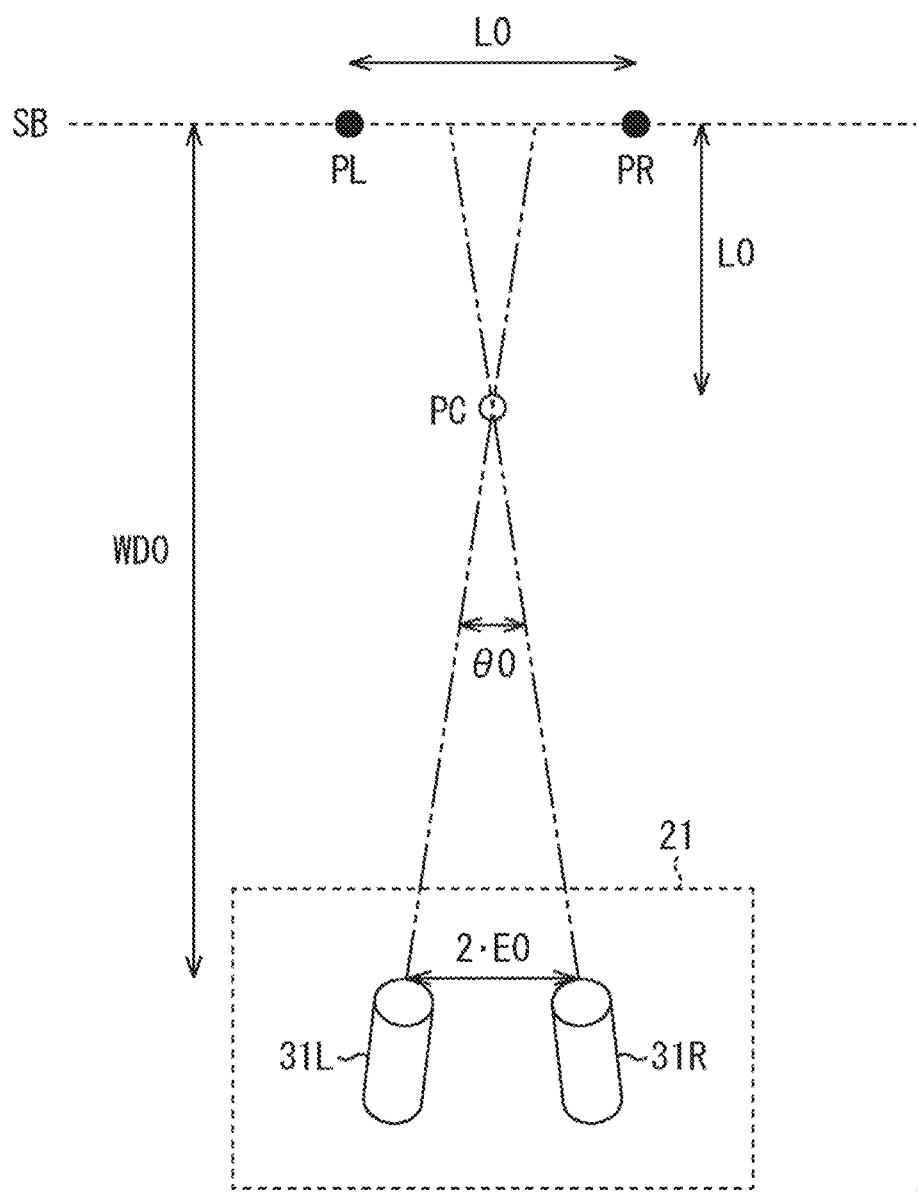
FIG. 6 is a diagram illustrating an image shooting space viewed from above.

FIG. 6 is a diagram illustrating an image shooting space viewed from above in which the image shooting unit 21 in FIG. 1 is disposed. Note that a direction perpendicular to a plane including an optical axis of the right camera 31R in the image shooting unit 21 and an optical axis of the left camera 31L in the image shooting unit 21 is defined as a vertical direction.

In FIG. 6, a reference plane SB represents a position of an object point of which image shot as image points that are at the same position between the right-eye image and the left-eye image. The reference plane SB is also a plane on which the image shooting unit 21 is focused.

A working distance WD0 represents a distance from the image shooting unit 21 to the reference plane SB, and more specifically, represents a distance from the right camera 31R and the left camera 31L (principal points of the optical system) to the reference plane SB.

A base length $2 \cdot E0$ represents a distance between the viewpoint of the right camera 31R (a principal point of the optical system) and the viewpoint of the left camera 31L (a principal point of the optical system).

Object points PR and PL represent object points that are on the reference plane SB and have an interval of a distance L0.

An object point PC is a point that projects to a front side of the reference plane SB (a side close to the image shooting unit 21), and represents a point at which a distance to the reference plane SB is L0. Furthermore, the object point PC is a point corresponding to a vertex of an isosceles triangle having a height L0 with a line segment connecting the object points PR and PL as a base.

An inward angle $\theta 0$ is an angle at which a line of sight from the viewpoint of the right camera 31R toward the object point PC intersects a line of sight from the viewpoint of the left camera 31L toward the object point PC.

It is assumed that object points PR, PL, and PC are shot by the right camera 31R and the left camera 31L under the image shooting condition, and a three-dimensional image including the right-eye image and the left-eye image is acquired.

FIG. 7 exemplifies the right-eye image obtained from the right camera 31R and the left-eye image obtained from the left camera 31L when images of the object points PR, PL, and PC are shot. In the right-eye image, an image point IRR indicates an image point of an object point PR, an image point ILR indicates an image point of an object point PL, and an image point ICR indicates an image point of the object point PC. In the left-eye image, an image point IRL indicates the image point of the object point PR, an image point ILL indicates an image point of the object point PL, and an image point ICL indicates an image point of the object point PC.

The image point IRR in the right-eye image and the image point IRL in the left-eye image are image points with respect to the object point PR on the reference plane SB, and are image points that are at the same position between the right-eye image and the left-eye image. The image point ILR in the right-eye image and the image point ILL in the left-eye image are image points with respect to the object point PL on the reference plane SB, and are image points that are at the same position between the right-eye image and the left-eye image.

Figure 8A:
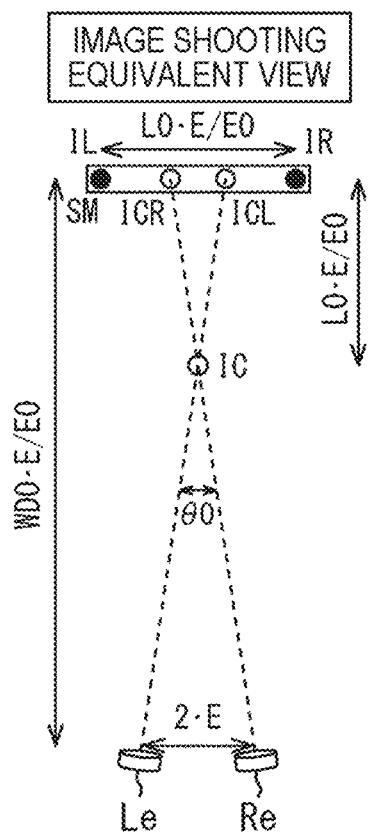
FIGS. 8A, 8B, and 8C are diagrams illustrating a state viewed from above where an observer is observing a right-eye image and left-eye image with a stereoscopic view.
Figure 8B:
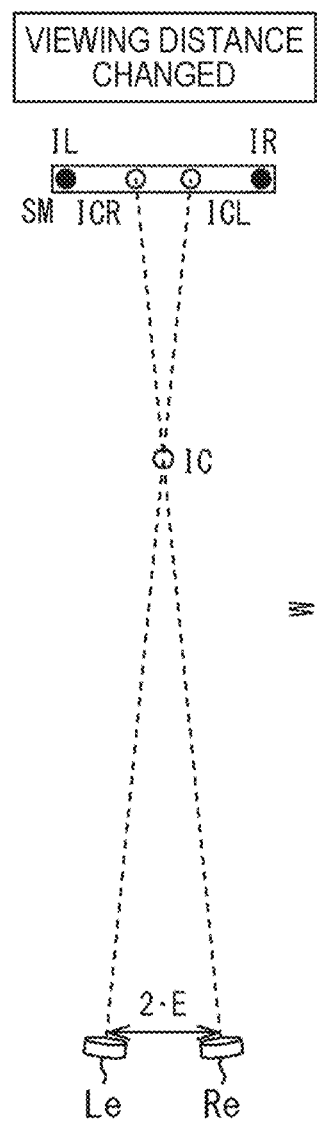
Figure 8C:
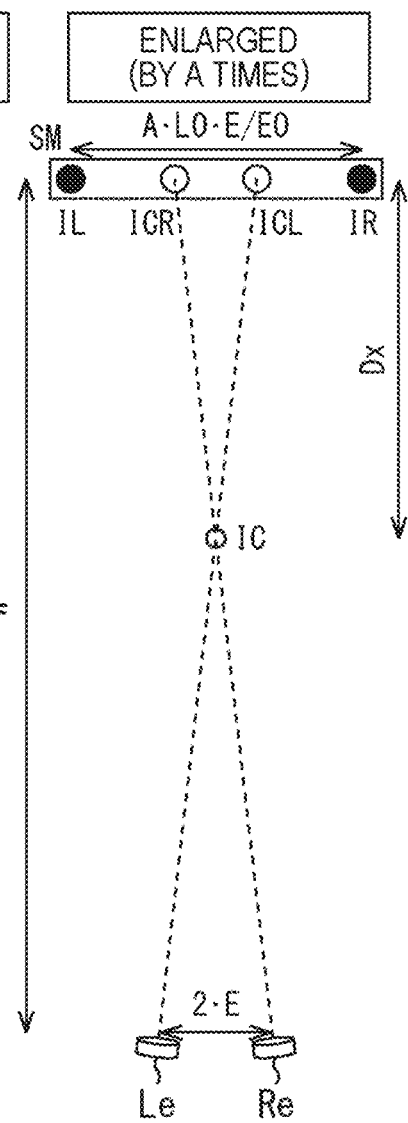

FIGS. 8A, 8B, and 8C are diagrams illustrating a state viewed from above where the right-eye image and left-eye image in FIG. 7 are being observed under different observation conditions.

In FIGS. 8A, 8B, and 8C, a pupillary distance $2 \cdot E$ indicates a distance between a right eye Re and left eye Le of the observer.

Furthermore, in FIGS. 8A, 8B, and 8C, a display surface SM is a display surface on which the right-eye image and the left-eye image are displayed, and represents a position where image points displayed at the same position between the right-eye image and the left-eye image are reproduced (perceived) in the stereoscopic image space.

An image point IR on the display surface SM is an image point with respect to the object point PR in FIG. 6, and represents the image point IRR in the right-eye image and the image point IRL in the left-eye image that are displayed at the same position on the display surface SM. An image point IL on the display surface SM is an image point with respect to the object point PL in FIG. 6, and represents the image point ILR in the right-eye image and the image point ILL in the left-eye image that are displayed at the same position on the display surface SM.

Furthermore, the image point IR and the image point IL represent image points with respect to the object point PR and the object point PL reproduced in the stereoscopic image space by the observer stereoscopically viewing the three-dimensional image (right-eye image and left-eye image).

The image point ICR in the right-eye image of the object point PC in FIG. 6 and the image point ICL in the left-eye image of the object point PC in FIG. 6 are displayed at different positions on the display surface SM.

In FIGS. 8A, 8B, and 8C, an image point IC represents an image point with respect to the object point PC reproduced (fused) in the stereoscopic image space by the observer stereoscopically viewing the three-dimensional image. That is, the image point IC is reproduced at a position where a line of sight from the right eye Re of the observer toward the image point ICR in the right-eye image on the display surface SM, and a line of sight from the left eye Le of the observer toward the image point ICL in the left-eye image on the display surface SM intersect with each other.

Here, FIG. 8A illustrates a case of an observation condition under which depth distortion does not occur in a case where the right-eye image and left-eye image in FIG. 7 are displayed on the display surface SM.

In FIG. 8A, sizes of the right-eye image and left-eye image are enlarged and displayed on the display surface SM so that a distance between the image point IR and the image point IL is $E/E0$ times the distance L0 between the object point PR and object point PL in FIG. 6.

Furthermore, a viewing distance W, which is the distance from the eyes Re and Le of the observer to the display surface SM, is set to $WD0 \cdot E/E0$ of when the working distance WD0 is multiplied by $E/E0$.

At this time, a convergence angle $\theta 0$ when the image point IC is gazed at is equal to the inward angle $\theta 0$ in FIG. 6, and a distance $L0 \cdot E/E0$ between the image point IR and image point IL on the display surface SM and a distance $L0 \cdot E/E0$ from the image point IC to the display surface SM coincide with each other.

Furthermore, in the observation condition in FIG. 8A, with respect to L0 of an arbitrary value, the distance $L0 \cdot E/E0$ between the image point IR and image point IL on the display surface SM and the distance $L0 \cdot E/E0$ from the image point IC to the display surface SM coincide with each other. Therefore, the stereoscopic image space under the observation condition in FIG. 8A is a stereoscopic image space in which depth distortion does not occur similarly to the image shooting space, and a stereoscopic view under the observation condition in FIG. 8A is referred to as an image shooting equivalent view.

FIG. 8B is a diagram illustrating a position of the image point IC in a case where an actual viewing distance W is different from the viewing distance $WD0 \cdot E/E0$ under an observation condition of the image shooting equivalent view. In this case, the distance between the image point IR and the image point IL does not change. Meanwhile, because the viewing distance W is different from a viewing distance W in a case of the image shooting equivalent view, the distance from the image point IC to the display surface SM is different from the distance $L0 \cdot E/E0$ in a case of the image shooting equivalent view. Therefore, depth distortion occurs in FIG. 8B.

FIG. 8C represents a position of the image point IC in a case where, in observation with the viewing distance W in FIG. 8B, sizes of an actual right-eye image and actual left-eye image displayed on the display surface SM of the three-dimensional display unit 25 are A times (enlargement magnification A) sizes thereof in the image shooting equivalent view.

In this case, the distance between the image point IR and the image point IL on the display surface SM is A·L0·E/E0. Furthermore, the distance between the image point ICR and the image point ICL is also enlarged by A times as compared with a case of the image shooting equivalent view. Therefore, the position of the image point IC in the depth direction is also different from the position in a case of FIG. 8B.

Here, provided that a distance (projection amount) from the image point IC to the display surface SM is Dx, a value Dx0 of the projection amount Dx in a case where it is supposed that there is no depth distortion (referred to as an original projection amount Dx0) is a distance AL0·E/E0 between the image point IR and the image point IL.

Note that the original projection amount Dx0 (an original distance to the display surface SM) of the image point in the stereoscopic image space can be defined as a distance between two image points obtained by two object points on the reference plane SB being reproduced on the display surface SM in the stereoscopic image space, in a case where a distance to the reference plane SB of the object points in the image shooting space reproduced as the image points is equal to a distance between the two object points on the reference plane SB.

Then, when a depth distortion rate α at a position with the original projection amount Dx0 in the depth direction is defined as Dx/Dx0, the depth distortion rate α is expressed by the following Mathematical Formula (1).

[Mathematical Formula 1]

$$\alpha = \frac{Dx}{Dx0} = \frac{Dx}{A \cdot L0 \cdot E/E0} \quad (1)$$
$$= \frac{A \cdot Px0 \cdot W}{(E + A \cdot Px0)} \cdot \frac{1}{A \cdot L0 \cdot E/E0}$$
$$= \frac{(E + Px0) \cdot W}{(E + A \cdot Px0) \cdot WD0 \cdot E/E0}$$

In this regard, Px0 is a parallax amount expressed by the following Mathematical Formula (2), and indicates a value of ½ of the distance between the image point ICR and the image point ICL in the image shooting equivalent view of FIG. 8A.

[Mathematical Formula 2]

$$Px0 = \frac{L0 \cdot E}{WD0 - L0} \quad (2)$$

Note that when there is no depth distortion with an original projection amount A·L0·E/E0 of the image point IC, the depth distortion rate α=1. In Mathematical Formula (1), when the viewing distance W is obtained with the depth distortion rate α=1, the following Mathematical Formula (3) is derived.

$$W = \{WD0 + (A-1) \cdot L0\} E/E0 \quad (3)$$

With this arrangement, when the enlargement magnification A is not 1, the viewing distance W at which the depth distortion rate α is 1 depends on a value of the distance L0 from the object point PC to the reference plane SB, and also depends on the original projection amount A·L0·E/E0 of the image point IC.

Meanwhile, when the enlargement magnification A is 1, the viewing distance W at which the depth distortion rate α is 1 is WD0·E/E0, and does not depend on the value of the distance L0 from the object point PC to the reference plane SB. Therefore, it can be seen that the image shooting equivalent view corresponding to a case in which the enlargement magnification A=1 and the viewing distance W=WD0·E/E0 is an observation condition under which depth distortion does not occur with respect to a position of an image point IC of an arbitrary projection amount.

<Depth Distortion Behind Display Surface>

Next, a depth distortion behind the display surface SM will be described.

Figure 9:
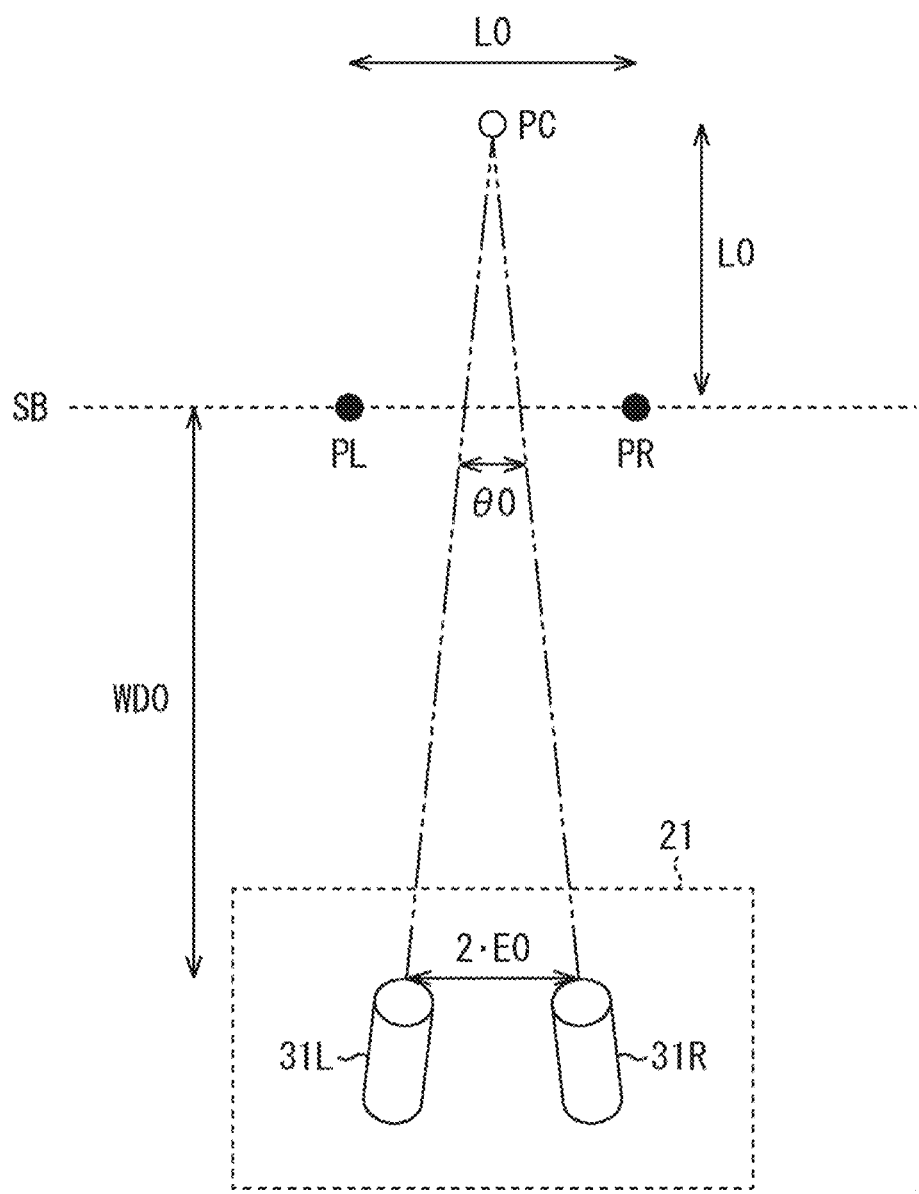
FIG. 9 is a diagram illustrating an image shooting space viewed from above.

FIG. 9 is a diagram illustrating the image shooting space viewed from above in which the image shooting unit 21 in FIG. 1 is disposed. Note that, hereinafter, in description of FIGS. 9, 10, 11A, and 11B, description of content overlapping with content of the description of FIGS. 6, 7, 8A, and 8B will be appropriately omitted.

In FIG. 9, object points PR and PL represent object points that are on the reference plane SB and have an interval of a distance L0.

The object point PC is a point that is recessed behind the reference plane SB (on a side opposite to the side close to the image shooting unit 21), and represents a point at which a distance to the reference plane SB is L0. Furthermore, the object point PC is a point corresponding to a vertex of an isosceles triangle having a height L0 with a line segment connecting the object points PR and PL as a base.

The working distance WD0, the base length 2·E0, and the inward angle θ0 are similar thereto in a case of FIG. 6.

It is assumed that object points PR, PL, and PC are shot by the right camera 31R and the left camera 31L under the image shooting condition, and a three-dimensional image including the right-eye image and the left-eye image is acquired.

Figure 10:
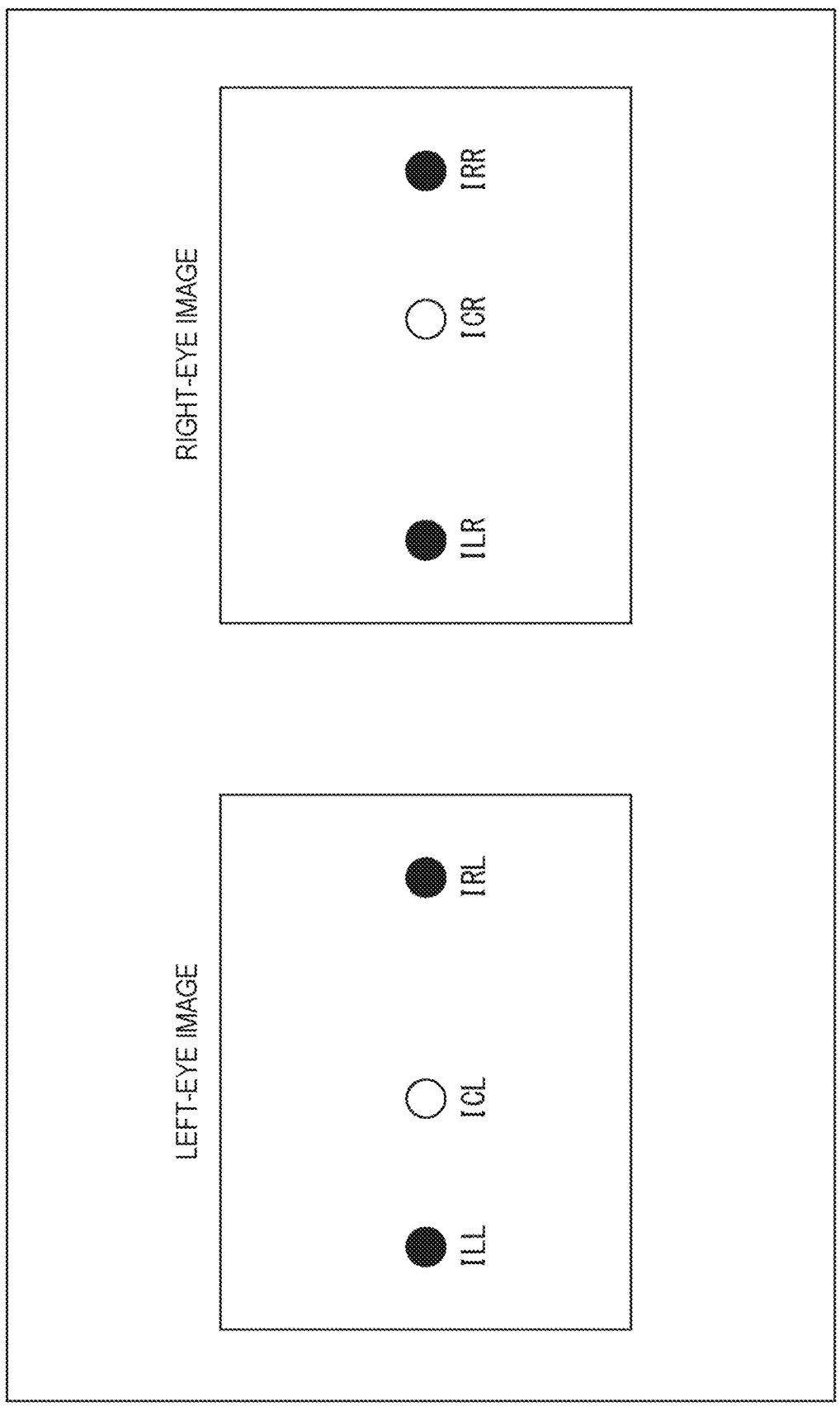
FIG. 10 is a diagram illustrating the right-eye image and left-eye image obtained by an image shooting unit in FIG. 9.

FIG. 10 exemplifies the right-eye image obtained from the right camera 31R and the left-eye image obtained from the left camera 31L when the object points PR, PL, and PC are shot. In the right-eye image, an image point IRR indicates an image point of an object point PR, an image point ILR indicates an image point of an object point PL, and an image point ICR indicates an image point of the object point PC. In the left-eye image, an image point IRL indicates the image point of the object point PR, an image point ILL indicates an image point of the object point PL, and an image point ICL indicates an image point of the object point PC.

The image point IRR in the right-eye image and the image point IRL in the left-eye image are image points with respect to the object point PR on the reference plane SB, and are image points that are at the same position between the right-eye image and the left-eye image. The image point ILR in the right-eye image and the image point ILL in the left-eye image are image points with respect to the object point PL on the reference plane SB, and are image points that are at the same position between the right-eye image and the left-eye image.

Figure 11A:
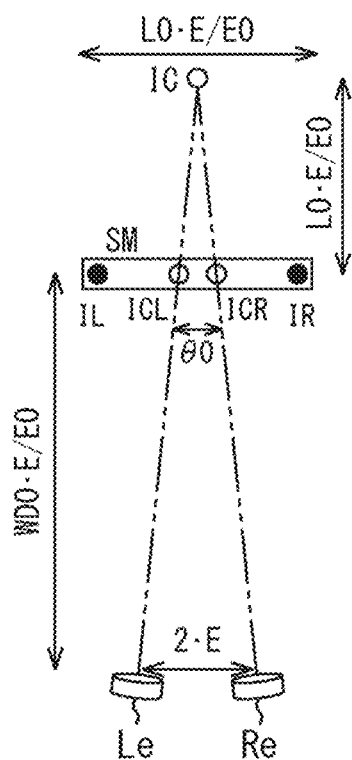
FIGS. 11A, 11B, and 11C are diagrams illustrating a state viewed from above where an observer is observing the right-eye image and left-eye image in FIG. 10 with a stereoscopic view.
Figure 11B:
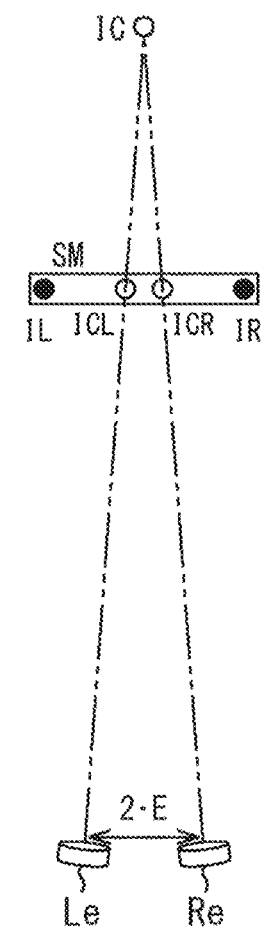
Figure 11C:
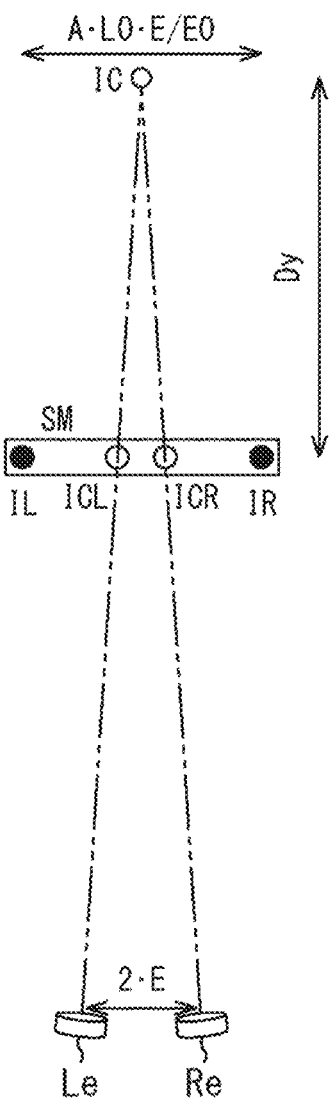

FIGS. 11A, 11B, and 11C are diagrams illustrating a state viewed from above where the right-eye image and left-eye image in FIG. 10 are being observed under different observation conditions.

Furthermore, in FIGS. 11A, 11B, and 11C, the image point IR on the display surface SM is an image point with respect to the object point PR in FIG. 9, and represents the image point IRR in the right-eye image and the image point IRL in the left-eye image that are displayed at the same position on the display surface SM. An image point IL on the display surface SM is an image point with respect to the object point PL in FIG. 9, and represents the image point ILR in the right-eye image and the image point ILL in the left-eye image that are displayed at the same position on the display surface SM.

Furthermore, the image point IR and the image point IL represent image points with respect to the object point PR and the object point PL reproduced in the stereoscopic image space by the observer stereoscopically viewing the three-dimensional image (right-eye image and left-eye image).

The image point ICR in the right-eye image of the object point PC in FIG. 9 and the image point ICL in the left-eye image of the object point PC in FIG. 9 are displayed at different positions on the display surface SM.

In FIGS. 11A, 11B, and 11C, an image point IC represents an image point with respect to the object point PC reproduced (fused) in the stereoscopic image space by the observer stereoscopically viewing the three-dimensional image. That is, the image point IC is reproduced at a position where a line of sight from the right eye Re of the observer toward the image point ICR in the right-eye image on the display surface SM, and a line of sight from the left eye Le of the observer toward the image point ICL in the left-eye image on the display surface SM intersect with each other. In FIGS. 11A, 11B, and 11C, the image point IC is reproduced at a position recessed behind the display surface SM.

Here, FIG. 11A illustrates a case of an observation condition under which depth distortion does not occur in a case where the right-eye image and left-eye image in FIG. 10 are displayed on the display surface SM.

In FIG. 11A, sizes of the right-eye image and left-eye image are enlarged and displayed on the display surface SM so that a distance between the image point IR and the image point IL is E/E0 times the distance L0 between the object point PR and object point PL in FIG. 9.

Furthermore, a viewing distance W, which is the distance from the eyes Re and Le of the observer to the display surface SM, is set to WD0·E/E0 of when the working distance WD0 is multiplied by E/E0.

At this time, the convergence angle θ0 when the image point IC is gazed at is equal to the inward angle θ0 in FIG. 9, and a distance L0·E/E0 between the image point IR and image point IL on the display surface SM and a distance L0·E/E0 from the image point IC to the display surface SM coincide with each other.

Furthermore, in the observation condition in FIG. 11A, with respect to L0 of an arbitrary value, the distance L0·E/E0 between the image point IR and image point IL on the display surface SM and the distance L0·E/E0 from the image point IC to the display surface SM coincide with each other. Therefore, the stereoscopic image space under the observation condition in FIG. 11A is a stereoscopic image space in which depth distortion does not occur similarly to the image shooting space, and a stereoscopic view under the observation condition in FIG. 11A is referred to as an image shooting equivalent view, similarly to FIG. 8A.

FIG. 11B is a diagram illustrating a position of the image point IC in a case where an actual viewing distance W is different from the viewing distance WD0·E/E0 under an observation condition of the image shooting equivalent view. In this case, the distance between the image point IR and the image point IL does not change. Meanwhile, because the viewing distance W is different from a viewing distance W in a case of the image shooting equivalent view, the distance from the image point IC to the display surface SM is different from the distance L0·E/E0 in a case of the image shooting equivalent view. Therefore, depth distortion occurs in FIG. 11B.

FIG. 11C represents a position of the image point IC in a case where, in observation with the viewing distance W in FIG. 11B, sizes of an actual right-eye image and actual left-eye image displayed on the display surface SM of the three-dimensional display unit 25 are A times (enlargement magnification A) sizes thereof in the image shooting equivalent view.

In this case, the distance between the image point IR and the image point IL on the display surface SM is A·L0·E/E0. Furthermore, the distance between the image point ICR and the image point ICL is also enlarged by A times as compared with a case of the image shooting equivalent view. Therefore, the position of the image point IC in the depth direction is also different from the position in a case of FIG. 11B.

Here, provided that a distance (recession amount) from the image point IC to the display surface SM is Dy, a value Dy0 of the recession amount Dy in a case where it is supposed that there is no depth distortion (referred to as an original recession amount Dy0) is a distance A—L0·E/E0 between the image point IR and the image point IL.

Note that, similarly to the original projection amount Dx0, the original recession amount Dy0 (an original distance to the display surface SM) of the image point in the stereoscopic image space can be defined as a distance between two image points obtained by two object points on the reference plane SB being reproduced on the display surface SM in the stereoscopic image space, in a case where a distance to the reference plane SB of the object points in the image shooting space reproduced as the image points is equal to a distance between the two object points on the reference plane SB.

Then, when a depth distortion rate α at a position of the original recession amount Dy0 in the depth direction is defined as Dy/Dy0, the depth distortion rate α is expressed by the following Mathematical Formula (4).

[Mathematical Formula 3]

$$\alpha = \frac{Dy}{Dy0} = \frac{Dy}{A \cdot L0 \cdot E/E0} \qquad (4)$$
$$= \frac{A \cdot Py0 \cdot W}{(E - A \cdot Py0)} \cdot \frac{1}{A \cdot L0 \cdot E/E0}$$
$$= \frac{(E - Py0) \cdot W}{(E - A \cdot Py0) \cdot WD0 \cdot E/E0}$$

In this regard, Py0 is a parallax amount expressed by the following Mathematical Formula (5), and indicates a value of ½ of the distance between the image point ICR and the image point ICL in the image shooting equivalent view of FIG. 11A.

[Mathematical Formula 4]

$$Py0 = \frac{L0 \cdot E}{WD0 + L0} \qquad (5)$$

Note that, by setting a positive value for a distance in front of the reference plane SB and display surface SM and setting a negative value for a distance behind the reference plane SB and display surface SM, or vice versa, the depth distortion rate α can be calculated by using only either Mathematical Formula (1) (and Mathematical Formula (2)) or Mathematical Formula (4) (and Mathematical Formula (5)), regardless of whether the distance is in front of or behind the reference plane SB and display surface SM. In this regard, the depth distortion rate α on the display surface SM (L0=0) is not a value obtained by Mathematical Formula (1) or Mathematical Formula (4), but is set to 1.

Furthermore, the depth distortion information generation unit 42 may generate depth distortion information other than the above-described depth distortion rate α as information indicating the magnitude of distortion in the depth direction as the depth distortion information. For example, instead of calculating the depth distortion rate α, the depth distortion information generation unit 42 may calculate a reciprocal (1/α) of the depth distortion rate α as the depth distortion rate. Furthermore, instead of the depth distortion rate α, the depth distortion information generation unit 42 may calculate a difference between the projection amount Dx and the original projection amount Dx0 and a difference between the recession amount Dy and the original recession amount Dy0.

<First Form of Depth Distortion Information (Map Method)>

Next, a first form (map method) of depth distortion information generated in the depth distortion information generation unit 42 will be described.

Figure 12:
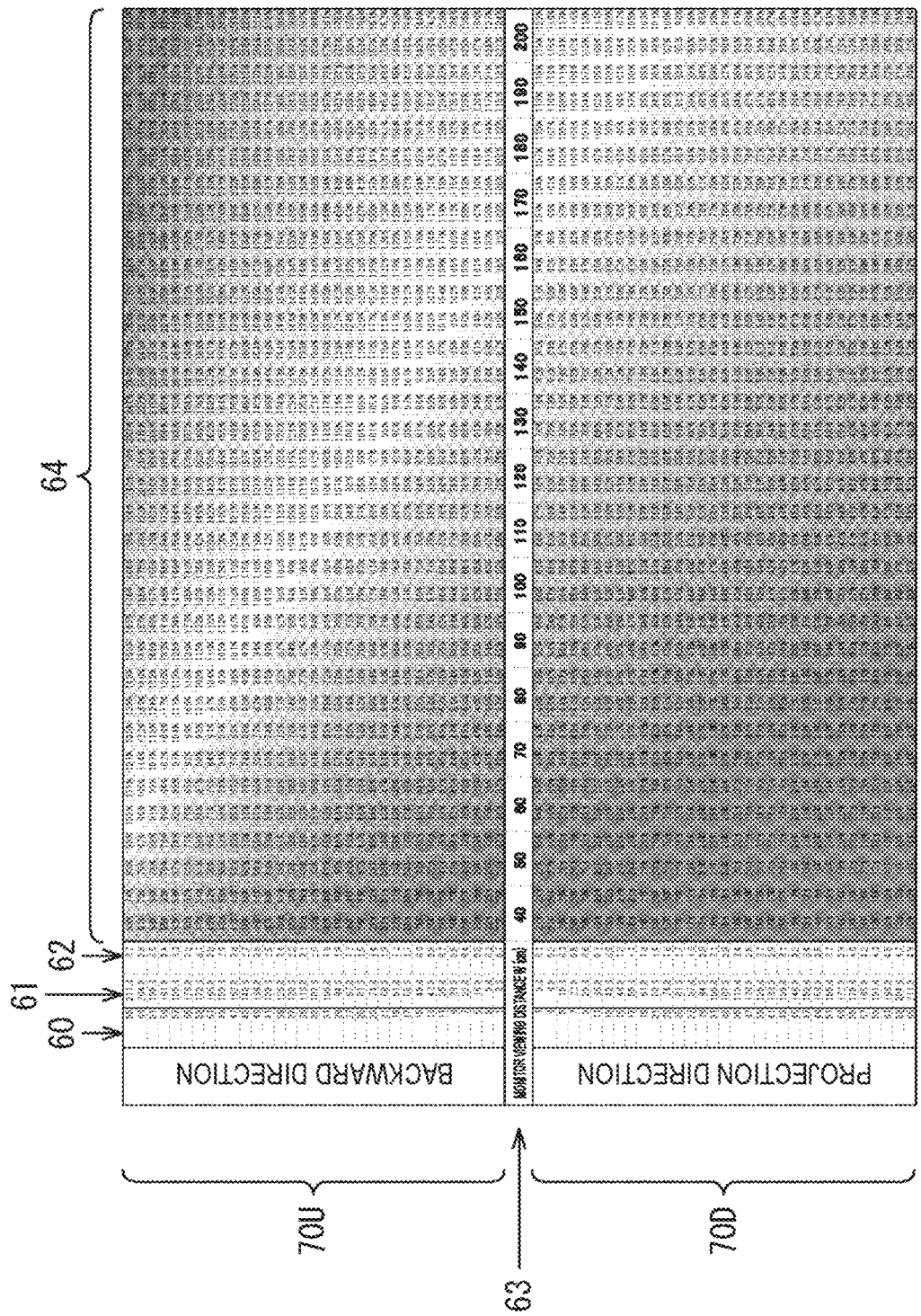
FIG. 12 is diagram exemplifying a depth distortion map.
Figure 13:
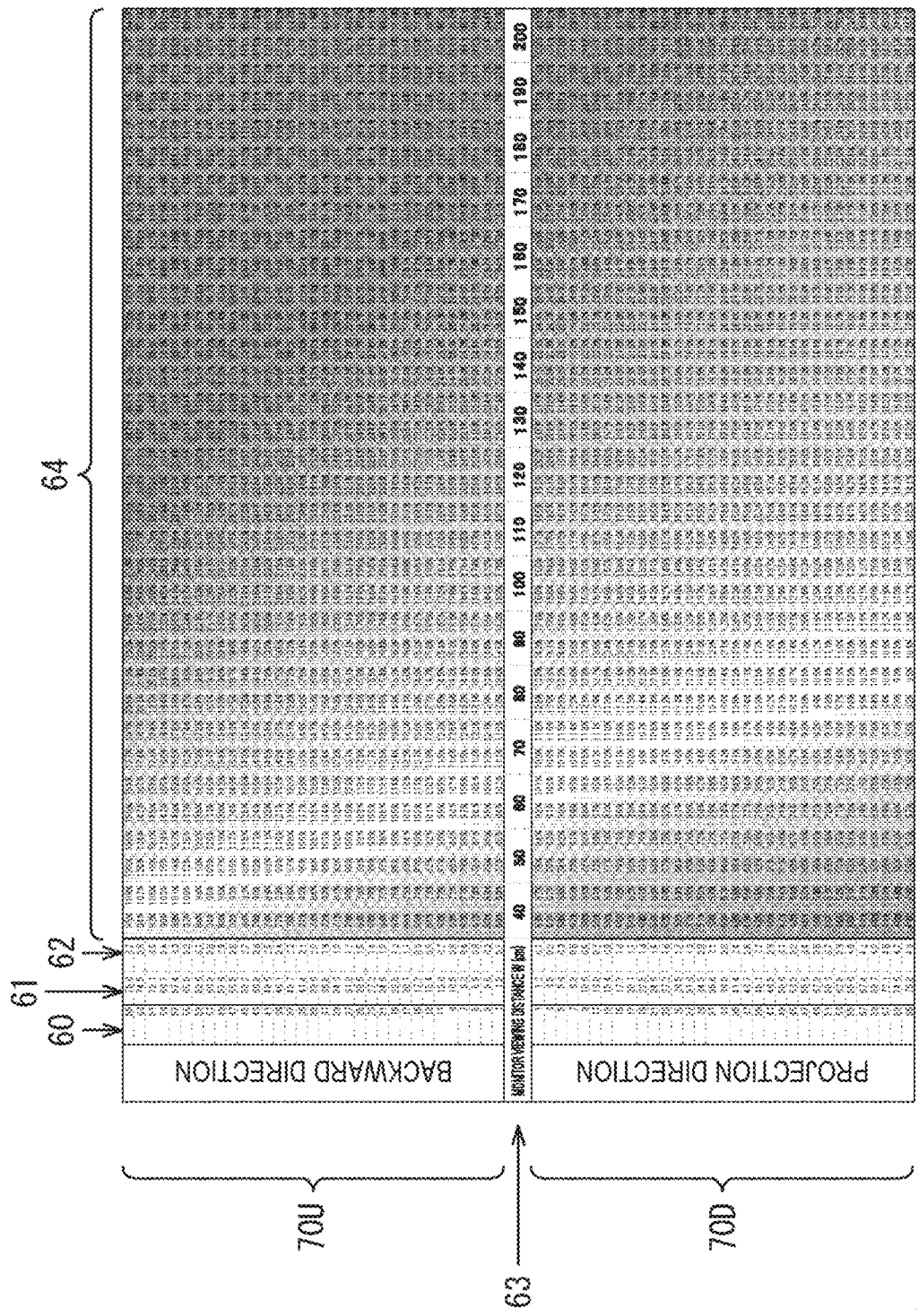
FIG. 13 is diagram exemplifying a depth distortion map.

In FIG. 2, the depth distortion information generation unit 42 performs the following processing on the basis of the base length 2·E0, working distance WD0, and image shooting range diagonal view angle size LB from the image shooting condition acquisition unit 43, and the pupillary distance 2·E and diagonal screen size LM from the observation condition acquisition unit 44 to generate the depth distortion map as illustrated in FIGS. 12 and 13.

Note that the depth distortion map in FIG. 12 illustrates a case where the base length 2·E0 is 20 mm, the working distance WD0 is 500 mm, the image shooting range diagonal view angle size LB is 70 mm, the pupillary distance 2·E is 65 mm, and the diagonal screen size LM is 1397 mm. The depth distortion map in FIG. 13 illustrates a case where the base length 2·E0 is 55 mm, the working distance WD0 is 500 mm, the image shooting range diagonal view angle size LB is 170 mm, the pupillary distance 2·E is 65 mm, and the diagonal screen size LM is 787.4 mm.

First, the depth distortion information generation unit 42 obtains the enlargement magnification A in the above Mathematical Formula (1) and the above Mathematical Formula (4) by the following Mathematical Formula (6).

$$A = LM/(L \cdot BE/E0) \quad (6)$$

Furthermore, with respect to the distance L0 to the reference plane SB of the object points in the image shooting space, the depth distortion information generation unit 42 sets a value of a regular interval (an interval of 2 mm for example) from a predetermined minimum value (1 mm for example) to a predetermined maximum value (65 mm for example) as a distance substitution value L0[n] to be substituted for the distance L0. In this regard, n is an element value sequentially assigned from 1 in ascending order of the distance substitution value.

In the depth distortion map in FIG. 12, a distance substitution value L0[n] in a case of assuming an object point behind the reference plane SB is indicated in a range above a center of an index column 60 on a left side (hereinafter, referred to as a recession range 70U). A distance substitution value L0[n] in a case of assuming an object point in front of the reference plane SB is indicated in a range below the center of the index column 60 (hereinafter, referred to as a projection range 70D).

Furthermore, the depth distortion information generation unit 42 calculates a projection amount L0[n]·E/E0 and a recession amount L0[n]·E/E0 of the image point in the image shooting equivalent view, and parallax amounts Px0 and Py0 of when the distance L0 to the reference plane SB of the object points is a distance substitution value L0[n].

In the depth distortion map in FIG. 12, a recession amount L0[n]·E/E0 corresponding to a distance substitution value L0[n] in the index column 60 is indicated in the recession range 70U of a column 61 on right of the index column 60. The projection amount L0[n]·E/E0 corresponding to a distance substitution value L0[n] in the index column 60 is indicated in the projection range 70D of the column 61.

Furthermore, in the depth distortion map in FIG. 12, a parallax amount Py0 corresponding to a distance substitution value L0[n] in the index column 60 is indicated in the recession range 70U of a column 62 on right of the index column 61. A parallax amount Px0 corresponding to a distance substitution value L0[n] in the index column 60 is indicated in the projection range 70D of the column 62.

Furthermore, with respect to the viewing distance W, the depth distortion information generation unit 42 sets a value of a regular interval (an interval of 50 mm for example) from a predetermined minimum value (35 cm for example) to a predetermined maximum value (2000 cm for example) as a viewing distance substitution value W[m] to be substituted for the viewing distance W. In this regard, m is an element value sequentially assigned from 1 in ascending order of a viewing distance substitution value.

In the depth distortion map in FIG. 12, a viewing distance substitution value W[m] of the viewing distance W is indicated in an index row 63 at a center.

In FIG. 2, in a case where the viewing distance W is at each viewing distance substitution value W[m], the depth distortion information generation unit 42 calculates the depth distortion rate α at each distance substitution value L0[n] from Mathematical Formula (1) and Mathematical Formula (4) by using the base length 2·E0, working distance WD0, and image shooting range diagonal view angle size LB from the image shooting condition acquisition unit 43, and the pupillary distance 2·E and diagonal screen size LM from observation condition acquisition unit 44.

Here, the depth distortion rate α in a case of a viewing distance substitution value W[m] and a distance substitution value L0[n] is represented by α[n][m]. Furthermore, the depth distortion rate α[n][m] represents a depth distortion rate α at a position of the image point of an original projection amount Dx0 and original recession amount Dy0 (an original distance to the display surface SM) in the stereoscopic image space when the distance L0 is a distance substitution value L0[n]. The original projection amount Dx0 and the original recession amount Dy0 are Dx0=Dy0=A·L0[n]·E/E0. The enlargement magnification A is calculated by A=LM/(LB·E/E0).

In a depth distortion display area 64 of the depth distortion map in FIG. 12, in the recession range 70U, a depth distortion rate α[n][m] calculated with Mathematical Formula (4) is indicated in a row of distance L0[n] in a column in which the viewing distance W indicates the viewing distance substitution value W[m].

Similarly, in the depth distortion display area 64 of the depth distortion map, in the projection range 70D, a depth distortion rate α[n][m] calculated with Mathematical Formula (1) is indicated in a row of distance L0[n] in a column in which the viewing distance W indicates the viewing distance substitution value W[m].

Note that, although a depth distortion rate α[n][m] is represented by a percentage (percent) in the depth distortion map in FIG. 12, the present invention is not limited thereto.

Furthermore, the depth distortion information generation unit 42 sets a background of a numerical value display region where the depth distortion rate α is 1 in the depth distortion display area 64 of the depth distortion map in FIG. 12 to, for example, yellow. Then, the depth distortion information generation unit 42 causes the background of the numerical value display area to transition to, for example, red as the depth distortion rate α increases from 1, and causes the background of the numerical value display region to transition to, for example, blue as the depth distortion rate α decreases from 1. With this arrangement, magnitude of the depth distortion rate α can be visually grasped by color.

Figure 14:
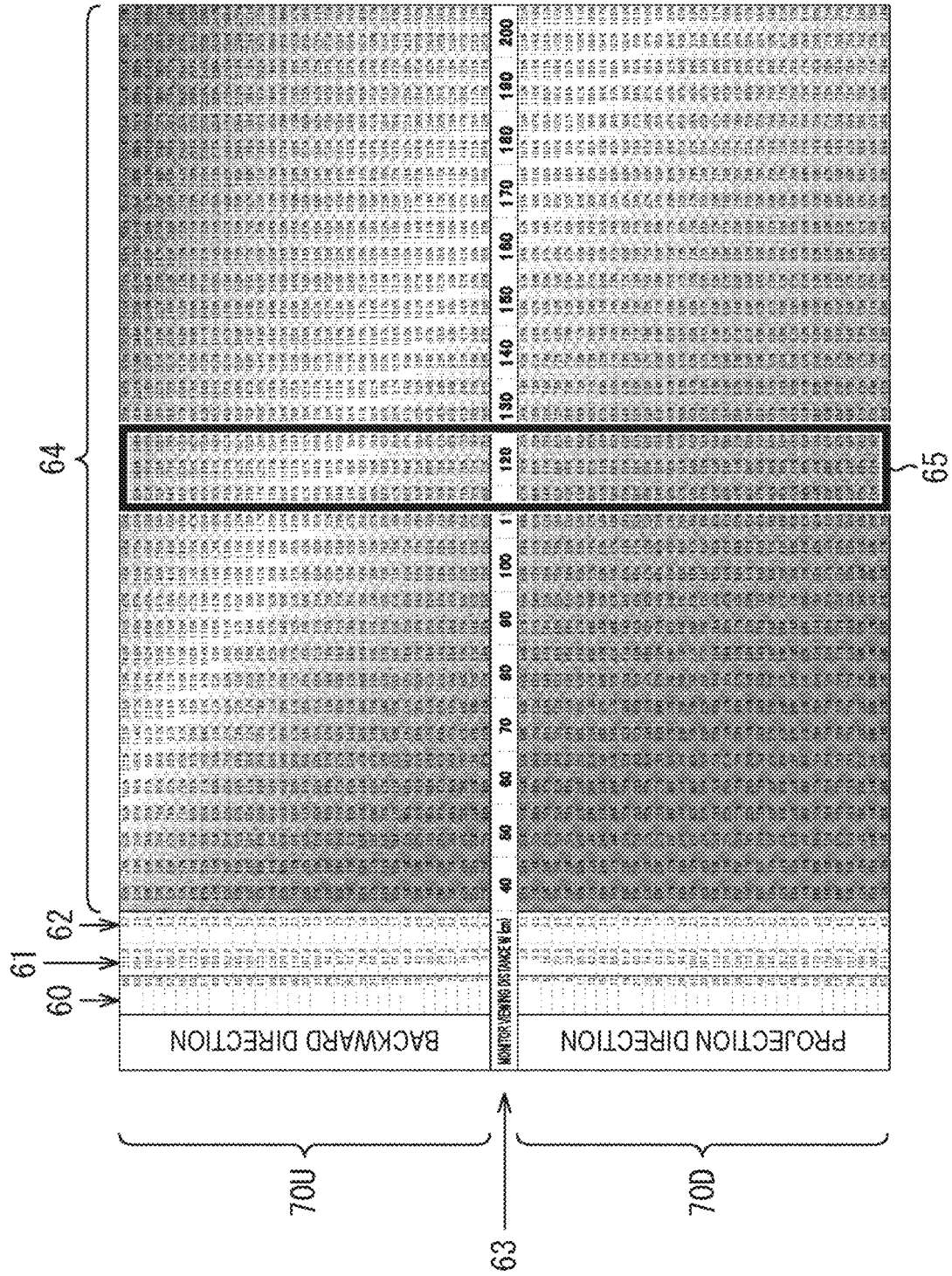
FIG. 14 is diagram exemplifying depth distortion information.

Moreover, the depth distortion information generation unit 42 reads a current viewing distance W from the observation condition acquisition unit 44, and surrounds, for example, a total of three columns including a column of a viewing distance substitution value W[m] closest to the current viewing distance W at a center, with an emphasis frame 65 such as a colored frame or a high-luminance frame as illustrated in FIG. 14 to complete depth distortion information (information display image). With this arrangement, a display part of the depth distortion rate corresponding to the current viewing distance W is emphasized. Note that the depth distortion information generation unit 42 may display a number in the column to be emphasized in color, line thickness, or size different from color, line thickness, or size of numbers in other columns.

<Processing Procedure of Entire Surgical Image Display System>

Figure 15:
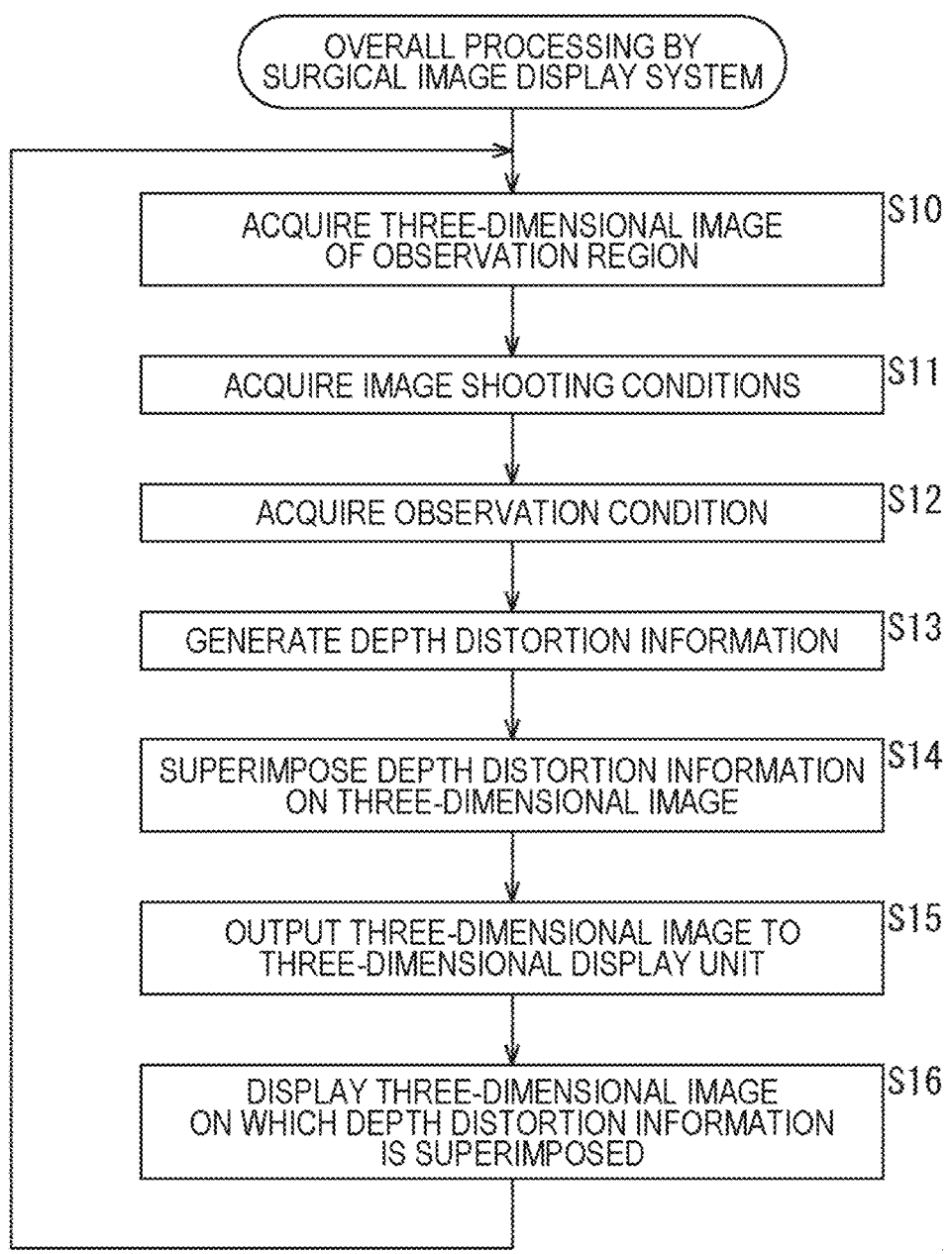
FIG. 15 is a flowchart describing an example of processing performed by the surgical image display system in FIG. 1.

FIG. 15 is a flowchart describing an example of processing performed by the surgical image display system 11 in FIG. 1.

In Step S10, the right camera 31R and left camera 31L of the image shooting unit 21 shoots the observation region and acquires a three-dimensional image (right-eye image and left-eye image) of the observation region. Then, the image capturing unit 41 of the image processing unit 24 captures the right-eye image via the right-camera control unit 22 and the left-eye image via the left-camera control unit 23. The processing proceeds from Step S10 to Step S11.

In Step S11, the image shooting condition acquisition unit 43 of the image processing unit 24 acquires the base length 2·E0, the working distance WD0, and the image shooting range diagonal view angle size LB as information of image shooting conditions. The processing proceeds from Step S11 to Step S12.

In Step S12, the observation condition acquisition unit 44 of the image processing unit 24 acquires the diagonal screen size LM as information of an observation condition. Furthermore, the observation condition acquisition unit 44 measures (calculates) the pupillary distance 2·E and the viewing distance W as information of the observation conditions on the basis of the positions of both eyes of the observer detected by the viewpoint detection sensor 26. The processing proceeds from Step S12 to Step S13.

In Step S13, the depth distortion information generation unit 42 of the image processing unit 24 generates depth distortion information on the basis of the image shooting conditions acquired by the image shooting condition acquisition unit 43, and of the observation condition acquired by the observation condition acquisition unit 44. The processing proceeds from Step S13 to Step S14.

In Step S14, the output image generation unit 45 of the image processing unit 24 superimposes the depth distortion information generated by the depth distortion information generation unit 42 on a predetermined region area of the three-dimensional image of the observation region captured by the image capturing unit 41 in Step S10. The processing proceeds from Step S14 to Step S15.

In Step S15, the output unit 46 of the image processing unit 24 converts the three-dimensional image on which the depth distortion information is superimposed in Step S14 into an image signal in a signal format corresponding to the three-dimensional display unit 25, and supplies the image signal to the three-dimensional display unit 25. The processing proceeds from Step S15 to Step S16.

Figure 16:
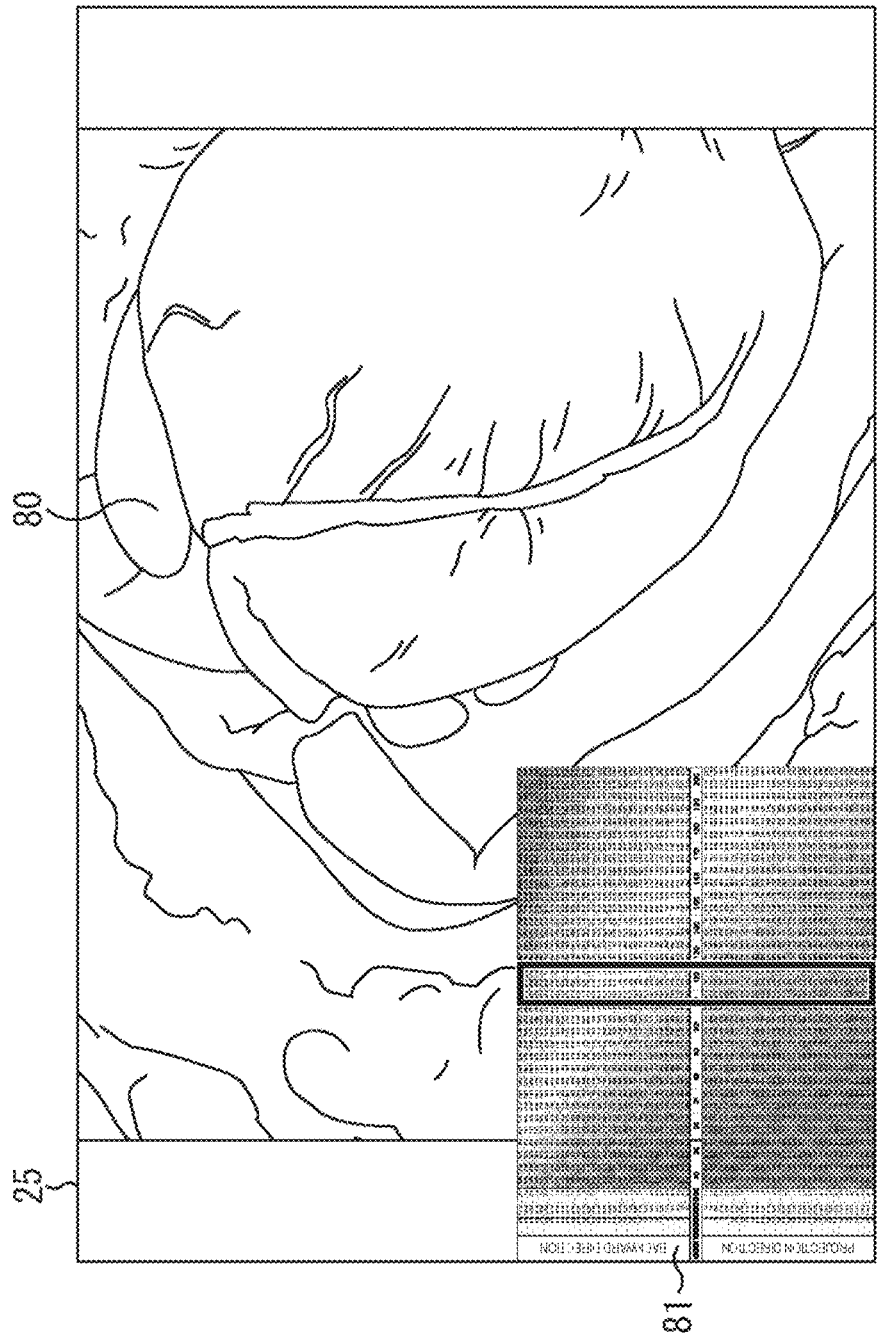
FIG. 16 is a diagram illustrating an example in which depth distortion information is superimposed on a three-dimensional image of an observation region.

In Step S16, on the display surface, the three-dimensional display unit 25 displays the three-dimensional image on which the depth distortion information is superimposed by the supplied image signal. With this arrangement, as illustrated in FIG. 16, a three-dimensional image 80 of the observation region on which the depth distortion information 81 is superimposed is displayed on the display surface of the three-dimensional display unit 25. The processing returns from Step S16 to Step S10, and the processing of Steps S10 to S16 is repeated.

<Processing Procedure of Depth Distortion Information Generation Unit>

Figure 17:
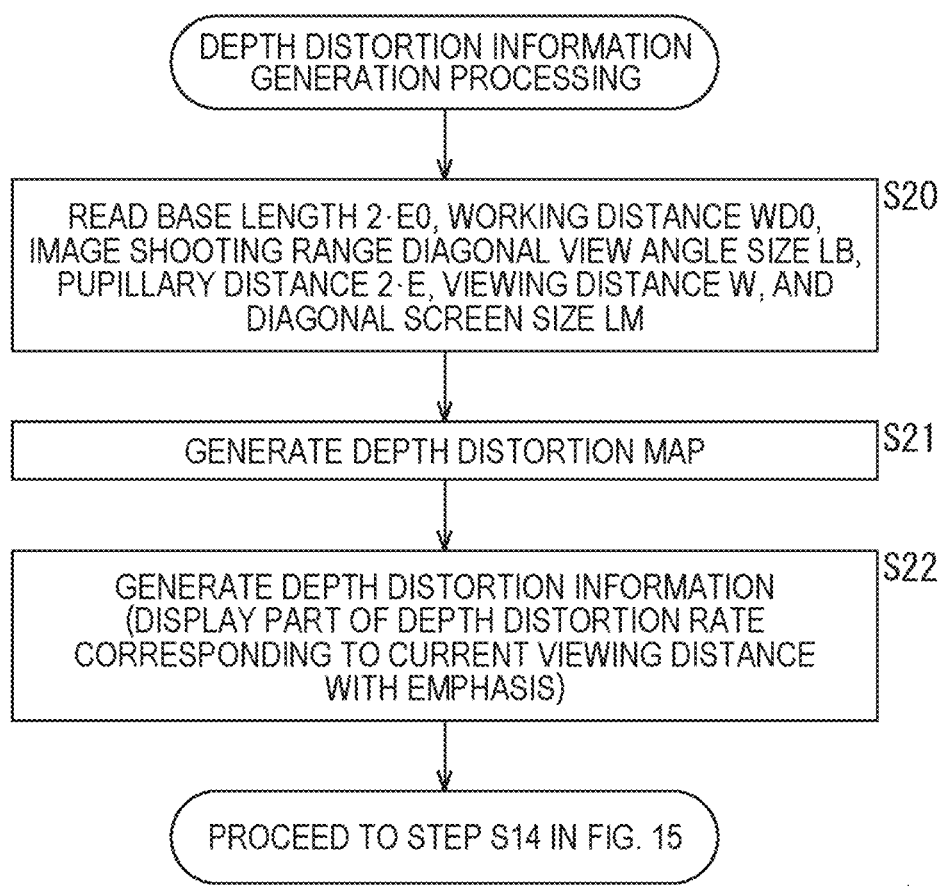
FIG. 17 is a flowchart describing an example of processing of depth distortion information generation performed by a depth distortion information generation unit.

FIG. 17 is a flowchart describing an example of processing of depth distortion information generation performed in Step S13 in FIG. 15 by the depth distortion information generation unit 42 in FIG. 2.

When the processing in the image processing unit 24 proceeds from Step S12 to Step S13 in FIG. 15, in Step S20 in FIG. 17, the depth distortion information generation unit 42 reads the base length 2·E0, working distance WD0, and image shooting range diagonal view angle size LB from the image shooting condition acquisition unit 43, and reads the pupillary distance 2·E, the viewing distance W, and diagonal screen size LM from the observation condition acquisition unit 44. The processing proceeds from Step S20 to Step S21.

In Step S21, the depth distortion information generation unit 42 generates a depth distortion map as illustrated in FIG. 12 on the basis of the base length 2·E0, working distance WD0, image shooting range diagonal view angle size LB, pupillary distance 2·E, and diagonal screen size LM read in Step S20. The processing proceeds from Step S21 to Step S22.

In Step S22, on the basis of the viewing distance W (current viewing distance W) read in Step S20, the depth distortion information generation unit 42 generates depth distortion information (refer to FIG. 14) in which a display part of a depth distortion rate corresponding to the viewing distance W on the depth distortion map is emphasized. Then, the depth distortion information generation unit 42 supplies the generated depth distortion information to the output image generation unit 45. The processing proceeds from Step S22 to Step S14 in FIG. 15.

According to the first embodiment of the surgical image display system described above, the observer who is stereoscopically viewing the three-dimensional image displayed on the three-dimensional display unit 25 can, on the basis of the depth distortion information, grasp the magnitude of the depth distortion that has occurred in the stereoscopic image space, by which grasping of the distance in the depth direction by the observer is assisted (facilitated). Note that only the depth distortion rate corresponding to the current viewing distance may be generated and displayed as the depth distortion information.

<Second Form of Depth Distortion Information (Diagram Method)>

Figure 18:
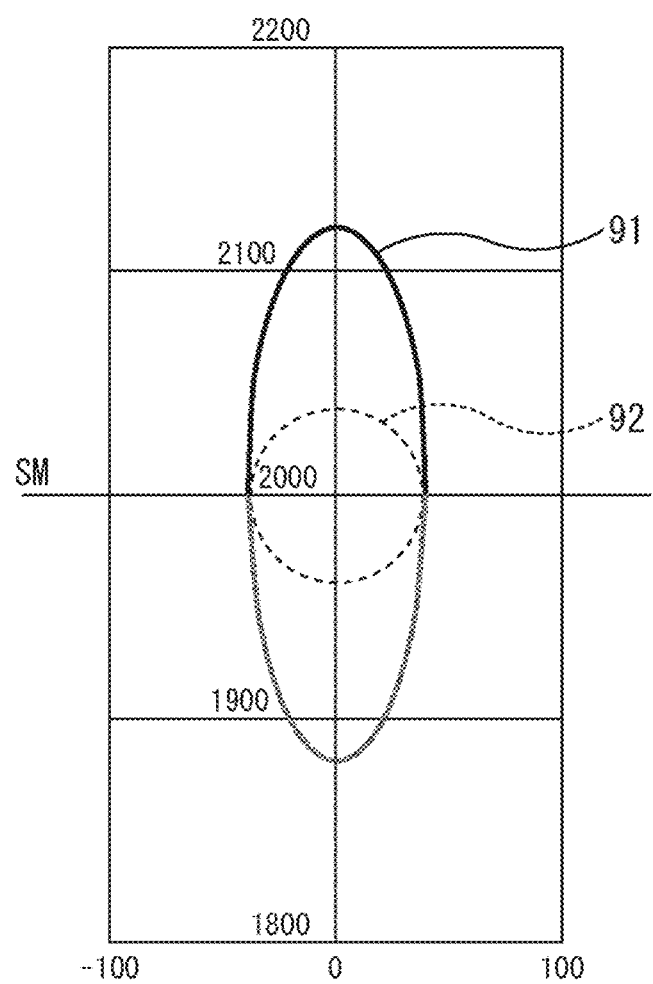
FIG. 18 is a diagram illustrating a second form of depth distortion information.

FIG. 18 is a diagram illustrating the second form of the depth distortion information.

As a second form of the depth distortion information, the depth distortion information generation unit 42 in FIG. 2 assumes a perfect circle having a predetermined radius on a plane including an optical axis of the right camera 31R and an optical axis of the left camera 31L in the image shooting space, and visually represents a shape (curve) in which a circumference of the assumed perfect circle is reproduced (fused) in the stereoscopic image space.

FIG. 18 is a diagram illustrating the second form of the depth distortion information. In the drawing, a horizontal axis represents a distance from a reference point in a direction along the display surface SM of the three-dimensional display unit 25 of when an arbitrary position on the display surface SM of the three-dimensional display unit 25 is set as the reference point, and a vertical axis represents a distance from the eyes of the observer.

The depth distortion information generation unit 42 assumes a perfect circle 92 indicated by a broken line in FIG. 18 on a premise that there is no depth distortion on a horizontal plane orthogonal to a vertical direction of the display surface SM in the stereoscopic image space.

Then, the depth distortion information generation unit 42 multiplies a distance of each point on the circumference of the assumed perfect circle 92 to the display surface SM by the depth distortion rate α at the distance (depth distortion rate α with respect to the current viewing distance W), and, in stereoscopic image space where depth distortion has occurred therein, generates depth distortion information in which a curve (distortion circle) 91 passing through a position where each point on the circumference of the perfect circle 92 is reproduced is drawn. By the distortion circle 91 being displayed on the three-dimensional display unit 25 as the depth distortion information, the observer can grasp a state of the depth distortion in the stereoscopic image space from a degree of distortion of the distortion circle 91 with respect to the perfect circle 92.

The depth distortion information generation unit 42 may visually recognize both depth distortion behind and in front of the display surface SM simultaneously, by setting a center position of the perfect circle assumed in the stereoscopic image space to a point on the display surface SM as in the perfect circle 92 in FIG. 18, for example. Furthermore, by assuming a perfect circle included only in respective regions in front of and behind the display surface SM, the depth distortion information generation unit 42 may generate depth distortion information in which the distortion circles 93 and 94 in front of and behind the display surface SM are separately drawn as in FIGS. 19A and 19B. Furthermore, the depth distortion information generation unit 42 may generate depth distortion information in which the distortion circles 93 and 94 in FIGS. 19A and 19B are drawn on one coordinate plane. Moreover, the depth distortion information generation unit 42 may switch depth distortion information of different center positions and sizes of the assumed perfect circle according to instruction from a user.

<Processing Procedure of Depth Distortion Information Generation Unit (Second Form)>

Figure 20:
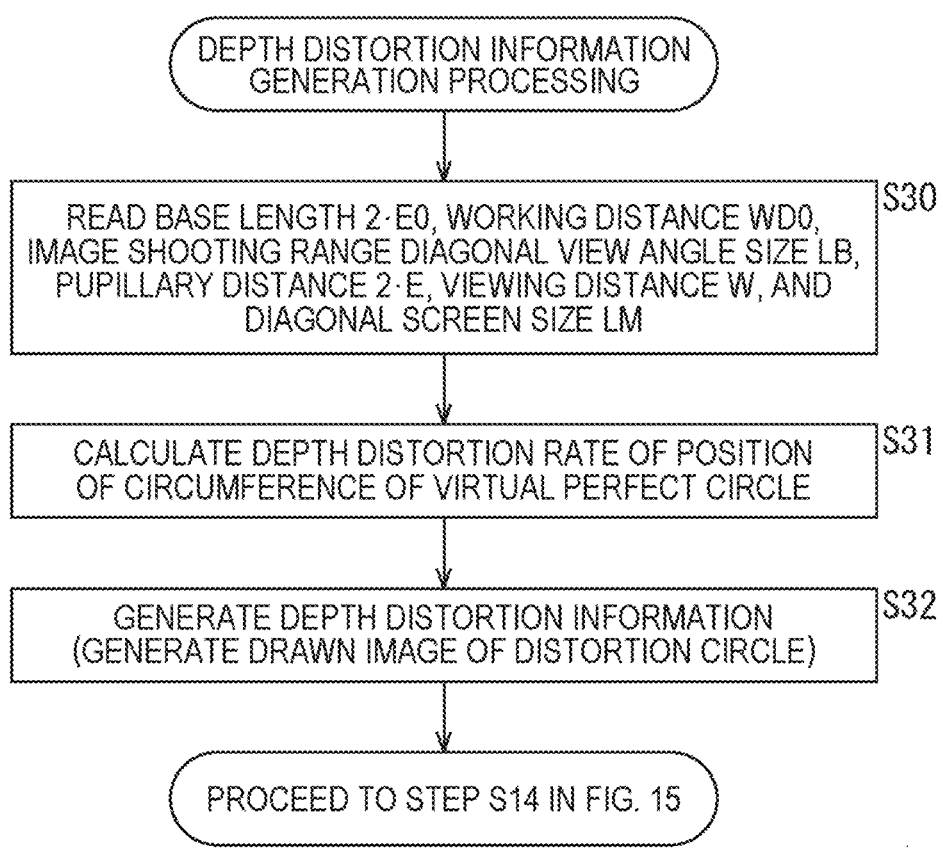
FIG. 20 is a flowchart describing processing performed by the depth distortion information generation unit in a case of generating the second form of the depth distortion information.

FIG. 20 is a flowchart describing processing performed by the depth distortion information generation unit 42 in Step S13 in FIG. 15 in a case of generating the second form of the depth distortion information.

When the processing proceeds from Step S12 to Step S13 in FIG. 15, in Step S30 in FIG. 20, the depth distortion information generation unit 42 reads the base length 2·E0, working distance WD0, and image shooting range diagonal view angle size LB from the image shooting condition acquisition unit 43, and reads the pupillary distance 2·E, the viewing distance W, and diagonal screen size LM from the observation condition acquisition unit 44. The processing proceeds from Step S30 to Step S31.

In Step S31, on the basis of the base length 2·E0, the working distance WD0, the image shooting range diagonal view angle size LB, the pupillary distance 2·E, the viewing distance W, and the diagonal screen size LM, the depth distortion information generation unit 42 calculates the depth distortion rate α of the position where the circumference of the perfect circle assumed in the stereoscopic image space passes (distance from the display surface SM). The processing proceeds from Step S31 to Step S32.

In Step S32, the depth distortion information generation unit 42 sets a distance, to the display surface SM, of the position where the circumference of the perfect circle assumed in the stereoscopic image space passes as the original projection amount Dx0 or original recession amount Dy0. Then, on the basis of the depth distortion rate α, the depth distortion information generation unit 42 generates depth distortion information in which a curve (distortion circle) is drawn, the curve passing through a position at the projection amount Dx or the recession amount Dy with which a point on the circumference of the perfect circle assumed in the stereoscopic image space is perceived as an image point. The depth distortion information generation unit 42 supplies the generated depth distortion information to the output image generation unit 45. The processing proceeds from Step S32 to Step S14 in FIG. 15.

Figure 21:
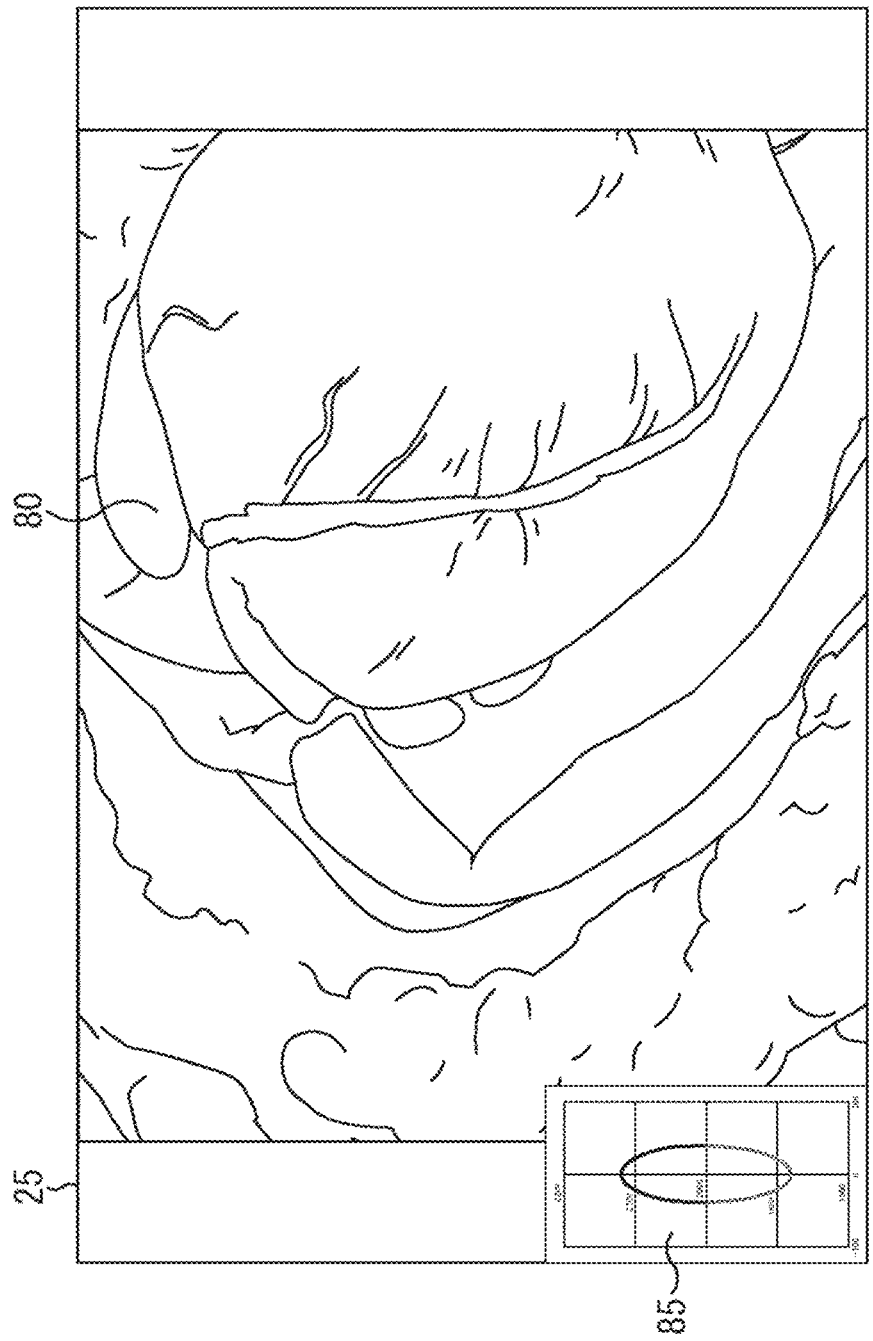
FIG. 21 is a diagram illustrating an example in which a second embodiment of depth distortion information is superimposed on the three-dimensional image of the observation region.

With this arrangement, as illustrated in FIG. 21, the three-dimensional image 80 obtained by shooting an image of the observation region and depth distortion information 85 are superimposed and displayed on the display surface SM of the three-dimensional display unit 25.

Note that the depth distortion information generation unit 42 assumed a perfect circle in a stereoscopic image space in a case where it is supposed that there is no depth distortion, and generated depth distortion information representing a shape (distortion circle) of the perfect circle deformed by the depth distortion. Assuming a shape other than a perfect circle in a stereoscopic image space in a case where it is supposed that there is no depth distortion, the depth distortion information generation unit 42 may generate depth distortion information representing a shape deformed by depth distortions.

According to the second form of the depth distortion information described above, the observer who is stereoscopically viewing the three-dimensional image displayed on the three-dimensional display unit 25 can visually grasp the magnitude of the depth distortion that has occurred in the stereoscopic image space, by which grasping of the distance in the depth direction by the observer is assisted (facilitated).

<<Second Embodiment of Surgical Image Display System>>

In a second embodiment of the surgical image display system, a fact that a viewing distance W is an optimal viewing distance W is displayed as depth distortion information, in a case where the optimal viewing distance W is obtained by an observer who is stereoscopically viewing a three-dimensional image displayed on a display surface of a three-dimensional display unit 25 changing the viewing distance W or changing a base length 2·E0 or working distance WD0 of an image shooting unit 21.

Figure 22:
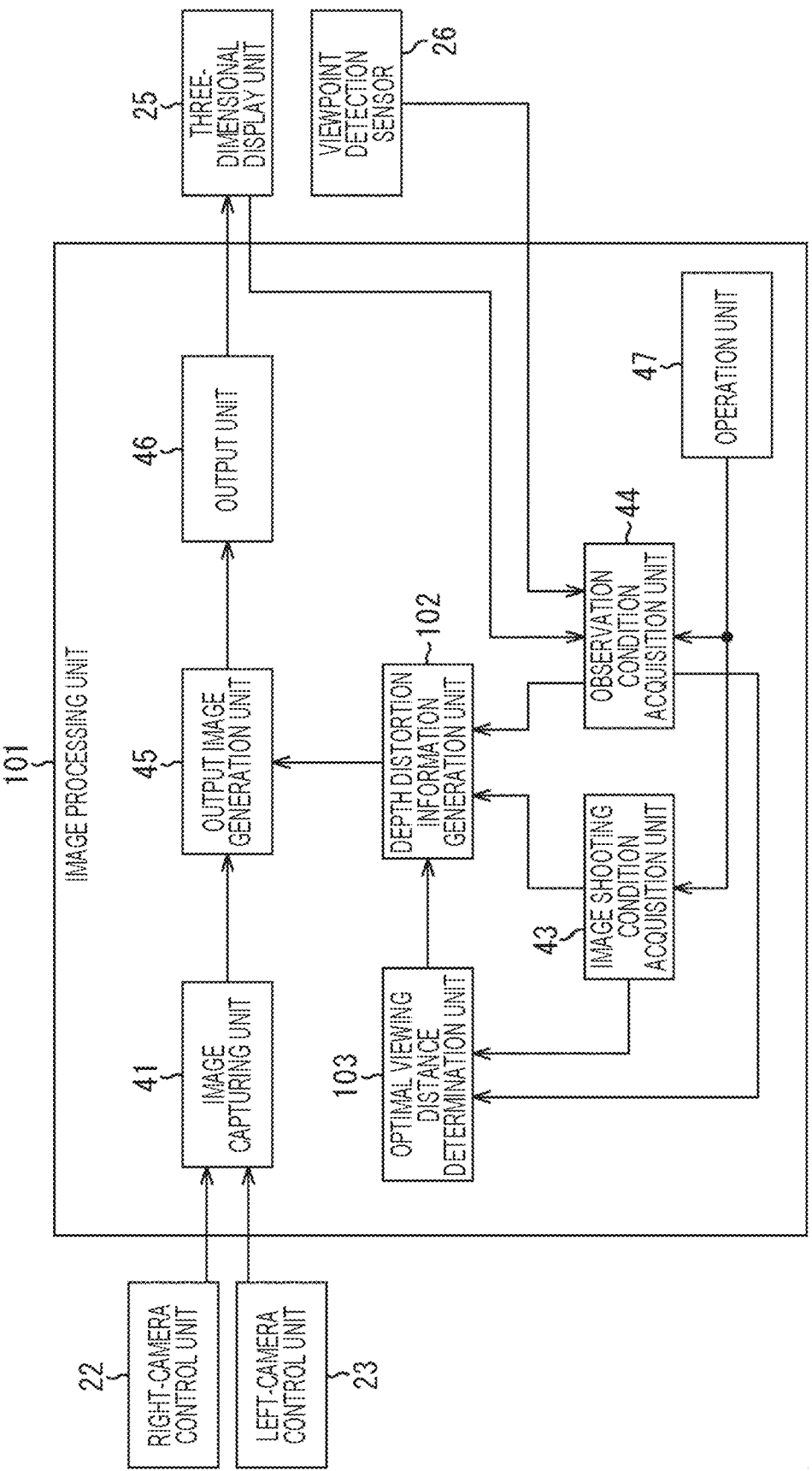
FIG. 22 is a block diagram illustrating a configuration example of an image processing unit in the second embodiment of the surgical image display system.

FIG. 22 is a block diagram illustrating a configuration example of an image processing unit 101 in the second embodiment of the surgical image display system. Note that, in the drawings, the parts corresponding to the parts in the image processing unit 24 in FIG. 2 are provided with the same reference signs, and description of the corresponding parts will be omitted as appropriate.

The image processing unit 101 in FIG. 22 is provided instead of the image processing unit 24 of the surgical image display system in FIG. 1, and has an image capturing unit 41, a depth distortion information generation unit 102, an image shooting condition acquisition unit 43, an observation condition acquisition unit 44, an output image generation unit 45, an output unit 46, an operation unit 47, and an optimal viewing distance determination unit 103. Therefore, the image processing unit 101 in FIG. 22 is common to the image processing unit 24 in FIG. 2 in having the image capturing unit 41, the image shooting condition acquisition unit 43, the observation condition acquisition unit 44, the output image generation unit 45, the output unit 46, and the operation unit 47. However, the image processing unit 101 in FIG. 22 is different from the image processing unit 24 in FIG. 2 in that the depth distortion information generation unit 102 is provided instead of the depth distortion information generation unit 42 in FIG. 2, and that the optimal viewing distance determination unit 103 is newly provided.

The depth distortion information generation unit 102 generates a depth distortion map similarly to the depth distortion information generation unit 42 in FIG. 2 on the basis of a base length 2·E0, working distance WD0, and image shooting range diagonal view angle size LB from the image shooting condition acquisition unit 43, and a pupillary distance 2·E, a viewing distance W, and diagonal screen size LM from the observation condition acquisition unit 44.

Furthermore, the depth distortion information generation unit 102 generates depth distortion information as illustrated in FIG. 14 in which a display part of a depth distortion rate α corresponding to the current viewing distance W is emphasized.

The optimal viewing distance determination unit 103 acquires the base length 2·E0 and working distance WD0 from the image shooting condition acquisition unit 43, acquires the pupillary distance 2·E from the observation condition acquisition unit 44, and obtains an optimal viewing distance Wc on the basis of the acquired base length 2·E0, working distance WD0, and pupillary distance 2·E0.

Here, in the above Mathematical Formula (3), the viewing distance W of when the depth distortion rate α is 1 at a position on the display surface SM is WD0·E/E0 that is a value of the viewing distance W of when L0=0, and does not depend on enlargement magnification A.

Meanwhile, provided that the optimal viewing distance Wc is a viewing distance W at which depth distortion decreases in vicinity of the display surface SM, the optimal viewing distance Wc can be defined as a viewing distance W at which a depth distortion rate approaches 1 as a position (image point) in a stereoscopic image space approaches the display surface SM from a back side and a front side.

At this time, the optimal viewing distance Wc is the viewing distance WD0·E/E0 at which the above Mathematical Formula (3) indicates α=1 at the position (L0=0) on the display surface SM. That is, the optimal viewing distance Wc is calculated by the following Mathematical Formula (7).

$$Wc = WD0 \cdot E/E0 \quad (7)$$

Then, the optimal viewing distance determination unit 103 obtains WD0·E/E0 as the optimal viewing distance Wc.

Furthermore, the optimal viewing distance determination unit 103 acquires the current viewing distance W from the observation condition acquisition unit 44 every predetermined time, and decides whether or not the acquired current viewing distance W is the optimal viewing distance Wc. Specifically, the optimal viewing distance determination unit 103 decides whether or not an absolute value of difference between the current viewing distance W and the optimal viewing distance Wc has become equal to or less than a predetermined threshold value. The threshold value is set to, for example, a maximum value of an absolute value of difference between the optimal viewing distance Wc and a value that can be regarded as coinciding with the optimal viewing distance Wc.

When deciding that the current viewing distance W is the optimal viewing distance Wc, the optimal viewing distance determination unit 103 gives an optimal viewing distance notification to the depth distortion information generation unit 102.

Note that not only in a case where an observer moves and changes the viewing distance W, but also in a case where the current viewing distance W becomes the optimal viewing distance Wc by a user or the like changing the base length 2·E0 or working distance WD0 of the image shooting unit 21, the optimal viewing distance determination unit 103 gives an optimal viewing distance notification to the depth distortion information generation unit 102.

Figure 23:
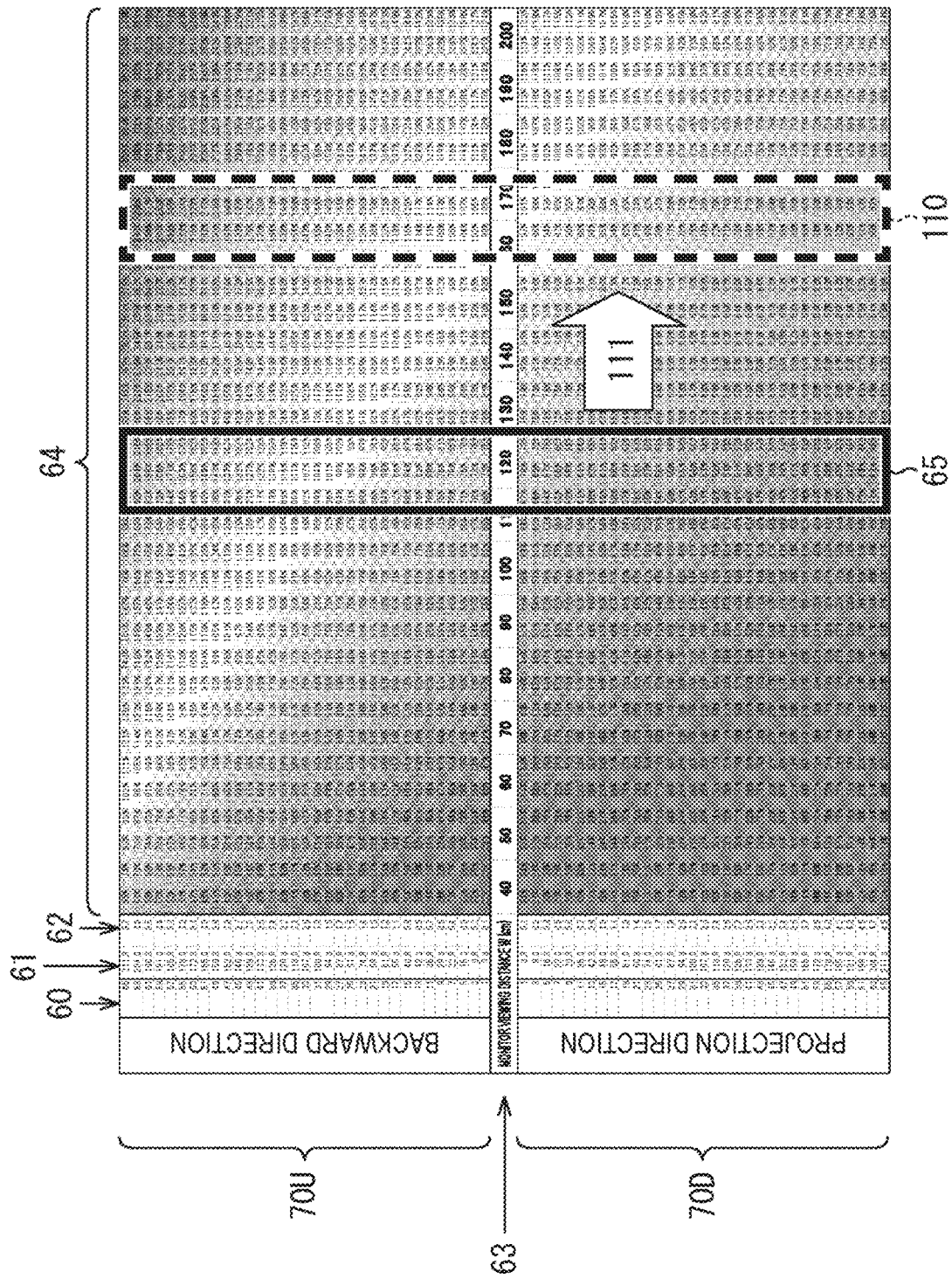
FIG. 23 is a diagram illustrating a form in which optimal viewing distance notification information is added to the depth distortion information.

When the optimal viewing distance notification is given from the optimal viewing distance determination unit 103, the depth distortion information generation unit 102 adds optimal viewing distance notification information to a depth distortion map (depth distortion information), the optimal viewing distance notification information notifying the observer that the current viewing distance W is optimal. As the optimal viewing distance notification information, for example, the depth distortion information generation unit 102 switches a form of a frame 110 surrounding a column of the current viewing distance W as illustrated in FIG. 23 to a form different from an emphasis frame 65 displayed in a case where the current viewing distance W is not the optimal viewing distance Wc. The frame 110 is different from the normal emphasis frame 65 in a display form such as line thickness and color.

Furthermore, the depth distortion information generation unit 102 may add literal information such as "optimal viewing distance" to the depth distortion information as the optimal viewing distance notification information.

Furthermore, the depth distortion information generation unit 102 may add, to the depth distortion information, a guide image such as an arrow 111 in FIG. 23 indicating a direction of the optimal viewing distance Wc with respect to the current viewing distance W.

Furthermore, the depth distortion information generation unit 102 may generate the second form of the depth distortion information illustrated in FIG. 18 and the like. As the optimal viewing distance notification information in this case, the depth distortion information generation unit 102 may switch color of an entire image of the depth distortion information to a color different from a normal color, or may add literal information such as "optimal viewing distance" to the depth distortion information as the optimal viewing distance notification information.

<Processing Procedure of Depth Distortion Information Generation Unit and Optimal Viewing Distance Determination Unit in Second Embodiment of Surgical Image Display System>

Figure 24:
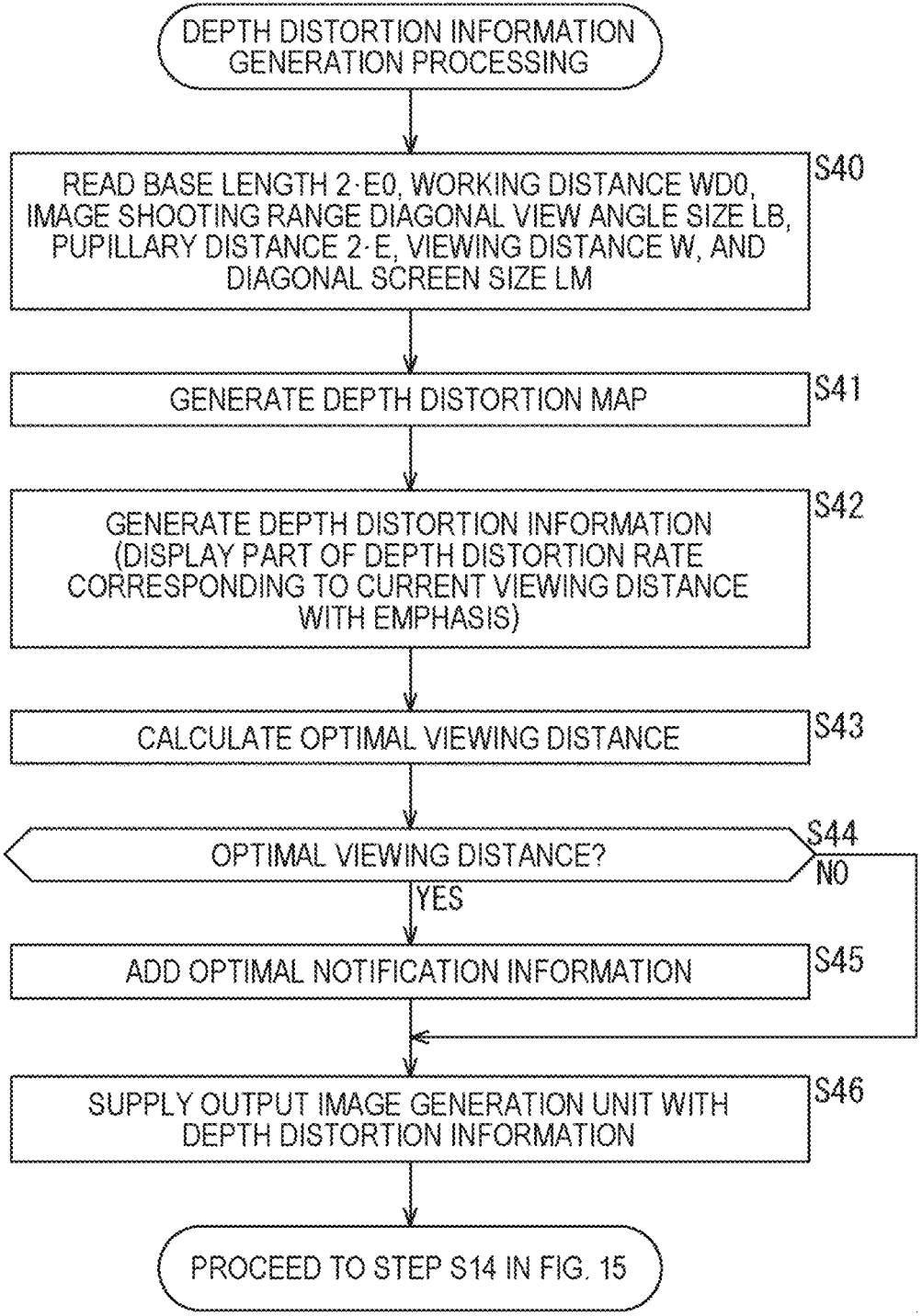
FIG. 24 is a flowchart illustrating an example of processing of depth distortion information generation performed by the depth distortion information generation unit and optimal viewing distance determination unit of the image processing unit in the second embodiment of the surgical image display system.

FIG. 24 is a flowchart illustrating an example of processing of depth distortion information generation performed by the depth distortion information generation unit 102 and optimal viewing distance determination unit 103 of the image processing unit 101 in the second embodiment of the surgical image display system.

Note that processing in the second embodiment of the surgical image display system is performed in the same procedure as in the flowchart in FIG. 15, and the processing in flowchart in FIG. 24 is performed in Step S13 in FIG. 15.

When the processing proceeds from Step S12 to Step S13 in FIG. 15, in Step S40 in FIG. 24, the depth distortion information generation unit 102 reads the base length 2·E0, working distance WD0, and image shooting range diagonal view angle size LB from the image shooting condition acquisition unit 43, and reads the pupillary distance 2·E, the viewing distance W, and diagonal screen size LM from the observation condition acquisition unit 44. The processing proceeds from Step S40 to Step S41.

In Step S41, the depth distortion information generation unit 102 generates a depth distortion map (refer to FIG. 12) on the basis of the base length 2·E0, working distance WD0, image shooting range diagonal view angle size LB, pupillary distance 2·E, and diagonal screen size LM read in Step S40. The processing proceeds from Step S41 to Step S42.

In Step S42, on the basis of the viewing distance W read in Step S40, the depth distortion information generation unit 102 generates depth distortion information (refer to FIG. 14) in which a display part of a depth distortion rate corresponding to the viewing distance W on the depth distortion map is emphasized. The processing proceeds from Step S42 to Step S43.

In Step S43, the optimal viewing distance determination unit 103 acquires the base length 2·E0 and working distance WD0 from the image shooting condition acquisition unit 43, acquires the pupillary distance 2·E from the observation condition acquisition unit 44, and obtains, by using the above Mathematical Formula (7), an optimal viewing distance Wc on the basis of the acquired base length 2·E0, working distance WD0, and pupillary distance 2·E. The processing proceeds from Step S43 to Step S44.

In Step S44, the optimal viewing distance determination unit 103 reads the current viewing distance W from the observation condition acquisition unit 44, and decides whether or not the current viewing distance W is the optimal viewing distance Wc obtained in Step S43.

In a case where it is decided in Step S44 that the current viewing distance W is the optimal viewing distance Wc, an optimal viewing distance notification is given from the optimal viewing distance determination unit 103 to the depth distortion information generation unit 102. Then, the processing proceeds to Step S45, and the depth distortion information generation unit 102 generates depth distortion information obtained by adding the optimal viewing distance notification information to the depth distortion map as in the frame 110 in FIG. 23. The processing proceeds to Step S46.

Furthermore, in a case where it is decided in Step S44 that the current viewing distance W is not the optimal viewing distance, the processing skips Step S45 and proceeds to Step S46.

In Step S46, the depth distortion information generation unit 102 supplies the output image generation unit 45 with the depth distortion information generated in Step S42 or the depth distortion information to which the optimal notification information is added in Step S45. The processing proceeds from Step S46 to Step S14 in FIG. 15.

Figure 25:
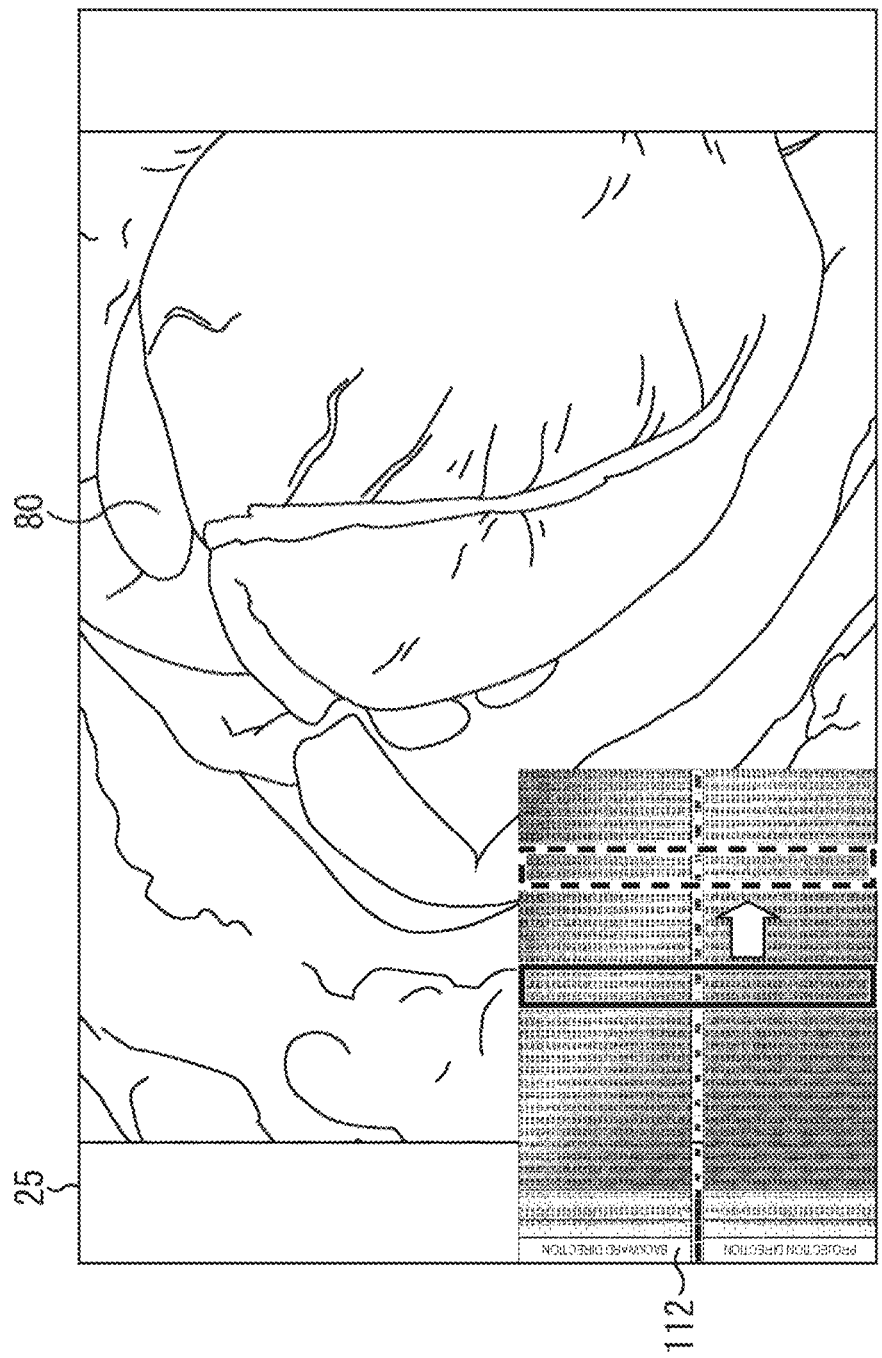
FIG. 25 is a diagram illustrating an example in which the depth distortion information in FIG. 23 is superimposed on a three-dimensional image of an observation region.

With this arrangement, as illustrated in FIG. 25, the three-dimensional image 80 obtained by shooting an image of the observation region, and depth distortion information 112 to which optimal viewing distance normal information is added are displayed on the display surface SM of the three-dimensional display unit 25.

According to the second embodiment of the surgical image display system described above, the observer who is stereoscopically viewing the three-dimensional image displayed on the three-dimensional display unit 25 can, on the basis of the depth distortion information, grasp the magnitude of the depth distortion that has occurred in the stereoscopic image space, by which grasping of the distance in the depth direction by the observer is assisted (facilitated). Furthermore, it is easy for the observer to adjust a position of the observer or a position of the three-dimensional display unit 25, or adjust the base length 2·E0 and working distance WD0 of the image shooting unit 21 to set the optimal viewing distance.

<<Third Embodiment of Surgical Image Display System>>

Figure 26:
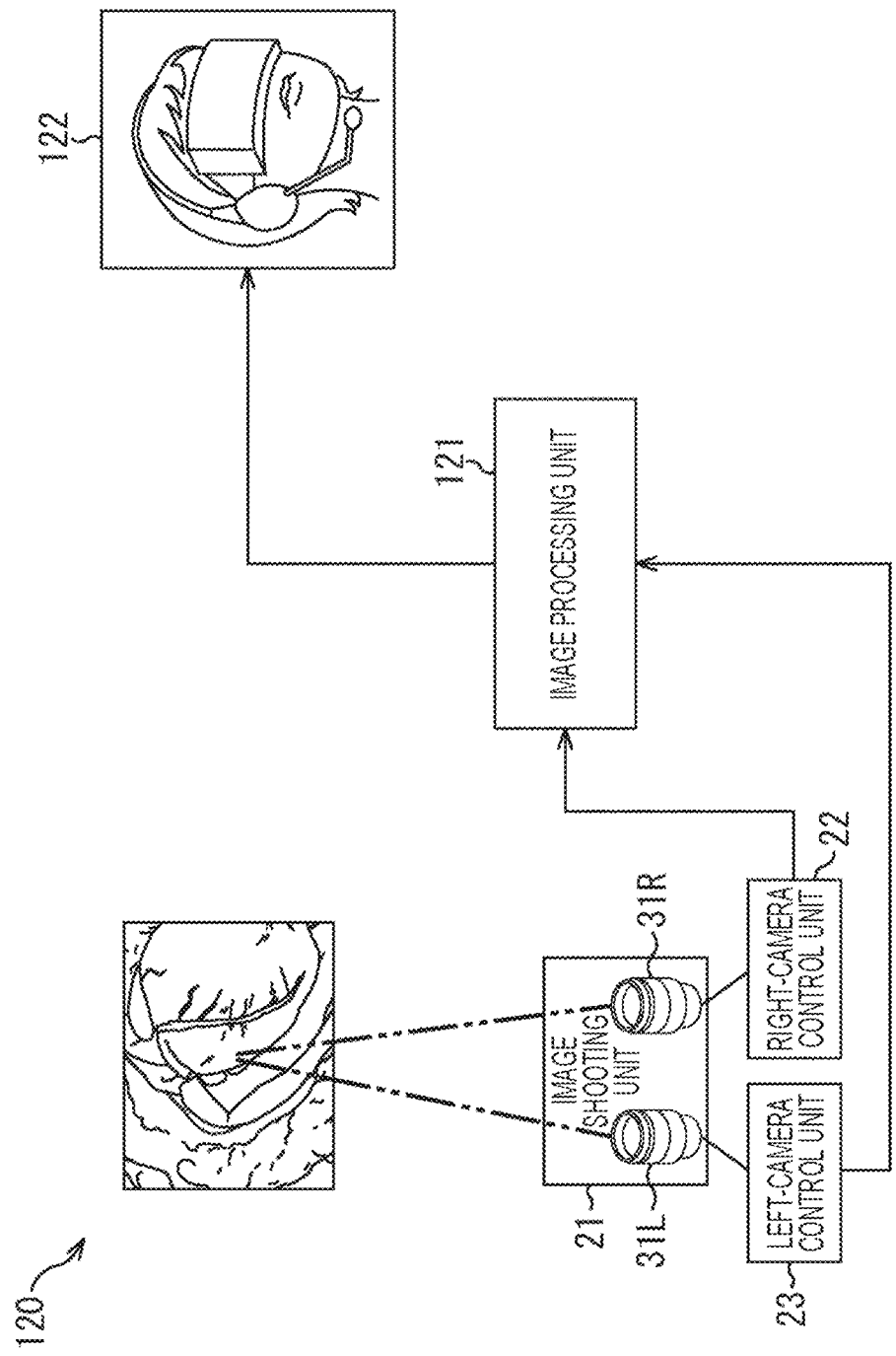
FIG. 26 is a block diagram illustrating a configuration example of a third embodiment of the surgical image display system.

FIG. 26 is a block diagram illustrating a configuration example of a third embodiment of the surgical image display system.

Note that, in the drawings, the parts corresponding to the parts in the surgical image display system 11 in FIG. 1 are provided with the same reference signs, and description of the corresponding parts will be omitted as appropriate.

A surgical image display system 120 in FIG. 26 has an image shooting unit 21, a right-camera control unit 22, a left-camera control unit 23, an image processing unit 121, and a head-mounted display (HMD) 122.

Therefore, the surgical image display system 120 in FIG. 23 is common to the surgical image display system 11 in FIG. 1 in having the image shooting unit 21, the right-camera control unit 22, and the left-camera control unit 23. However, the surgical image display system 120 in FIG. 26 is different from the surgical image display system 11 in FIG. 1 in that the image processing unit 121 and the HMD 122 are provided instead of the image processing unit 24 and three-dimensional display unit 25 of the surgical image display system 11 in FIG. 1, and that the viewpoint detection sensor 26 in FIG. 1 is not provided.

In FIG. 26, the HMD 122 is a form of the three-dimensional display unit 25 in FIG. 1, is worn on a head of the observer, and displays the three-dimensional image (right-eye image and left-eye image) of the observation region supplied from the image processing unit 121 stereoscopically viewable.

Furthermore, the HMD 122 has a function of changing the viewing distance W from eyes of the observer to a display surface (virtual screen) in a stereoscopic image space on the basis of an external signal. Note that, in addition to the HMD 122, the third embodiment of the surgical image display system can adopt a three-dimensional display unit capable of displaying a three-dimensional image stereoscopically viewable and changing a viewing distance from the eyes of the observer to the display surface by changing a position of the display surface in a depth direction on the basis of an external signal.

<Configuration of Image Processing Unit in Third Embodiment of Surgical Image Display System>

Figure 27:
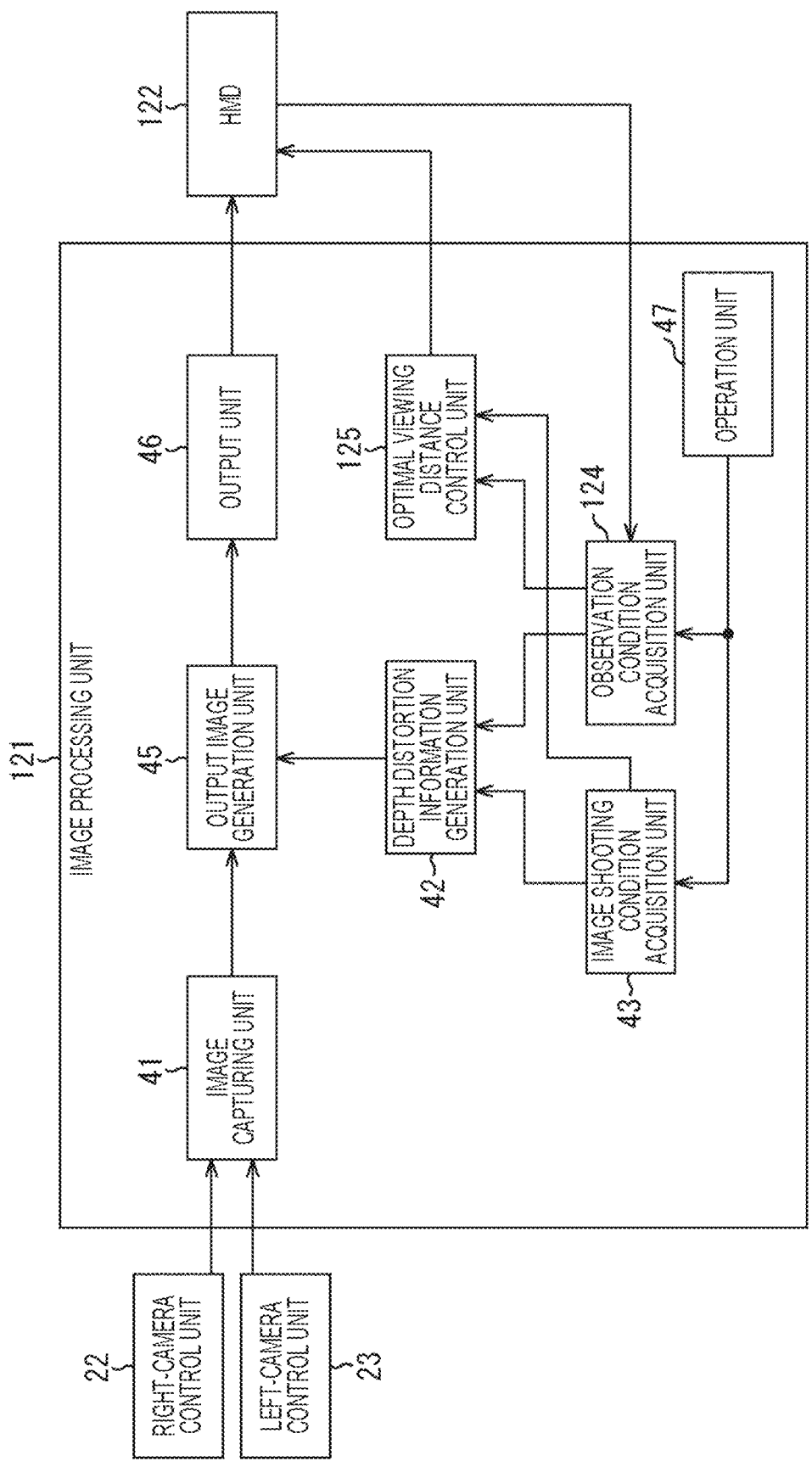
FIG. 27 is a block diagram illustrating a configuration example of an image processing unit in the third embodiment of the surgical image display system.

FIG. 27 is a block diagram illustrating a configuration example of the image processing unit 121 in FIG. 26. Note that, in the drawings, the parts corresponding to the parts in the image processing unit 24 in FIG. 2 are provided with the same reference signs, and description of the corresponding parts will be omitted as appropriate.

The image processing unit 121 in FIG. 27 has an image capturing unit 41, a depth distortion information generation unit 42, an image shooting condition acquisition unit 43, an observation condition acquisition unit 124, an output image generation unit 45, an output unit 46, an operation unit 47, and an optimal viewing distance control unit 125. Therefore, the image processing unit 121 in FIG. 27 is common to the image processing unit 24 in FIG. 2 in having the image capturing unit 41, the depth distortion information generation unit 42, the image shooting condition acquisition unit 43, the output image generation unit 45, the output unit 46, and the operation unit 47. However, the image processing unit 121 in FIG. 27 is different from the image processing unit 24 in FIG. 2 in that the observation condition acquisition unit 124 is provided instead of the observation condition acquisition unit 44 in FIG. 2, and that the optimal viewing distance control unit 125 is newly provided.

The observation condition acquisition unit 124 acquires the viewing distance W of the observer and a diagonal screen size LM of a display surface SM (virtual screen) from the HMD 122, and acquires a pupillary distance 2·E of the observer, the pupillary distance 2·E being input by a user operating the operation unit 47. Note that the observation condition acquisition unit 124 may also acquire the pupillary distance 2·E from the HMD 122.

The optimal viewing distance control unit 125 acquires the base length 2·E0 and working distance WD0 from the image shooting condition acquisition unit 43, and acquires the pupillary distance 2·E from the observation condition acquisition unit 124. Similarly to the optimal viewing distance determination unit 103 (refer to FIG. 22) in the second embodiment of the surgical image display system, the optimal viewing distance control unit 125 calculates the optimal viewing distance Wc with WD0·E/E0 on the basis of the acquired base length 2·E0, working distance WD0, and pupillary distance 2·E.

Then, the optimal viewing distance control unit 125 gives the calculated optimal viewing distance Wc to the HMD 122 as an external signal (viewing distance target value), and sets the viewing distance W of the HMD 122 to the optimal viewing distance Wc.

However, in a case where the optimal viewing distance Wc is not a value within the range of the viewing distance W that can be adjusted in the HMD 122, the optimal viewing distance control unit 125 sets a value closer to the optimal viewing distance Wc among the lower limit value and the upper limit value of the range of the adjustable viewing distance W as the optimal viewing distance Wc.

<Processing Procedure of Depth Distortion Information Generation Unit and Optimal Viewing Distance Control Unit in Third Embodiment of Surgical Image Display System>

Figure 28:
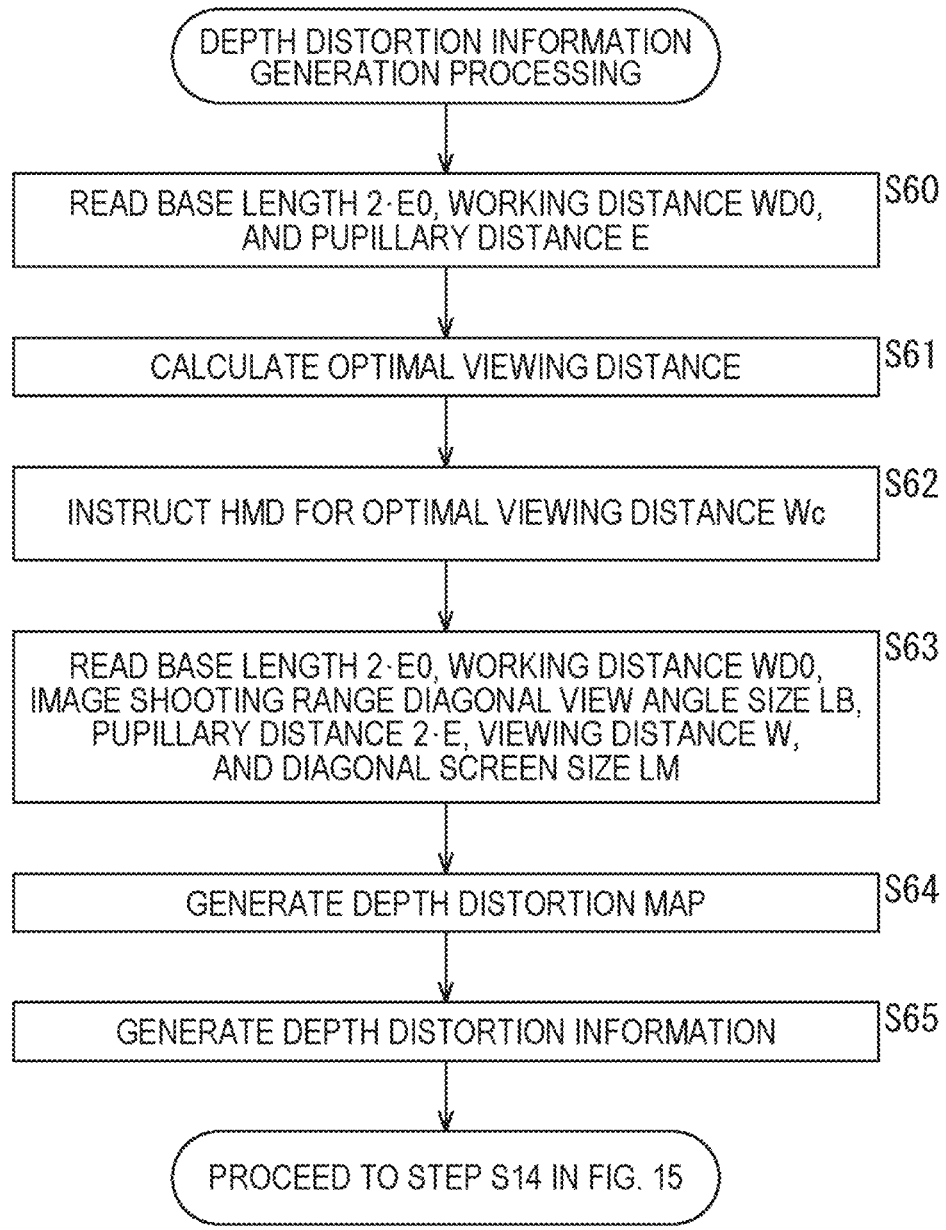
FIG. 28 is a flowchart illustrating an example of processing of depth distortion information generation performed by a depth distortion information generation unit and optimal viewing distance determination unit of the image processing unit in the third embodiment of the surgical image display system.

FIG. 28 is a flowchart illustrating an example of processing of depth distortion information generation and viewing distance control performed by the depth distortion information generation unit 42 and optimal viewing distance control unit 125 of the image processing unit 121 in the third embodiment of the surgical image display system.

Note that processing in the second embodiment of the surgical image display system is performed in the same procedure as in the flowchart in FIG. 15, and the processing in flowchart in FIG. 28 is performed in Step S13 in FIG. 15. In Step S12 in FIG. 15, the observation condition acquisition unit 124 acquires the viewing distance W of the observer and a diagonal screen size LM (diagonal length of a region where the three-dimensional image is displayed) of a display surface SM (virtual screen) from the HMD 122, and acquires a pupillary distance 2·E of the observer, the pupillary distance 2·E being input by a user operating the operation unit 47.

When the processing proceeds from Step S12 to Step S13 in FIG. 15, in Step S60 in FIG. 28, the optimal viewing distance control unit 125 reads the base length 2·E0 and working distance WD0 from the image shooting condition acquisition unit 43, and reads the pupillary distance 2·E from the observation condition acquisition unit 124. The processing proceeds from Step S60 to Step S61.

In Step S61, the optimal viewing distance control unit 125 obtains, by using the above Mathematical Formula (7), an optimal viewing distance Wc on the basis of the base length 2·E0, working distance WD0, and pupillary distance 2·E read in Step S61. The processing proceeds from Step S61 to Step S62.

In Step S62, the optimal viewing distance control unit 125 gives the optimal viewing distance Wc obtained in Step S61 to the HMD 122 as the viewing distance target value (external signal). With this arrangement, the viewing distance is set to the optimal viewing distance Wc in the HMD 122. The processing proceeds from Step S62 to Step S63.

In Step S63, the depth distortion information generation unit 42 reads the base length 2·E0, working distance WD0, and image shooting range diagonal view angle size LB from the image shooting condition acquisition unit 43, and reads the pupillary distance 2·E, the viewing distance W, and diagonal screen size LM from the observation condition acquisition unit 124. The processing proceeds from Step S63 to Step S64.

In Step S64, the depth distortion information generation unit 42 generates a depth distortion map (refer to FIG. 12) on the basis of the base length 2·E0, working distance WD0, image shooting range diagonal view angle size LB, pupillary distance E, and diagonal screen size LM read in Step S63. The processing proceeds from Step S64 to Step S65.

In Step S65, the depth distortion information generation unit 42 generates depth distortion information (refer to FIG. 14) in which a display part of a depth distortion rate corresponding to the viewing distance W read in Step S63 is emphasized on the depth distortion map. The generated depth distortion information is supplied from the depth distortion information generation unit 42 to the output image generation unit 45. The processing proceeds from Step S64 to Step S14 in FIG. 15.

Note that the three-dimensional image and depth distortion information displayed on the HMD 122 in the third embodiment of the surgical image display system are the same as the display image illustrated in FIG. 16 in a case of the first embodiment of the surgical image display system. Furthermore, the depth distortion information generation unit 42 may generate the second form of the depth distortion information illustrated in FIG. 18 and the like.

According to the third embodiment of the surgical image display system described above, the observer who is stereoscopically viewing the three-dimensional image displayed on the HMD 122 can, on the basis of the depth distortion information, grasp the magnitude of the depth distortion that has occurred in the stereoscopic image space, by which grasping of the distance in the depth direction by the observer is assisted (facilitated). Furthermore, the display surface (virtual screen) in the HMD 122 is automatically set at a position where an optimal viewing distance is obtained.

<<Fourth Embodiment of Surgical Image Display System>>

Figure 29:
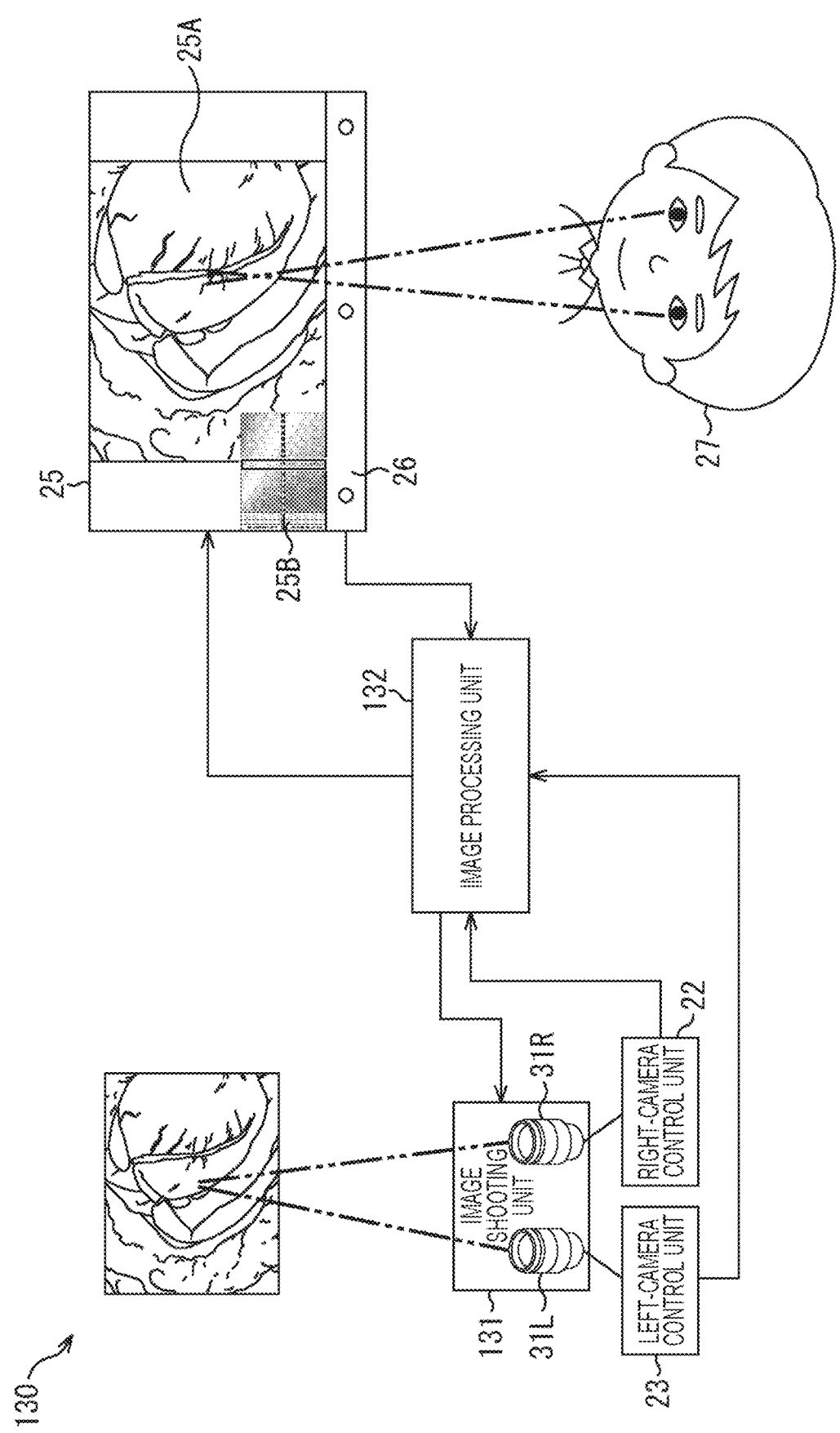
FIG. 29 is a block diagram illustrating a configuration example of a fourth embodiment of the surgical image display system.

FIG. 29 is a block diagram illustrating a configuration example of a fourth embodiment of the surgical image display system.

Note that, in the drawings, the parts corresponding to the parts in the surgical image display system 11 in FIG. 1 are provided with the same reference signs, and description of the corresponding parts will be omitted as appropriate.

A surgical image display system 130 in FIG. 29 has an image shooting unit 131, a right-camera control unit 22, a left-camera control unit 23, an image processing unit 132, a three-dimensional display unit 25, and a viewpoint detection sensor 26. Therefore, the surgical image display system 130 in FIG. 29 is common to the surgical image display system 11 in FIG. 1 in having the right-camera control unit 22, the left-camera control unit 23, the three-dimensional display unit 25, and the viewpoint detection sensor 26. However, the surgical image display system 130 in FIG. 29 is different from the surgical image display system 11 in FIG. 1 in that the image shooting unit 131 and the image processing unit 132 are provided instead of the image shooting unit 21 and image processing unit 24 of the surgical image display system 11 in FIG. 1, respectively.

Figure 30:
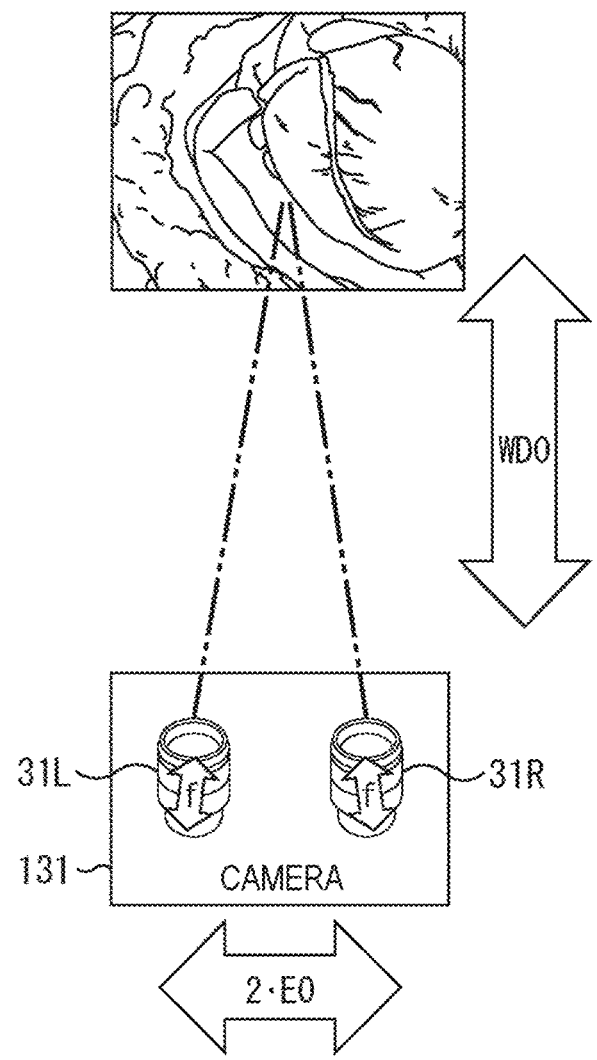
FIG. 30 is a diagram for describing operation of an image shooting unit.

FIG. 30 is a diagram describing a form of the image shooting unit 131. As illustrated in FIG. 30, the image shooting unit 131 has a right camera 31R and a left camera 31L. Furthermore, the image shooting unit 131 changes the base length 2·E0, the working distance WD0, and the image shooting range diagonal view angle size LB (focal length f) according to an external signal from the image processing unit 132.

Figure 31:
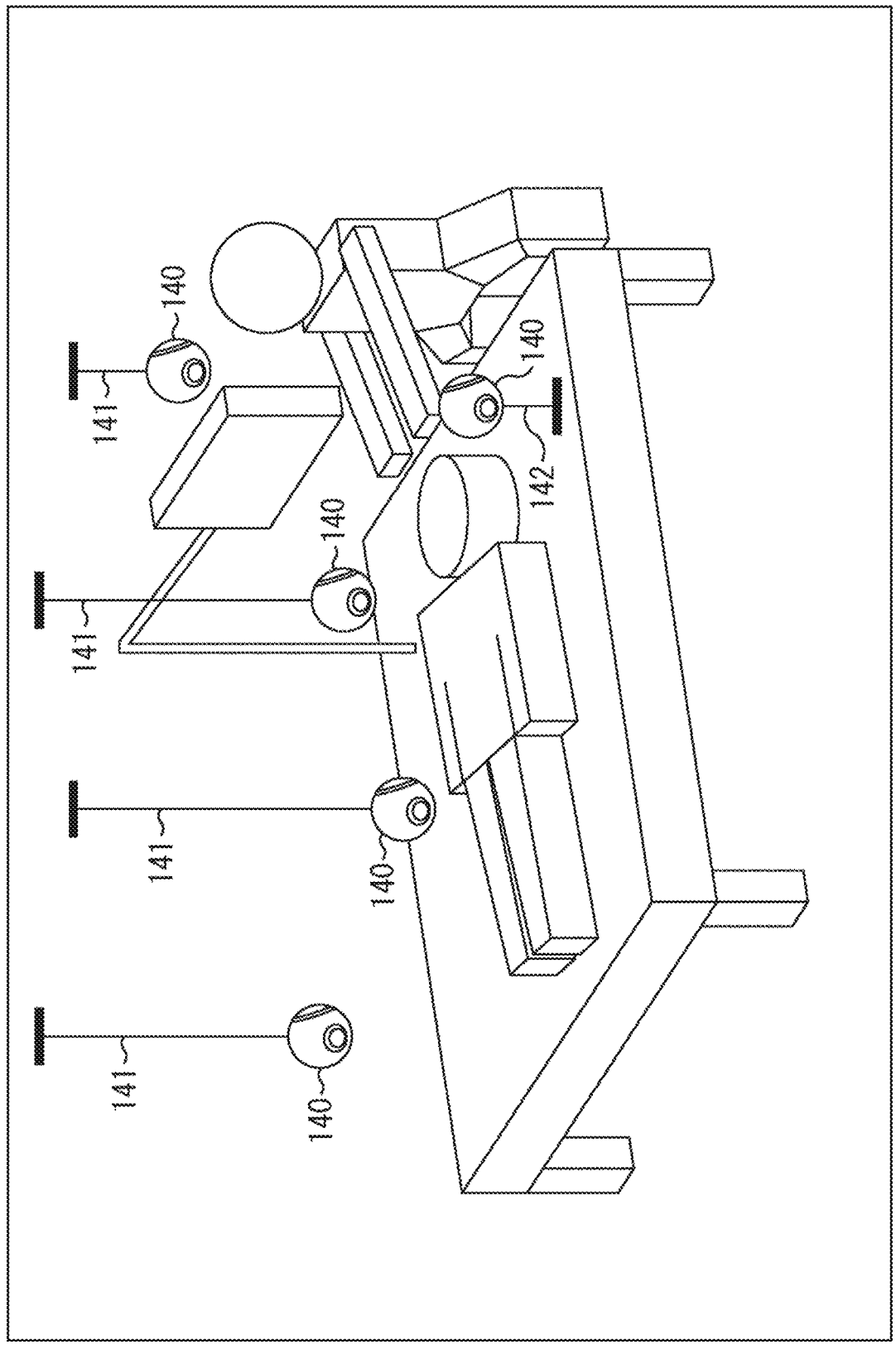
FIG. 31 is a diagram describing a form of the image shooting unit.

FIG. 31 is a diagram illustrating another form of the image shooting unit 131. The image shooting unit 131 in FIG. 31 has a plurality of cameras 140 that has a spherical shape and is disposed in an operating room. Each of the cameras 140 is suspended on a wire 141 from a ceiling or supported by an arm 142 extending upward from an operating table or the like.

Each of the cameras 140 suspended on a wire 141 moves in a space by the wire 141 moving along a rail on the ceiling and by winding up and unwinding the wire 141. Each of the cameras 140 supported by an arm 142 moves in the space by the arm 142 moving along a rail on the operating table or the like, or by the arm 142 extending or contracting or moving up or down.

Note that each of the cameras 140 may move in the space by flight like a drone and may be able to hover at a desired position.

Furthermore, each of the cameras 140 can change an image shooting direction and a focal length (zoom magnification). A three-dimensional image can be acquired by selecting two desired cameras 140, setting lines of sight of the selected two cameras 140 in a direction along the same plane, and performing image shooting.

Figure 32:
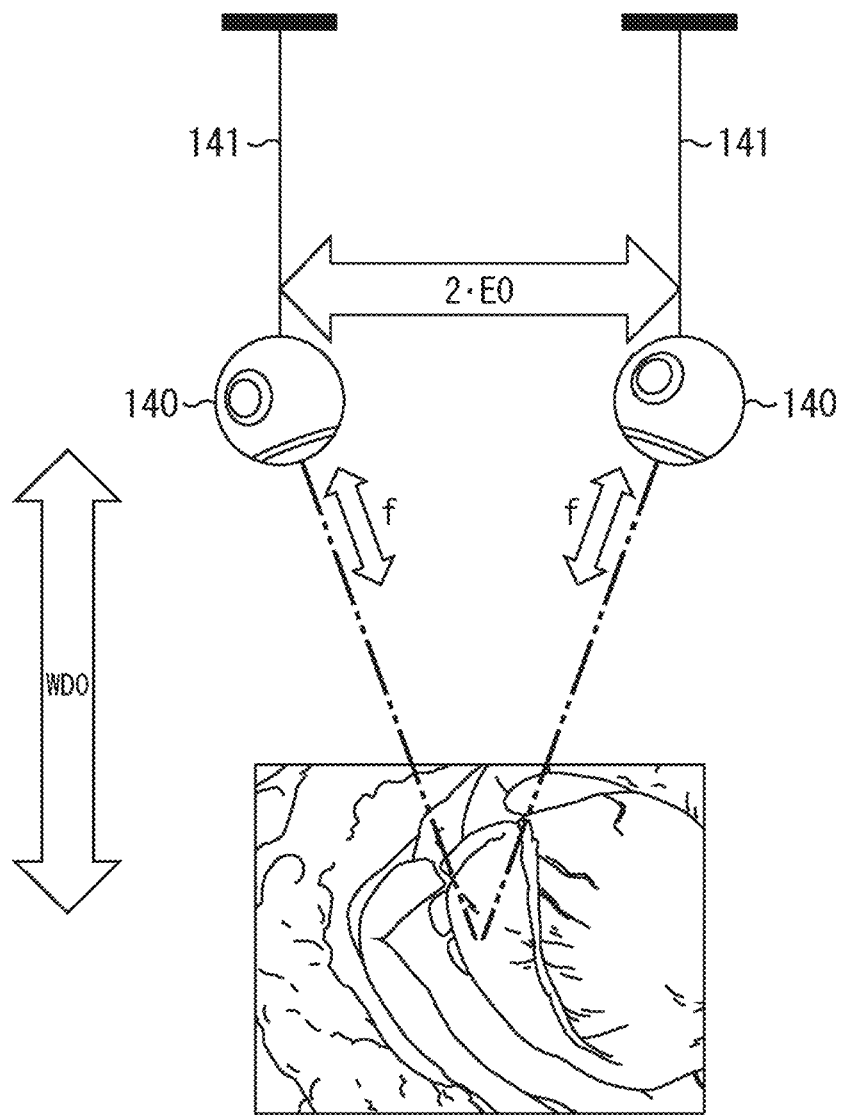
FIG. 32 is a diagram describing a form of the image shooting unit.

Furthermore, as illustrated in FIG. 32, the base length 2·E0 and the working distance WD0 can be changed by changing positions of the two selected cameras 140, and the image shooting range diagonal view angle size LB can be changed by changing the focal length f of the camera 140.

<Configuration Example of Image Processing Unit in Fourth Embodiment of Surgical Image Display System>

Figure 33:
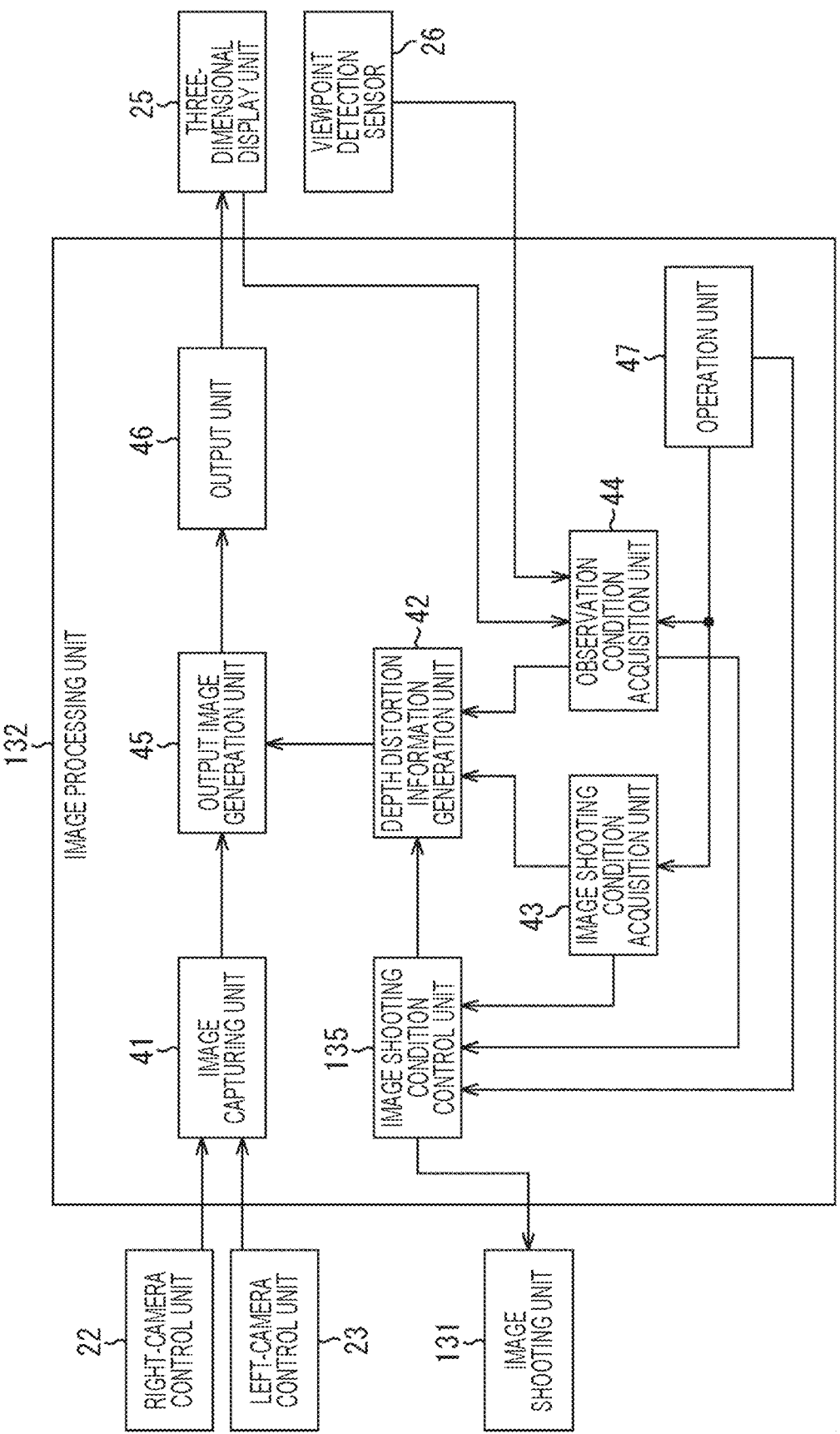
FIG. 33 is a block diagram illustrating a configuration example of an image processing unit in the fourth embodiment of the surgical image display system.

FIG. 33 is a block diagram illustrating a configuration example of the image processing unit 132 in the surgical image display system 130 in FIG. 29. Note that, in the drawings, the parts corresponding to the parts in the image processing unit 24 in FIG. 2 are provided with the same reference signs, and description of the corresponding parts will be omitted as appropriate.

The image processing unit 132 in FIG. 33 is provided instead of the image processing unit 24 of the surgical image display system 11 in FIG. 1, and has an image capturing unit 41, a depth distortion information generation unit 42, an image shooting condition acquisition unit 43, an observation condition acquisition unit 44, an output image generation unit 45, an output unit 46, an operation unit 47, and an image shooting condition control unit 135. Therefore, the image processing unit 132 in FIG. 33 is common to the image processing unit 24 in FIG. 2 in having the image capturing unit 41, the depth distortion information generation unit 42, the image shooting condition acquisition unit 43, the observation condition acquisition unit 44, the output image generation unit 45, the output unit 46, and the operation unit 47. However, the image processing unit 132 in FIG. 33 is different from the image processing unit 24 in FIG. 2 in that the image shooting condition control unit 135 is newly provided.

The image shooting condition control unit 135 acquires a desired enlargement magnification A designated by a user from the operation unit 47.

The enlargement magnification A is expressed by the above Mathematical Formula (6), and the image shooting range diagonal view angle size LB, which is an element of an image shooting condition, is expressed by the following Mathematical Formula (8) by modifying the above Mathematical Formula (6). Note that Ac in the Mathematical Formula is an enlargement magnification A designated by the user.

$$LB = LM/(Ac \cdot E/E0) \qquad (8)$$

Because the image shooting range diagonal view angle size LB is expressed generally by a function G (f, WD0) having the focal length f (zoom magnification) of the image shooting unit 131 and a working distance WD0 as variables, the above Mathematical Formula (8) is expressed by the following Mathematical Formula (9).

$$LM/(Ac \cdot E) = G(f, WD0)/E0 \qquad (9)$$

Mathematical Formula (9) indicates that the enlargement magnification A can be set to an enlargement magnification Ac designated by the user by adjusting at least one of the focal length f, working distance WD0, or base length 2·E0 of the image shooting unit 131, which are elements of image shooting conditions.

Furthermore, the image shooting condition control unit 135 reads the pupillary distance 2·E and the viewing distance W from the observation condition acquisition unit 44. Then, the image shooting condition control unit 135 obtains an image shooting condition for setting the enlargement magnification A to the enlargement magnification Ac designated by the user, and simultaneously, obtains an image shooting condition for setting the current viewing distance W to the optimal viewing distance Wc.

That is, in a case where the viewing distance W is set to the optimal viewing distance Wc in the above Mathematical Formula (7), the working distance WD0 and the base length 2·E0 are expressed by the following Mathematical Formula (10).

$$WD0/E0 = W/E \quad (10)$$

The image shooting condition control unit 135 sets at least two elements among the focal length f, working distance WD0, and base length 2·E0 of the image shooting unit 131 as control targets, and sets a target value that satisfies Mathematical Formula (9) and Mathematical Formula (10) for the control target elements.

For example, in a case where the focal length f and the base length 2·E0 among the focal length f, working distance WD0, and base length 2·E0 of the image shooting unit 131 are set as the control targets, the image shooting condition control unit 135 calculates 2·E·WD0/W on the basis of Mathematical Formula (10), and sets the calculated value as a target value of the base length 2·E0. In the calculation of the target value of the base length 2·E0, the working distance WD0 is a value read from the image shooting condition acquisition unit 43, and the pupillary distance E and the viewing distance W are values read from the observation condition acquisition unit 44.

Meanwhile, the image shooting condition control unit 135 calculates the focal length f by using Mathematical Formula (9) and sets the calculated value as a target value of the focal length f. In the calculation of the target values of the focal length f, the base length 2·E0 is a target value obtained from Mathematical Formula (10), the working distance WD0 is a value read from the image shooting condition acquisition unit 43, and the pupillary distance 2·E, the viewing distance W, and the diagonal screen size LM are values read from the observation condition acquisition unit 44.

The image shooting condition control unit 135 gives the target values of the elements as control targets among the focal length f, working distance WD0, and base length 2·E0 of the image shooting unit 131 to the image shooting unit 131 as an external signal, and changes states of the control targets to states of the target value.

<Processing Procedure of Depth Distortion Information Generation Unit and Image Shooting Condition Control Unit in Fourth Embodiment of Surgical Image Display System>

Figure 34:
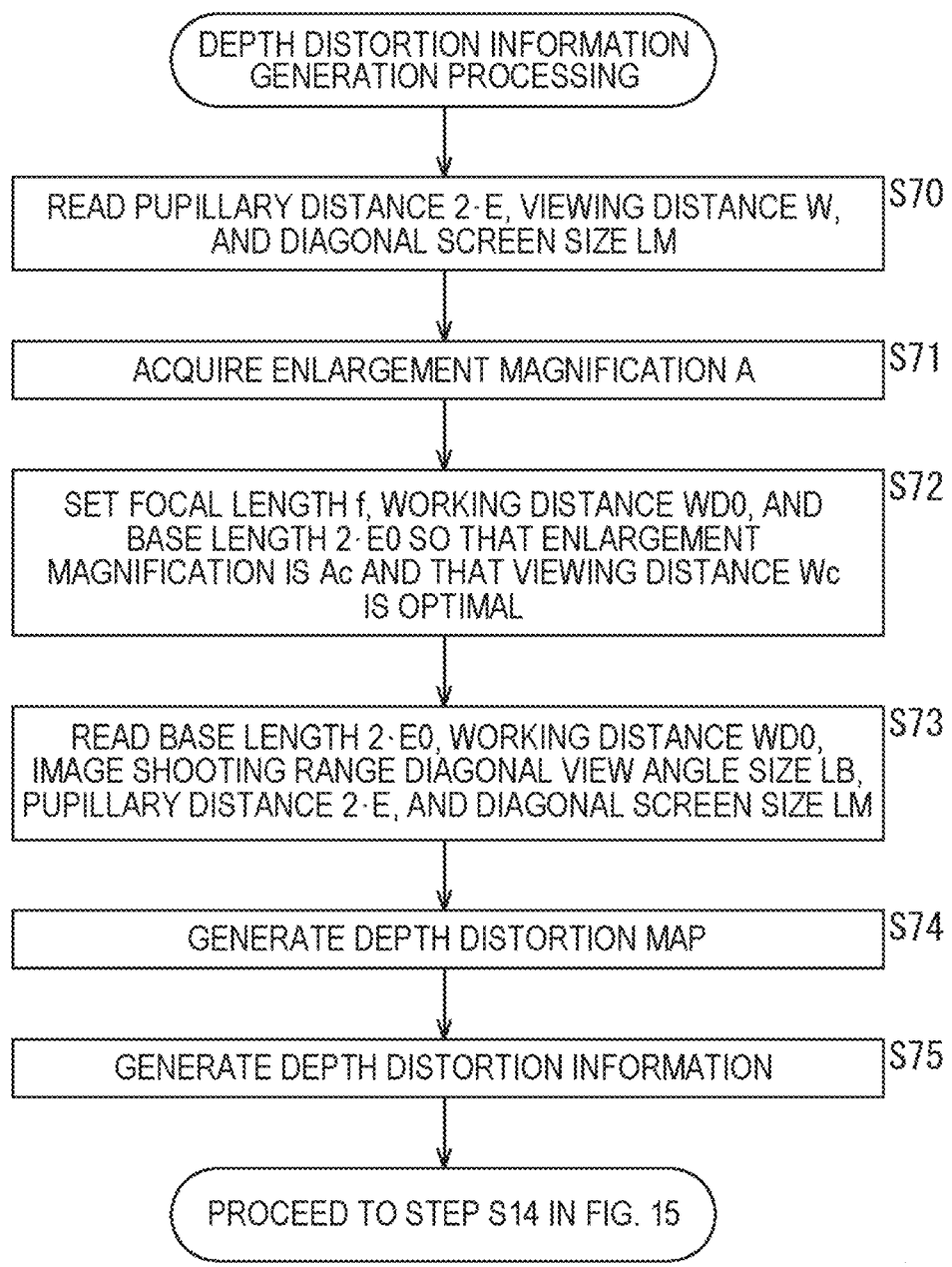
FIG. 34 is a flowchart illustrating an example of processing performed by a depth distortion information generation unit and an image shooting condition control unit of the image processing unit in the fourth embodiment of the surgical image display system.

FIG. 34 is a flowchart illustrating an example of processing of depth distortion information generation and image shooting condition control performed by the depth distortion information generation unit 42 and image shooting condition control unit 135 in the fourth embodiment of the surgical image display system.

Note that overall processing in the fourth embodiment of the surgical image display system is performed in the same procedure as in the flowchart in FIG. 15, and the processing in flowchart in FIG. 34 is performed in Step S13 in FIG. 15.

When the processing proceeds from Step S12 to Step S13 in FIG. 15, in Step S70 in FIG. 34, the image shooting condition control unit 135 reads the pupillary distance 2·E, the viewing distance W, and the diagonal screen size LM from the observation condition acquisition unit 44. The processing proceeds from Step S70 to step S71.

In Step S71, the image shooting condition control unit 135 acquires the enlargement magnification A (Ac) designated by the user. The processing proceeds from Step S71 to Step S72.

In Step S72, the image shooting condition control unit 135 obtains the target values of the focal length f, working distance WD0, and base length 2·E0 so that the enlargement magnification A is Ac and that a current viewing distance W is an optimal viewing distance Wc, on the basis of the pupillary distance 2·E, viewing distance W, and diagonal screen size LM read in Step S70, and on the basis of the enlargement magnification Ac designated by the user and acquired in Step S71.

Note that the image shooting condition control unit 135 may set only any two elements among the focal length f, working distance WD0, and base length 2·E0 as control targets, and may obtain target values. In this case, in Step S70, the image shooting condition control unit 135 also acquires a current value of an element other than the control targets from the image shooting condition acquisition unit 43, and obtains a target value of the control target on the basis of the current value of the element, the pupillary distance 2·E, the viewing distance W, the diagonal screen size LM, and the enlargement magnification Ac.

Then, the image shooting condition control unit 135 gives the obtained target value to the image shooting unit 131. With this arrangement, in the image shooting unit 131, the focal length f, the working distance WD0, and the base length 2·E0 are set to states of the target values given from the image shooting condition control unit 135. The processing proceeds from Step S72 to Step S73.

Note that the image shooting condition control unit 135 may give a target value of the image shooting range diagonal view angle size LB to the image shooting unit 131 instead of a target value of the focal length f.

In Step S73, the depth distortion information generation unit 42 reads the base length 2·E0, working distance WD0, and image shooting range diagonal view angle size LB from the image shooting condition acquisition unit 43, and reads the pupillary distance 2·E, and diagonal screen size LM from the observation condition acquisition unit 44. The processing proceeds from Step S73 to Step S74.

In Step S74, the depth distortion information generation unit 42 generates a depth distortion map (refer to FIG. 12) on the basis of the base length 2·E0, working distance WD0, image shooting range diagonal view angle size LB, pupillary distance 2·E, and diagonal screen size LM read in Step S73. The processing proceeds from Step S74 to Step S75.

In Step S75, the depth distortion information generation unit 42 reads the viewing distance W from the observation condition acquisition unit 44, and generates depth distortion information (refer to FIG. 14) in which a display part of a depth distortion rate corresponding to the viewing distance W on the depth distortion map is emphasized. The generated depth distortion information is supplied to the output image generation unit 45. The processing proceeds from Step S75 to Step S14 in FIG. 15.

Note that the three-dimensional image and depth distortion information displayed on the three-dimensional display unit 25 in the fourth embodiment of the surgical image display system are the same as the display image illustrated in FIG. 16 in a case of the first embodiment of the surgical image display system. Furthermore, the depth distortion information generation unit 42 may generate the second form of the depth distortion information illustrated in FIG. 18 and the like.

According to the fourth embodiment of the surgical image display system described above, the observer who is stereoscopically viewing the three-dimensional image displayed on the three-dimensional display unit 25 can, on the basis of the depth distortion information, grasp the magnitude of the depth distortion that has occurred in the stereoscopic image space, by which grasping of the distance in the depth direction by the observer is assisted (facilitated). Furthermore, image shooting conditions in the image shooting unit 131 is automatically set so that an enlargement magnification of the three-dimensional image designated by the user and optimal viewing distance are achieved.

<<Fifth Embodiment of Surgical Image Display System>>

Figure 35:
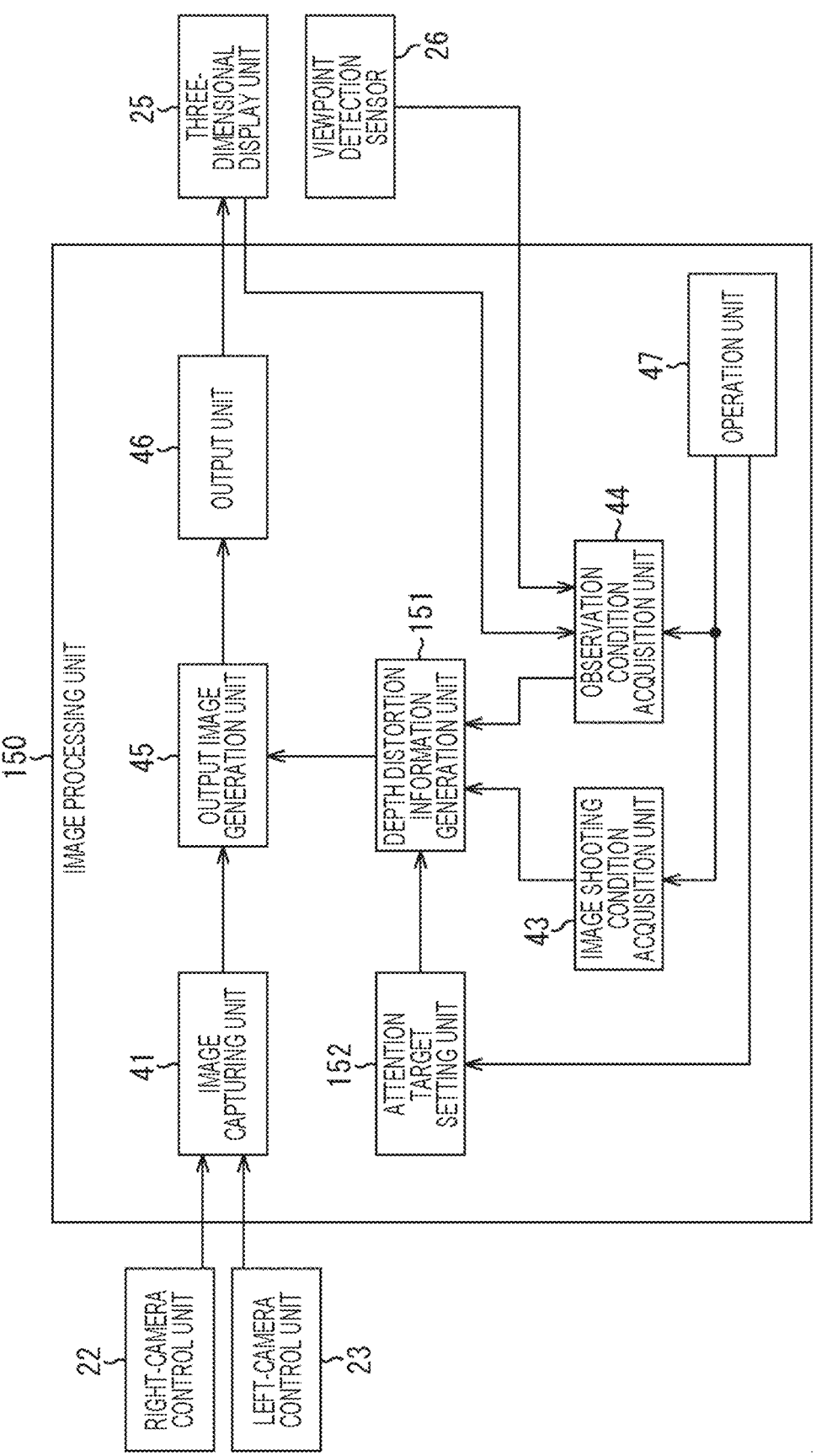
FIG. 35 is a block diagram illustrating a configuration example of an image processing unit in a fifth embodiment of the surgical image display system.

FIG. 35 is a block diagram illustrating a configuration example of an image processing unit 150 in a fifth embodiment of the surgical image display system. Note that, in the drawings, the parts corresponding to the parts in the image processing unit 24 in FIG. 2 are provided with the same reference signs, and description of the corresponding parts will be omitted as appropriate.

The image processing unit 150 in FIG. 35 is provided instead of the image processing unit 24 of the surgical image display system 11 in FIG. 1, and has an image capturing unit 41, a depth distortion information generation unit 151, an image shooting condition acquisition unit 43, an observation condition acquisition unit 44, an output image generation unit 45, an output unit 46, an operation unit 47, and an attention target setting unit 152. Therefore, the image processing unit 150 in FIG. 35 is common to the image processing unit 24 in FIG. 2 in having the image capturing unit 41, the image shooting condition acquisition unit 43, the observation condition acquisition unit 44, the output image generation unit 45, the output unit 46, and the operation unit 47. However, the image processing unit 150 in FIG. 35 is different from the image processing unit 24 in FIG. 2 in that the depth distortion information generation unit 151 is provided instead of the depth distortion information generation unit 42 in FIG. 2, and that the attention target setting unit 152 is newly provided.

The attention target setting unit 152 acquires a predetermined input operation by a user, such as operation of a mouse (pointing device), from the operation unit 47, and, on the basis of the input operation by the user, sets a region of an attention target designated by the user with respect to the three-dimensional image displayed on the three-dimensional display unit 25.

Figure 36:
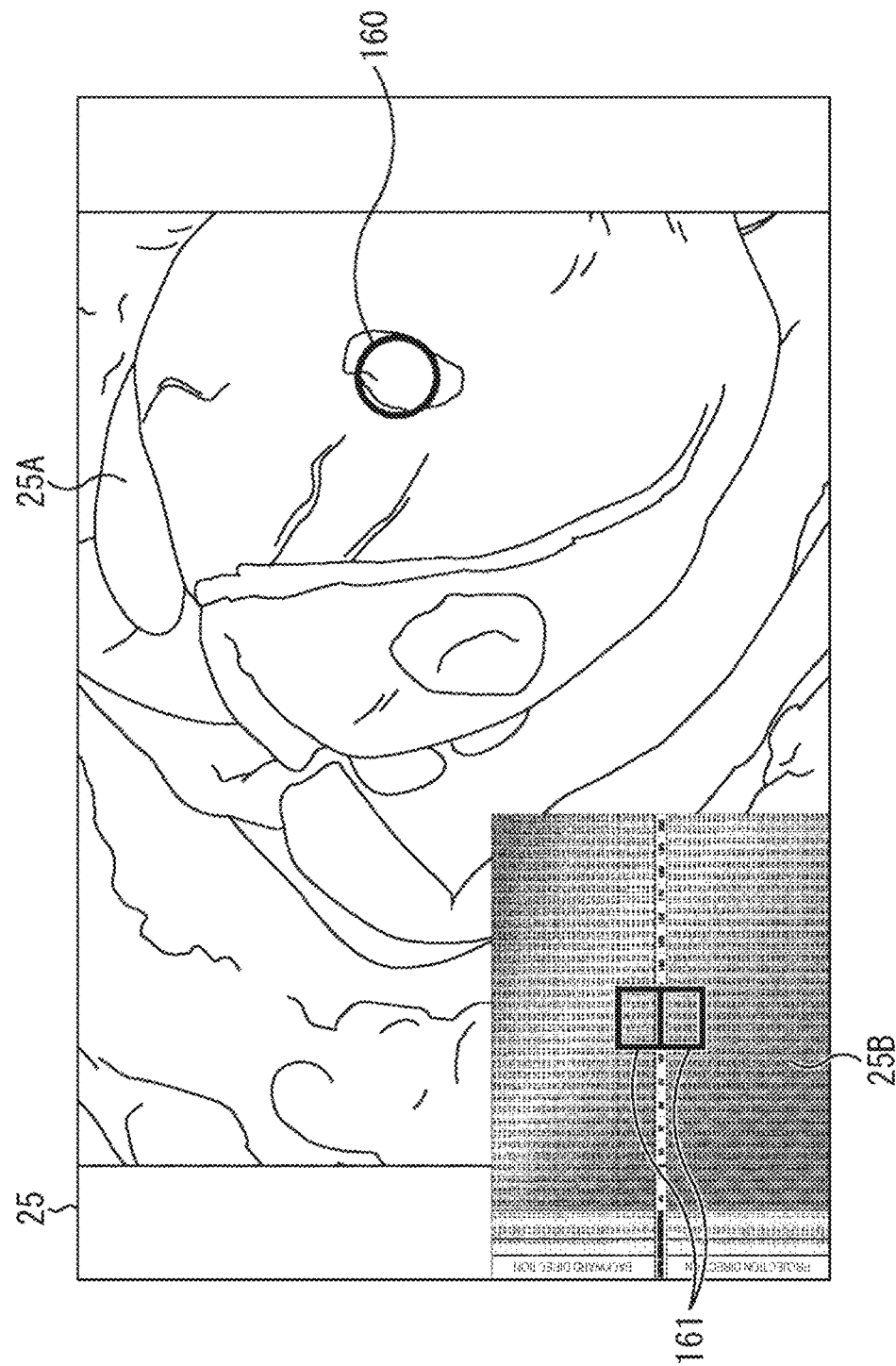
FIG. 36 is a diagram exemplifying a three-dimensional image on which depth distortion information is superimposed in the fifth embodiment of the surgical image display system.

FIG. 36 is a diagram exemplifying the three-dimensional image 25A on which depth distortion information 25B is superimposed, the depth distortion information being displayed on the three-dimensional display unit 25. In FIG. 36, a marker circle 160 indicates a position and area of a region as an attention target, and the area of the region as the attention target is set as a circular area.

When the user performs operation (for example, mouse click operation) of designating a center position of the region as the attention target by operating the operation unit 47, the attention target setting unit 152 in FIG. 35 sets a circular area having a predetermined diameter centered on a designated position as the region as the attention target.

Figure 37:
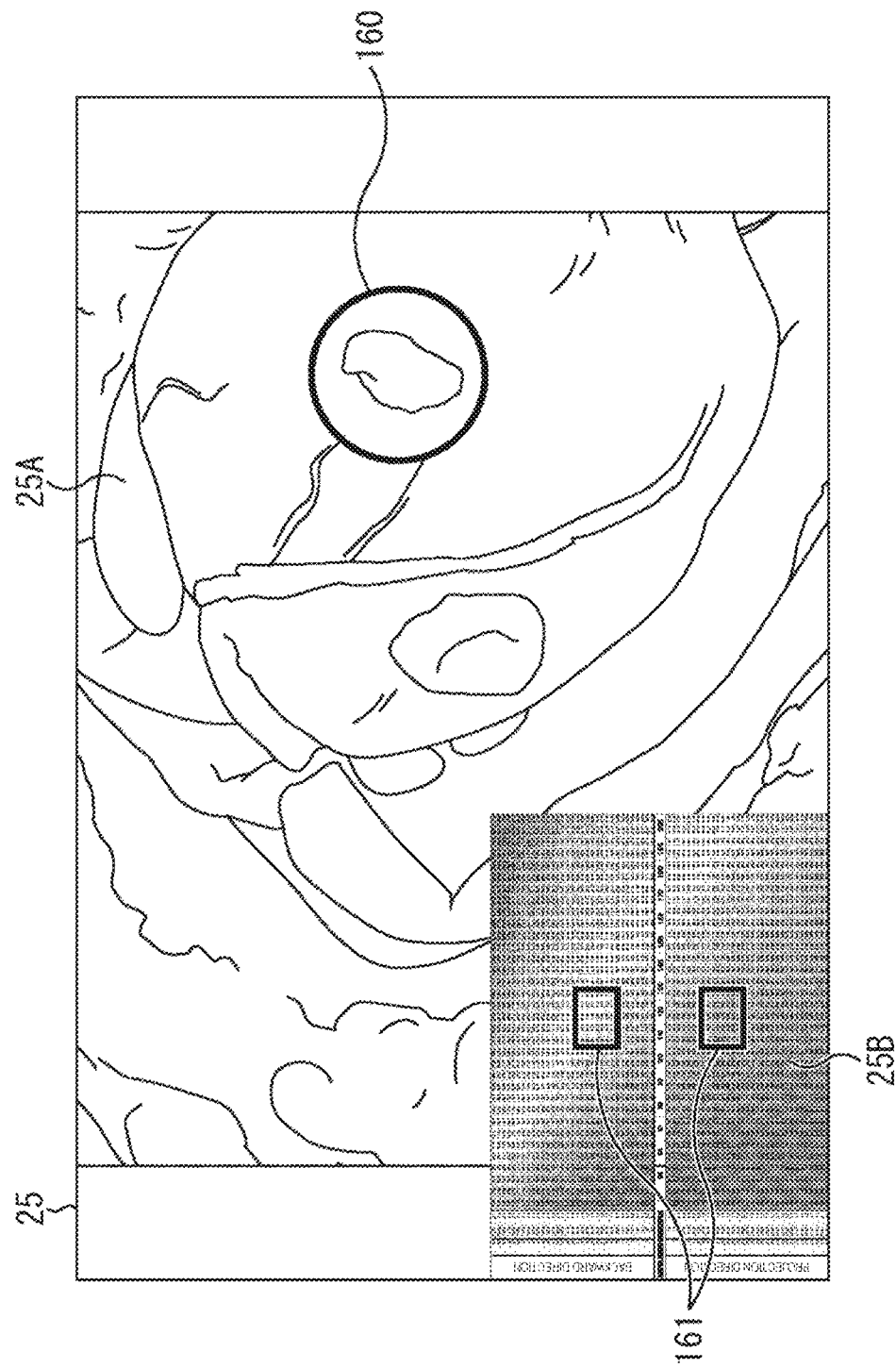
FIG. 37 is a diagram exemplifying the three-dimensional image on which depth distortion information is superimposed in the fifth embodiment of the surgical image display system.

Furthermore, when the user performs an operation (For example, a mouse drag & drop operation on the circumference of the marker circle 160.) of designating the size (diameter) of the region as the attention target, the attention target setting unit 152 changes a size of the region as the attention target to the designated size. FIG. 37 illustrates the marker circle 160 in a case where a size of the region as the attention target is greatly changed from the case of FIG. 36.

Note that the user can also perform operation (for example, mouse drag & drop operation on a portion other than a circumference of the marker circle 160.) of designating the diameter of the circular area following the designation of the center position of the region as the attention target.

The attention target setting unit 152 gives the center position and diameter of the region as the attention target to the depth distortion information generation unit 151.

The depth distortion information generation unit 151 generates a depth distortion map similarly to the depth distortion information generation unit 42 in FIG. 2 on the basis of a base length 2·E0, working distance WD0, and image shooting range diagonal view angle size LB from the image shooting condition acquisition unit 43, and a pupillary distance 2·E, a viewing distance W, and diagonal screen size LM from the observation condition acquisition unit 44.

Furthermore, the depth distortion information generation unit 151 generates, on the basis of the center position and diameter of the region as the attention target given from the attention target setting unit 152, an image of the marker circle 160 to be superimposed on the region as the attention target on the three-dimensional image, and supplies the image to the output image generation unit 45. With this arrangement, as illustrated in FIGS. 36 and 37, the image of the marker circle 160 is superimposed on the region as the attention target with respect to the three-dimensional image 25A of the observation region.

Furthermore, provided that the diameter of the marker circle 160 is M, the depth distortion information generation unit 151 in FIG. 35 generates depth distortion information as illustrated in FIGS. 36 and 37, the depth distortion information that emphasizing display parts, on the depth distortion map, of depth distortion rates at positions where an original projection amount Dx0 and an original recession amount Dy0 are M in a stereoscopic image space.

That is, the depth distortion information generation unit 151 calculates a distance L0 to a reference plane SB of object points corresponding to an image point at which the original projection amount Dx0 and the original recession amount Dy0 are M.

Specifically, because Dx0=Dy0=A·L0·E/E0=M, the depth distortion information generation unit 151 calculates the distance L0 by the following Mathematical Formula (11) on the basis of the base length 2·E0, working distance WD0, and image shooting range diagonal view angle size LB from the image shooting condition acquisition unit 43, and a pupillary distance E and diagonal screen size LM from the observation condition acquisition unit 44.

$$L0 = E0 \cdot M / (E \cdot A) \qquad (11)$$

In this regard, an enlargement magnification A is calculated by using Mathematical Formula (6).

In the depth distortion map, the depth distortion information generation unit 151 surrounds, with a frame 161, the display parts of the depth distortion rates in a range of a plurality of rows (for example, about 5 rows) including a row of the distance L0 calculated by Mathematical Formula (11), and range of a plurality of rows (about 5 columns) including a column corresponding to the viewing distance W from the observation condition acquisition unit 44, as in the depth distortion information 25B in FIGS. 36 and 37. With this arrangement, the depth distortion information generation unit 151 generates depth distortion information in which a depth distortion rate in an area of the frame 161 is emphasized, and supplies the generated depth distortion information to the output image generation unit 45. Note that any method can be adopted as a method for emphasizing a part of a display part of the depth distortion rate.

<Processing Procedure of Depth Distortion Information Generation Unit and Attention Target Setting Unit in Fifth Embodiment of Surgical Image Display System>

Figure 38:
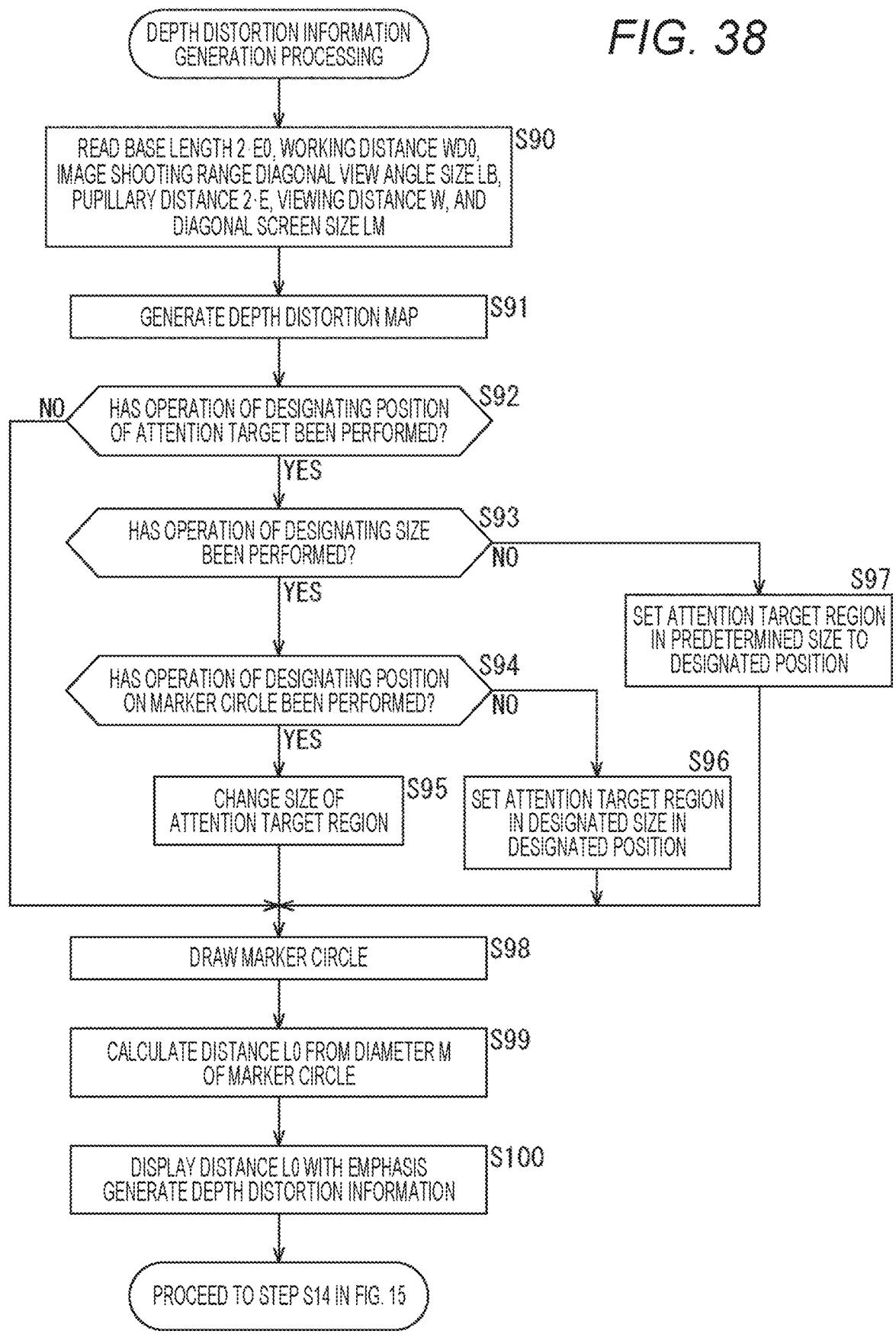
FIG. 38 is a flowchart illustrating an example of processing of depth distortion information generation performed by a depth distortion information generation unit and attention target setting unit in the fifth embodiment of the surgical image display system.

FIG. 38 is a flowchart illustrating an example of processing of depth distortion information generation performed by the depth distortion information generation unit 151 and attention target setting unit 152 of the image processing unit 150 in the fifth embodiment of the surgical image display system.

Note that processing in the fifth embodiment of the surgical image display system is performed in the same procedure as in the flowchart in FIG. 15, and the processing in flowchart in FIG. 38 is performed in Step S13 in FIG. 15.

When the processing proceeds from Step S12 to Step S13 in FIG. 15, in Step S90 in FIG. 38, the depth distortion information generation unit 151 reads the base length 2·E0, working distance WD0, and image shooting range diagonal view angle size LB from the image shooting condition acquisition unit 43, and reads the pupillary distance 2·E, the viewing distance W, and diagonal screen size LM from the observation condition acquisition unit 44. The processing proceeds from Step S90 to Step S91.

In Step S91, the depth distortion information generation unit 151 generates a depth distortion map (refer to FIG. 12) on the basis of the base length 2·E0, working distance WD0, image shooting range diagonal view angle size LB, pupillary distance 2·E, and diagonal screen size LM read in Step S90. The processing proceeds from Step S91 to Step S92.

In Step S92, the attention target setting unit 152 decides whether or not operation of designating the position of the attention target has been performed by operation of the operation unit 47 by the user.

In a case where it is decided in Step S92 that operation of designating the position of the attention target has been performed, the processing proceeds to Step S93, and the attention target setting unit 152 decides whether or not operation of designating a size (diameter) of the region as the attention target has been performed by operation of the operation unit 47 by the user.

In a case where it is decided in Step S93 that operation of designating the size (diameter) of the region as the attention target has been performed, the processing proceeds to Step S94, and the attention target setting unit 152 decides whether or not the position designated in Step S92 is a position on the marker circle 160 for the region as the attention target that has already been set.

In a case where it is decided in Step S94 that the position designated in Step S92 is the position on the marker circle 160 for the region as the attention target that has already been set, the processing proceeds to Step S95, and the attention target setting unit 152 changes the size (diameter) of the region as the attention target on the marker circle 160 at the position designated in Step S92 to the size (diameter) designated in Step S93. Then, the attention target setting unit 152 gives the center position and diameter of the changed region as the attention target to the depth distortion information generation unit 151. The processing proceeds from Step S95 to Step S98.

Furthermore, in a case where it is decided in Step S94 that the position designated in Step S92 is not the position on the marker circle 160 for the region as the attention target that has already been set, the processing proceeds to Step S96, and the attention target setting unit 152 sets the position designated in Step S92 as the center position and sets the size (diameter) of the circular area designated in Step S93 as the region as the attention target. Then, the attention target setting unit 152 gives the center position and diameter of the set region as the attention target to the depth distortion information generation unit 151. The processing proceeds from Step S96 to Step S98.

Furthermore, in a case where it is decided in Step S93 that operation of designating the size (diameter) of the region as the attention target has not been performed, the processing proceeds to Step S97, and the attention target setting unit 152 sets the circular area as the region as the attention target, the circular area having the predetermined diameter with the position designated in Step S92 as the center position. Then, the attention target setting unit 152 gives the center position and diameter of the set region as the attention target to the depth distortion information generation unit 151. The processing proceeds from Step S97 to Step S98.

Furthermore, in a case where it is decided in Step S92 that operation of designating the position of the attention target has not been performed, the processing skips Steps S93 to S97 and proceeds to Step S98.

In Step S98, the depth distortion information generation unit 151 generates, on the basis of the center position and diameter of the region as the attention target given from the attention target setting unit 152 in Step S95, Step S96, or Step S97, an image of the marker circle 160 to be superimposed on the region as the attention target on the three-dimensional image, and supplies the image to the output image generation unit 45. Note that, in a case where it is decided in Step S92 that operation of designating the position of the attention target has not been performed, an image of the marker circle 160 is generated on the basis of the center position and diameter of the region as the attention target, the center position and diameter having been set in processing up to previous time, the processing repeatedly performed in the flowchart in FIG. 15. The processing proceeds from Step S98 to Step S99.

In Step S99, the depth distortion information generation unit 151 calculates a distance L0 to a reference plane of object points corresponding to an image point at which a diameter M of the region as the attention target (diameter M of the marker circle 160) is the original projection amount Dx0 and the original recession amount Dy0. The processing proceeds from Step S99 to Step S100.

In Step S100, on the depth distortion map generated in Step S91, the depth distortion information generation unit 151 generates depth distortion information in which display parts of the depth distortion rates in an area of a plurality of rows (for example, about 5 rows) including a row corresponding to the viewing distance W from the observation condition acquisition unit 44 is emphasized on the depth distortion map, the display parts being areas of a plurality of rows (about 5 columns, for example) including the distance L0 calculated in Step S99. Then, the depth distortion information generation unit 151 supplies the generated depth distortion information to the output image generation unit 45. The processing proceeds from Step S100 to Step S14 in FIG. 15.

According to the fifth embodiment of the surgical image display system described above, the observer who is stereoscopically viewing the three-dimensional image displayed on the three-dimensional display unit 25 can, on the basis of the depth distortion information, grasp the magnitude of the depth distortion that has occurred in the stereoscopic image space, by which grasping of the distance in the depth direction by the observer is assisted (facilitated). Furthermore, it is possible to quickly grasp magnitude of depth distortion in vicinity of the position corresponding to the projection amount and recession amount in the depth direction, the projection amount and recession amount being corresponding to the size of the region as the attention target designated by the observer. Note that the fifth embodiment of the surgical image display system can be applied to the first to fourth embodiments.

<<Sixth Embodiment of Surgical Image Display System>>

Figure 39:
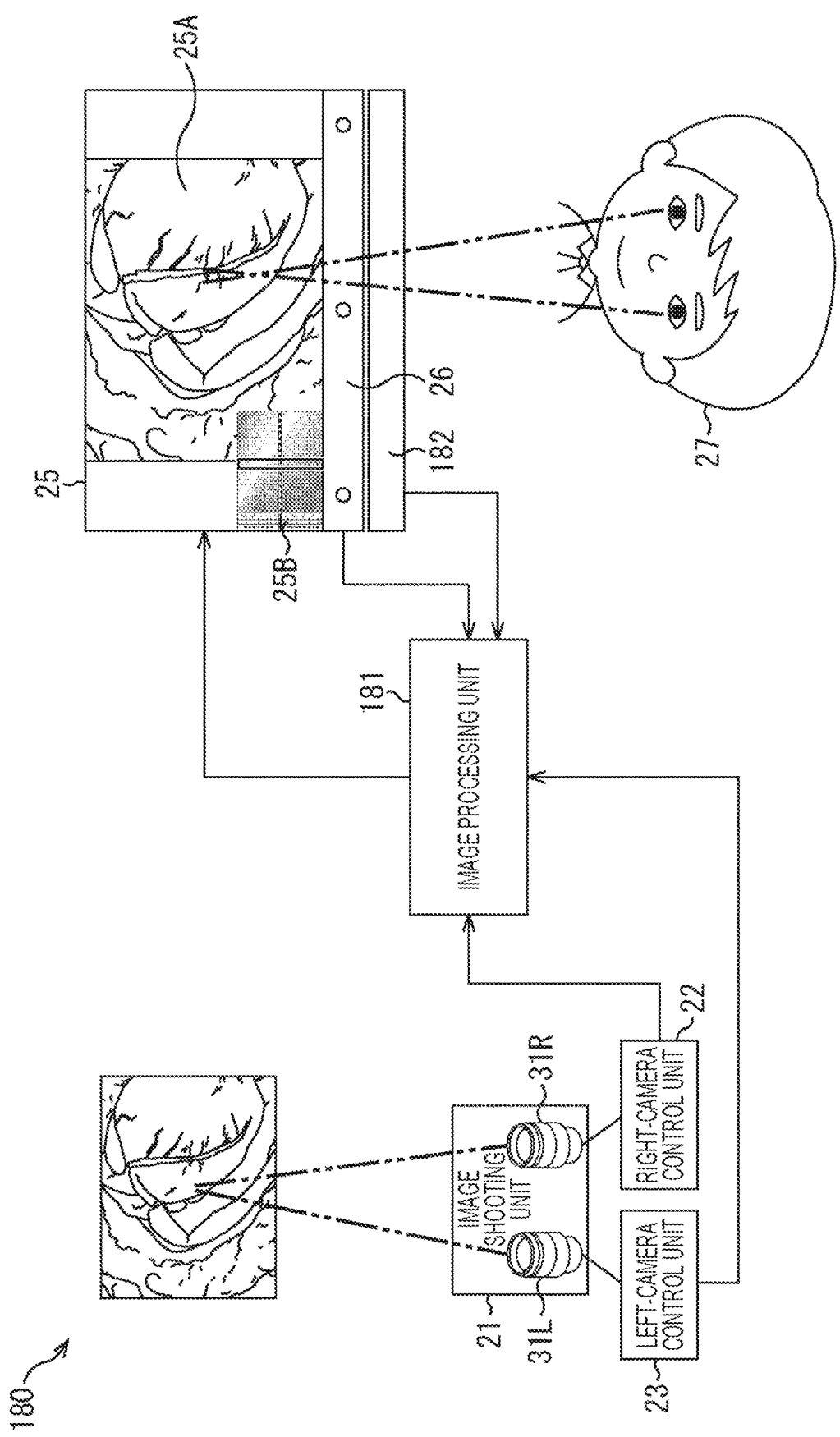
FIG. 39 is a block diagram illustrating a configuration example of a sixth embodiment of the surgical image display system.

FIG. 39 is a block diagram illustrating a configuration example of a sixth embodiment of the surgical image display system. Note that, in the drawings, the parts corresponding to the parts in the surgical image display system in FIG. 1 are provided with the same reference signs, and description of the corresponding parts will be omitted as appropriate.

A surgical image display system 180 in FIG. 39 has an image shooting unit 21, a right-camera control unit 22, a left-camera control unit 23, an image processing unit 181, a three-dimensional display unit 25, a viewpoint detection sensor 26, and a line-of-sight detection sensor 182. Therefore, the surgical image display system 180 in FIG. 39 is common to the surgical image display system 11 in FIG. 1 in having the image shooting unit 21, the right-camera control unit 22, the left-camera control unit 23, the three-dimensional display unit 25, and the viewpoint detection sensor 26. However, the surgical image display system 180 in FIG. 39 is different from the surgical image display system 11 in FIG. 1 in that the image processing unit 181 is provided instead of the image processing unit 24 of the surgical image display system 11 in FIG. 1, and that the line-of-sight detection sensor 182 is newly provided.

In FIG. 39, the line-of-sight detection sensor 182 detects a direction of a line of sight of an observer, and detects a position at which the observer is gazing on a display surface of the three-dimensional display unit 25 (gaze position on the display surface). The line-of-sight detection sensor 182 supplies the image processing unit 181 with the detected position at which the observer is gazing.

<Configuration Example of Image Processing Unit in Sixth Embodiment of Surgical Image Display System>

Figure 40:
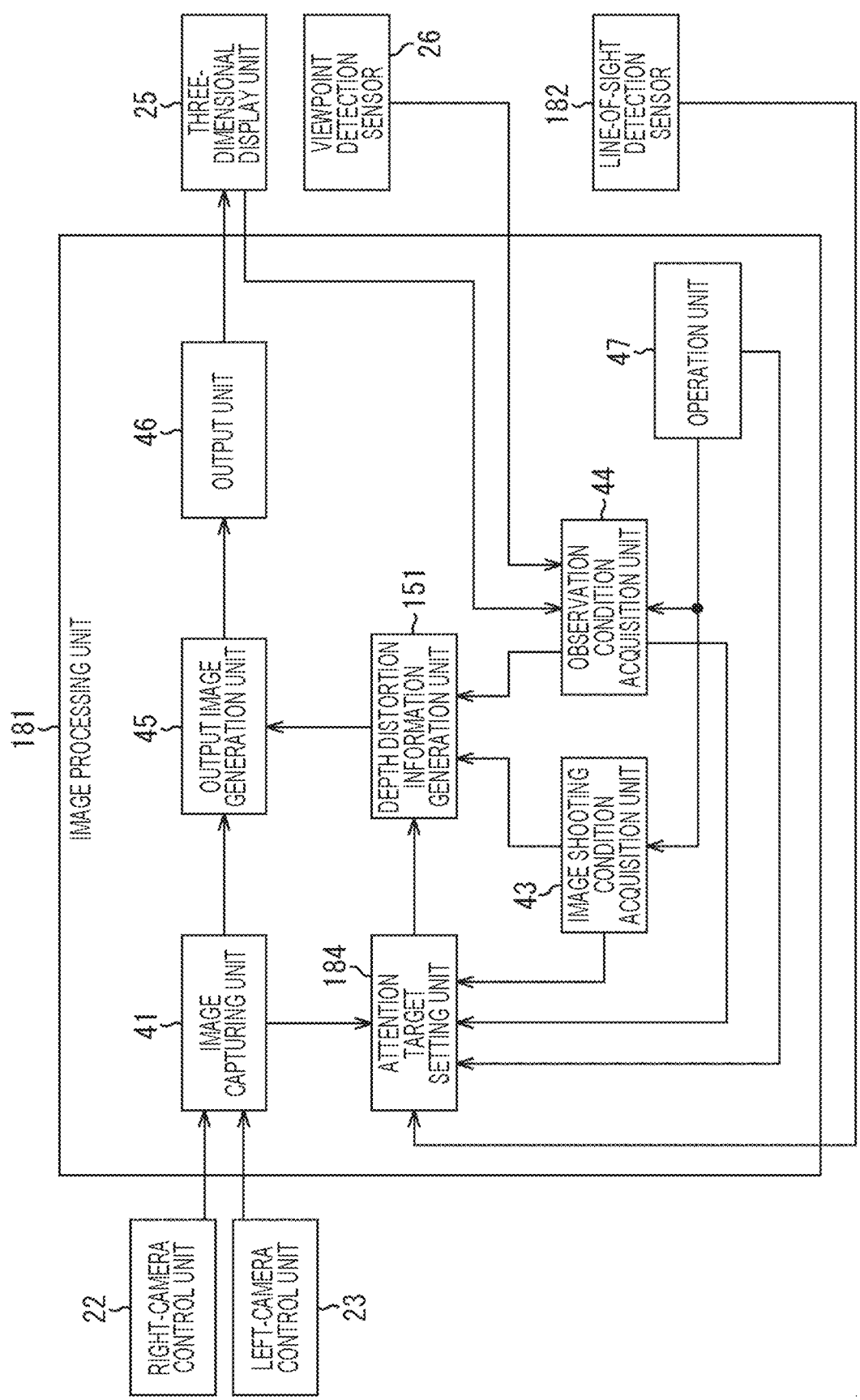
FIG. 40 is a block diagram illustrating a configuration example of an image processing unit in the fifth embodiment of the surgical image display system.

FIG. 40 is a block diagram illustrating a configuration example of an image processing unit in the fifth embodiment of the surgical image display system. Note that, in the drawings, the parts corresponding to the parts in the image processing unit 150 in FIG. 35 are provided with the same reference signs, and description of the corresponding parts will be omitted as appropriate.

The image processing unit 181 in FIG. 40 has an image capturing unit 41, a depth distortion information generation unit 151, an image shooting condition acquisition unit 43, an observation condition acquisition unit 44, an output image generation unit 45, an output unit 46, an operation unit 47, and an attention target setting unit 184. Therefore, the image processing unit 181 in FIG. 40 is common to the image processing unit 150 in FIG. 35 in having the image capturing unit 41, the image shooting condition acquisition unit 43, the observation condition acquisition unit 44, the depth distortion information generation unit 151 the output image generation unit 45, the output unit 46, and the operation unit 47. However, the image processing unit 181 in FIG. 40 is different from the image processing unit 150 in FIG. 35 in that the attention target setting unit 184 is provided instead of the attention target setting unit 152 in FIG. 35.

The attention target setting unit 184 sets an area of an organ as an attention target designated by a user in a three-dimensional image on the basis of the position at which the observer is gazing on the display surface of the three-dimensional display unit 25, the position being given from the line-of-sight detection sensor 182, or on the basis of predetermined input operation by the user, such as operation of a mouse (pointing device) given from the operation unit 47. Note that, in the present disclosure, an organ includes an organum in a living body and an organized group recognized as one mass in the living body.

Figure 41:
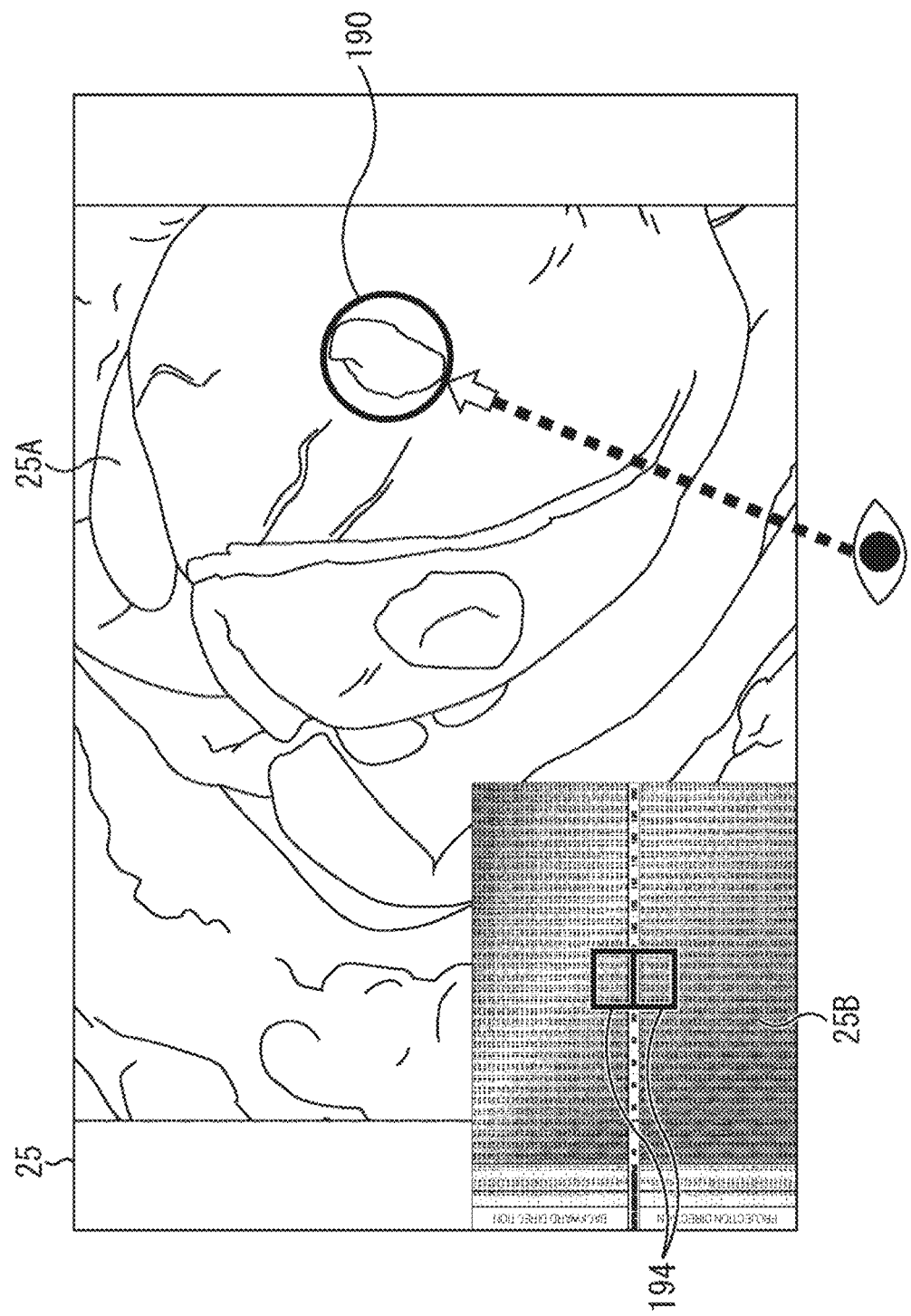
FIG. 41 is a diagram exemplifying a three-dimensional image on which depth distortion information is superimposed, the depth distortion information being displayed on a three-dimensional display unit.

FIG. 41 is a diagram exemplifying the three-dimensional image 25A on which depth distortion information 25B is superimposed, the depth distortion information being displayed on the three-dimensional display unit 25. In FIG. 41, a marker circle 190 indicates an area of an organ as an attention target in the three-dimensional image 25A, and the area of the organ is set as a circular area including the organ.

When, as operation of designating the organ as the attention target, the observer gazes at an arbitrary part of the organ as the attention target, the attention target setting unit 184 in FIG. 40 sets the position at which the observer is gazing given from the line-of-sight detection sensor 182 as a position of the organ as the attention target. Furthermore, when the user performs operation (for example, mouse click operation) of designating an arbitrary position of the organ as the attention target by operating the operation unit 47, the attention target setting unit 184 sets the designated position as the position of the organ as the attention target.

Meanwhile, the attention target setting unit 184 captures the three-dimensional image of the observation region from the image capturing unit 41, and extracts, on the basis of color or contour by image processing on the three-dimensional image, the region of the organ at the position designated by the position at which the observer is gazing or by operation of the operation unit 47. Then, the attention target setting unit 184 sets the circular area including the extracted region of the organ as the area of the organ as the attention target, and gives the center position and diameter of the set circular area to the depth distortion information generation unit 151.

Figure 42:
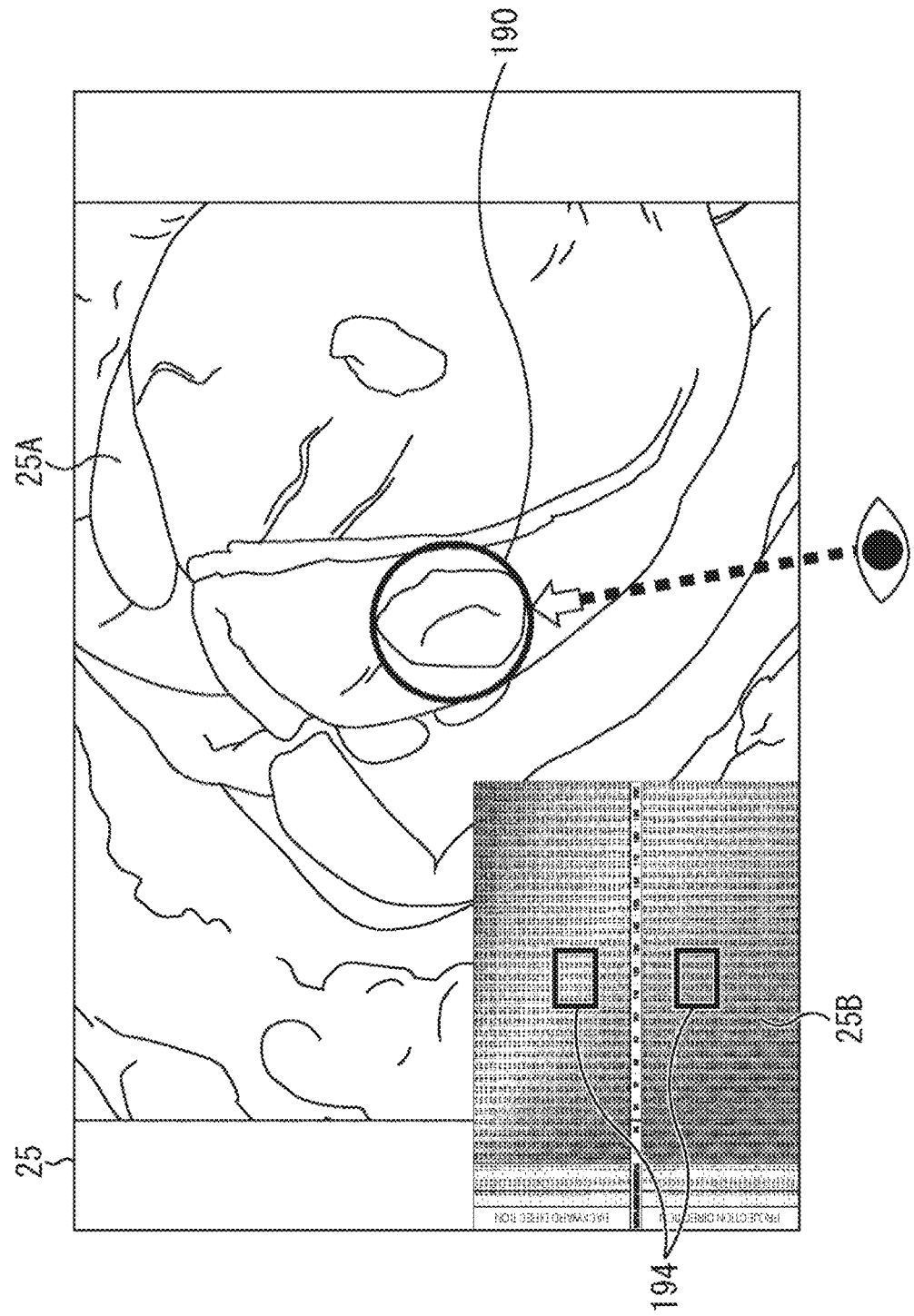
FIG. 42 is a diagram exemplifying the three-dimensional image on which depth distortion information is superimposed, the depth distortion information being displayed on the three-dimensional display unit.

FIG. 42 is a diagram exemplifying the three-dimensional image 25A on which depth distortion information 25B is superimposed, the depth distortion information being displayed on the three-dimensional display unit 25. As shown in FIG. 42, when the observer gazes at an organ at a position different from the organ that the observer has gazed at in FIG. 41, the attention target setting unit 184 extracts a region of the organ at the position that the observer has newly gazed at, and sets a circular area including the extracted region of the organ (area of the marker circle 190) as the area of the organ as the attention target.

The depth distortion information generation unit 151 generates a depth distortion map similarly to the depth distortion information generation unit 42 in FIG. 2 on the basis of a base length 2·E0, working distance WD0, and image shooting range diagonal view angle size LB from the image shooting condition acquisition unit 43, and a pupillary distance 2·E, a viewing distance W, and diagonal screen size LM from the observation condition acquisition unit 44.

Furthermore, the depth distortion information generation unit 151 generates, on the basis of the center position and diameter of the area of the organ as the attention target given from the attention target setting unit 184, an image of the marker circle 190 to be superimposed on the area of the organ as the attention target on the three-dimensional image, and supplies the image to the output image generation unit 45. With this arrangement, as illustrated in FIGS. 41 and 42, the marker circle 190 indicating the area of the organ as the attention target is superimposed and displayed on the three-dimensional image 25A of the observation region.

Furthermore, similarly to the depth distortion information generation unit 151 of the fifth embodiment of the surgical image display system, provided that the diameter of the marker circle 190 is M, the depth distortion information generation unit 151 surrounds, as a frame 194 in the depth distortion information 25B in FIGS. 41 and 42, the display parts, on the depth distortion map, of depth distortion rates at positions where an original projection amount Dx0 and an original recession amount Dy0 are M in a stereoscopic image space. With this arrangement, the depth distortion information generation unit 151 generates depth distortion information in which a depth distortion rate in an area of the frame 194 is emphasized, and supplies the depth distortion information to the output image generation unit 45. Note that any method can be adopted as a method for emphasizing a part of a display part of the depth distortion rate.

<Processing Procedure of Depth Distortion Information Generation Unit and Attention Target Setting Unit in Sixth Embodiment of Surgical Image Display System>

Figure 43:
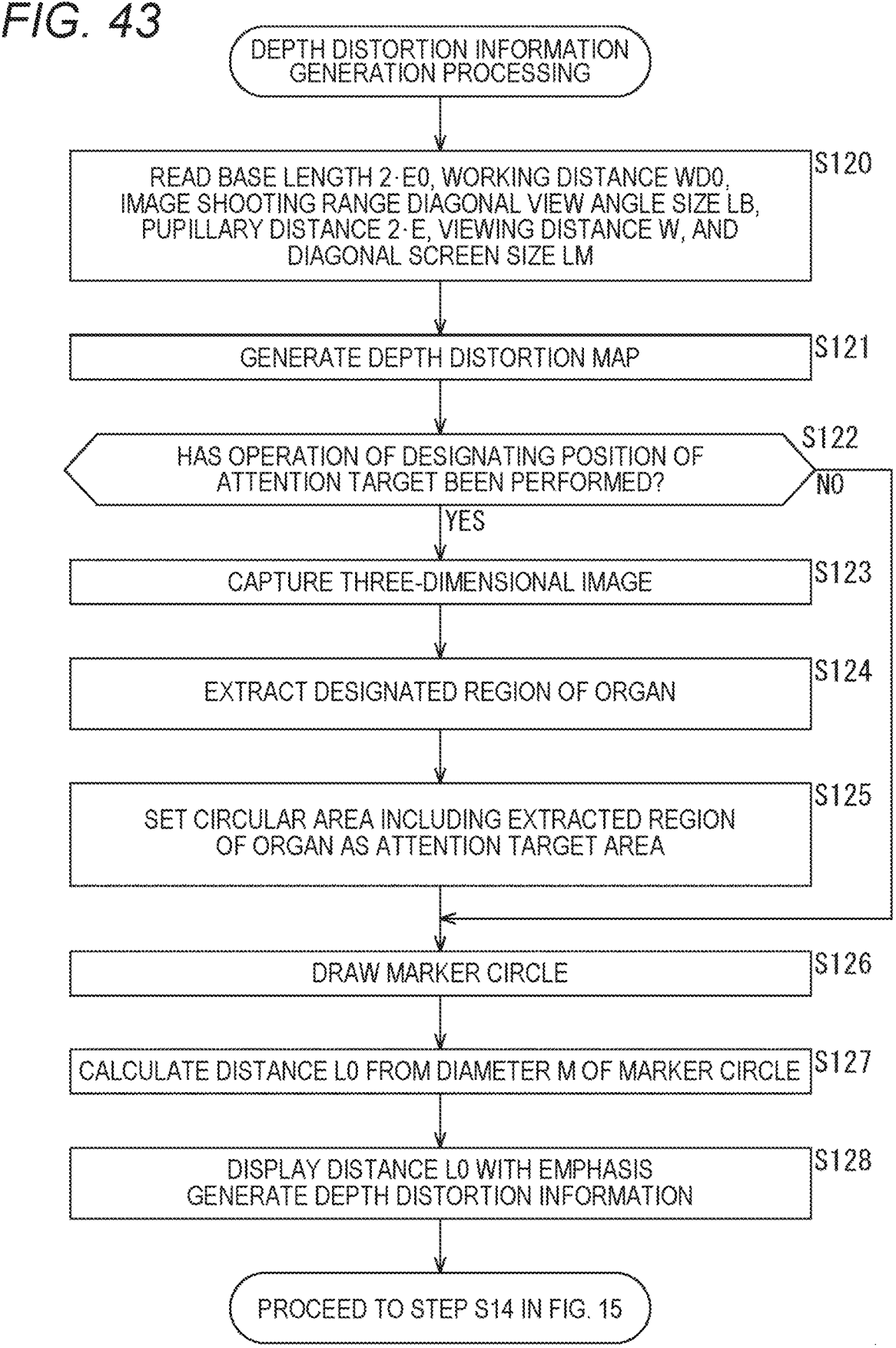
FIG. 43 is a flowchart illustrating an example of processing of depth distortion information generation performed by a depth distortion information generation unit and attention target setting unit in the sixth embodiment of the surgical image display system.

FIG. 43 is a flowchart illustrating an example of processing of depth distortion information generation performed by the depth distortion information generation unit 151 and attention target setting unit 184 in the sixth embodiment of the surgical image display system.

Note that processing in the sixth embodiment of the surgical image display system is performed in the same procedure as in the flowchart in FIG. 15, and the processing in flowchart in FIG. 43 is performed in Step S13 in FIG. 15.

When the processing proceeds from Step S12 to Step S13 in FIG. 15, in Step S120 in FIG. 43, the depth distortion information generation unit 151 reads the base length 2·E0, working distance WD0, and image shooting range diagonal view angle size LB from the image shooting condition acquisition unit 43, and reads the pupillary distance 2·E, the viewing distance W, and diagonal screen size LM from the observation condition acquisition unit 44. The processing proceeds from Step S120 to Step S121.

In Step S121, the depth distortion information generation unit 151 generates a depth distortion map (refer to FIG. 12) on the basis of the base length 2·E0, working distance WD0, image shooting range diagonal view angle size LB, pupillary distance 2·E, and diagonal screen size LM read in Step S120. The processing proceeds from Step S121 to Step S122.

In Step S122, the attention target setting unit 184 decides whether or not operation of designating the position of the organ as the attention target has been performed on the basis of the position at which the observer is gazing, the position being from the line-of-sight detection sensor 182, or on the basis of operation of the operation unit 47 by the user. Note that, the attention target setting unit 184 decides that operation of designating the position of the organ as the attention target has been performed in a case where the position at which the observer is gazing has been changed, the position being from the line-of-sight detection sensor 182.

In a case where it is decided in Step S122 that operation of designating the position of the organ as the attention target has been performed, the processing proceeds to Step S123, and the attention target setting unit 184 captures a three-dimensional image of the observation region from the image capturing unit 41. The processing proceeds from Step S123 to Step S124.

Furthermore, in a case where it is decided in Step S122 that operation of designating the position of the organ as the attention target has not been performed, the processing skips Steps S123 to S125 and proceeds to Step S126.

In Step S124, the attention target setting unit 184 extracts, on the basis of color, contour, or the like by image processing on the three-dimensional image, the region of the organ at the position designated by the position at which the observer is gazing or by operation of the operation unit 47, the region being detected in Step S122. The processing proceeds from Step S124 to Step S125.

In Step S125, the attention target setting unit 184 sets the circular area including the region of the organ, the region being extracted in Step S124, as the area of the organ as the attention target, and gives the center position and diameter of the set circular area to the depth distortion information generation unit 151. The processing proceeds from Step S125 to Step S126.

In Step S126, the depth distortion information generation unit 151 generates, on the basis of the center position and diameter of the organ as the attention target given from the attention target setting unit 184 in Step S125, an image of the marker circle 190 to be superimposed on the area of the organ as the attention target on the three-dimensional image, and supplies the image to the output image generation unit 45. Note that, in a case where it is decided in Step S122 that operation of designating the position of the attention target has not been performed, an image of the marker circle 190 is generated on the basis of the center position and diameter of the circular area of the organ as the attention target up to previous time. The processing proceeds from Step S126 to Step S127.

In Step S127, the depth distortion information generation unit 151 calculates a distance L0 to a reference plane of object points corresponding to an image point at which a diameter M of the area of the organ as the attention target (diameter M of the marker circle 190) is the original projection amount Dx0 and the original recession amount Dy0. The processing proceeds from Step S127 to Step S128.

In Step S128, on the depth distortion map generated in Step S121, the depth distortion information generation unit 151 generates depth distortion information in which display parts of the depth distortion rates in an area of a plurality of rows (for example, about 5 rows) including a row corresponding to the viewing distance W from the observation condition acquisition unit 44 is emphasized on the depth distortion map, the display parts being an area of a plurality of rows (about 5 columns, for example) including the distance L0 calculated in Step S127. Then, the depth distortion information generation unit 151 supplies the generated depth distortion information to the output image generation unit 45. The processing proceeds from Step S128 to Step S14 in FIG. 15.

According to the sixth embodiment of the surgical image display system described above, the observer who is stereoscopically viewing the three-dimensional image displayed on the three-dimensional display unit 25 can, on the basis of the depth distortion information, grasp the magnitude of the depth distortion that has occurred in the stereoscopic image space, by which grasping of the distance in the depth direction by the observer is assisted (facilitated). Furthermore, it is possible to quickly grasp magnitude of depth distortion in vicinity of the position corresponding to the projection amount and recession amount in the depth direction, the projection amount and recession amount being corresponding to the size of the organ as the attention target designated by the observer. Note that the sixth embodiment of the surgical image display system can be applied to the first to fourth embodiments.

The surgical image display system to which the above-described present technology is applied can be applied to an operative field camera system for medical facilities that shoots an image of a field of view (operative field) of a surgical site. Furthermore, the present technology can be applied not only to a surgical region of a living body or the like, but also to a system or image processing device that acquires a three-dimensional image of an arbitrary observation region.

<Program>

Some and all of a series of processing by the image processing unit 24 in FIG. 1, the image processing unit 101 in FIG. 22, the image processing unit 121 in FIG. 27, the image processing unit 132 in FIG. 33, the image processing unit 150 in FIG. 35, the image processing unit 181 in FIG. 40, and the like can be executed by hardware or software. In a case where a series of processing is executed by software, a program included in the software is installed on a computer. Here, the computer includes, a computer incorporated in dedicated hardware, a general-purpose personal computer for example, which is capable of executing various kinds of functions by installing various programs, or the like.

FIG. 44 is a block diagram illustrating a configuration example of hardware of a computer that executes the series of processing described above by a program.

In the computer, a central processing unit (CPU) 201, a read only memory (ROM) 202, and a random access memory (RAM) 203 are mutually connected by a bus 204.

Moreover, an input/output interface 205 is connected to the bus 204. An input unit 206, an output unit 207, a storage unit 208, a communication unit 209, and a drive 210 are connected to the input/output interface 205.

The input unit 206 includes a keyboard, a mouse, a microphone, or the like. The output unit 207 includes a display, a speaker, or the like. The storage unit 208 includes a hard disk, a non-volatile memory, or the like. The communication unit 209 includes a network interface, or the like. The drive 210 drives a removable medium 211 such as a magnetic disk, an optical disk, a magneto-optical disk, or a semiconductor memory.

In a computer configured as above, the series of processing described above is performed by the CPU 201 loading, for example, a program stored in the storage unit 208 to the RAM 203 via the input/output interface 205 and the bus 204 and executing the program.

A program executed by the computer (CPU 201) can be provided by being recorded on the removable medium 211 as a package medium, or the like, for example. Furthermore, the program can be provided via a wired or wireless transmission medium such as a local area network, the Internet, or digital satellite broadcasting.

In the computer, the program can be installed on the storage unit 208 via the input/output interface 205 by attaching the removable medium 211 to the drive 210. Furthermore, the program can be received by the communication unit 209 via the wired or wireless transmission medium and installed on the storage unit 208. In addition, the program can be installed on the ROM 202 or the storage unit 208 in advance.

Note that, the program executed by the computer may be a program that is processed in time series in an order described in this specification, or a program that is processed in parallel or at a necessary timing such as when a call is made.

Note that the present technology can have the following configurations.

<1> A surgical image display system including
an image shooting unit that shoots an image of a living body from two viewpoints, and acquires a three-dimensional image that reproduces a stereoscopic image of an observation region of which image shot from the two viewpoints, and an output image generation unit that generates an output image that presents the three-dimensional image acquired from the image shooting unit and depth distortion information that represents magnitude of depth distortion in a depth direction of a stereoscopic image space in which a stereoscopic image of the observation region is reproduced by stereoscopically viewing the three-dimensional image.

<2> The surgical image display system according to <1>,
in which the output image generation unit generates an output image in which the depth distortion information is superimposed on the three-dimensional image.

<3> The surgical image display system according to <1> or <2>,
in which, provided that a position at which an image point displayed at a same position in a right-eye image and left-eye image constituting the three-dimensional image is reproduced in the stereoscopic image space is a position of a display surface, the depth distortion information includes information representing, as a depth distortion rate, a ratio of a distance of a point to the display surface in the stereoscopic image space, to an original distance of the point to the display surface in the stereoscopic image space in a case where it is supposed that the depth distortion has not occurred.

<4> The surgical image display system according to <3>,
in which the depth distortion information includes information representing the depth distortion rate of a plurality of points in the depth direction in the stereoscopic image space.

<5> The surgical image display system according to <3> or <4>,
in which, provided that a position of an object point of which image shot as an image point at a same position in the right-eye image and left-eye image in an image shooting space in which an image of the observation region is shot is a position on a reference plane, in a case where, in the image shooting space, a distance of a first object point to the reference plane is equal to a distance between a second object point and a third object point on the reference plane, in the stereoscopic image space, a distance between a point at which the second object point is reproduced and a point at which the third object point is reproduced is the original distance of a point at which the first object point is reproduced, to the display surface.

<6> The surgical image display system according to any one of <3> to <5>,
in which the depth distortion information includes information representing the depth distortion rate with respect to a viewing distance that is a distance from eyes of an observer to the display surface.

<7> The surgical image display system according to <6>,
in which the depth distortion information includes information in which the depth distortion rate corresponding to actual viewing distance is emphasized.

<8> The surgical image display system according to any one of <1> to <5>,
in which the depth distortion information includes information representing a shape of a perfect circle deformed by the depth distortion, the perfect circle being assumed in a case where it is supposed that the depth distortion has not occurred in the stereoscopic image space.

<9> The surgical image display system according to any one of <3> to <8>,
in which the depth distortion information includes information indicating that a viewing distance at which the depth distortion rate approaches 1 as a position in the stereoscopic image space approaches the display surface from a back side and a front side is an optimal viewing distance.

<10> The surgical image display system according to any one of <1> to <9>, in which, provided that a position of an object point of which image shot as an image point at a same position in the right-eye image and left-eye image constituting the three-dimensional image in an image shooting space in which an image of the observation region is shot is a position on a reference plane, and that a position at which an image point displayed at a same position in a right-eye image and left-eye image is reproduced in the stereoscopic image space is a position of a display surface on which the three-dimensional image is displayed, the depth distortion information includes information generated on the basis of, in the image shooting space, a working distance from the image shooting unit to the reference plane in the stereoscopic image space, a base length that is a distance between two viewpoints of the image shooting unit, a diagonal view angle size that is a diagonal length of an image shooting range on the reference plane of the image shooting unit, a pupillary distance of an observer stereoscopically viewing the three-dimensional image, a viewing distance that is a distance from eyes of the observer to the display surface, and a diagonal screen size that is a diagonal length of the three-dimensional image displayed on the display surface.

<11> The surgical image display system according to any one of <1> to <10>, the surgical image display system further including a depth distortion information generation unit that generates depth distortion information.

<12> The surgical image display system according to any one of <1> to <11>, the surgical image display system further including a three-dimensional display unit that displays, provided that a position at which an image point displayed at a same position in a right-eye image and left-eye image constituting the three-dimensional image is a position of the display surface, the output image stereoscopically viewable, and changes a viewing distance by changing a position of the display surface in a depth direction on the basis of an external signal, the viewing distance being a distance from eyes of an observer to the display surface, and a viewing distance control unit that causes the three-dimensional display unit to set the viewing distance by giving the external signal, in which, provided that a position of an object point of which image shot as an image point at a same position in the right-eye image and left-eye image constituting the three-dimensional image in an image shooting space in which an image of the observation region is shot is a position on a reference plane, the viewing distance control unit causes the viewing distance in the three-dimensional display unit to be set to WD0·E/E0 on the basis of, in the image shooting space, a working distance WD0 of the image shooting unit to the reference plane in the stereoscopic image space, a base length 2·E0 that is a distance between two viewpoints of the image shooting unit, and a pupillary distance 2·E of an observer stereoscopically viewing the three-dimensional image.

<13> The surgical image display system according to any one of <1> to <11>, the surgical image display system further including an image shooting condition control unit that controls, provided that a position of an object point of which image shot as an image point at a same position in the right-eye image and left-eye image constituting the three-dimensional image in an image shooting space in which an image of the observation region is shot is a position on a reference plane, at least two elements among, in the image shooting space, a working distance from the image shooting unit to the reference plane in the stereoscopic image space, a base length that is a distance between two viewpoints of the image shooting unit, and a diagonal screen size that is a diagonal length of an image shooting range on the reference plane of the image shooting unit, and an operation unit that designates, provided that a position at which an image point displayed at a same position in a right-eye image and left-eye image constituting the three-dimensional image is reproduced in the stereoscopic image space is a position of a display surface, an enlargement magnification of the three-dimensional image displayed on the display surface, in which, on the basis of a pupillary distance of an observer stereoscopically viewing the three-dimensional image, a viewing distance that is a distance from eyes of the observer to the display surface, and a diagonal view angle size that is a diagonal length of the three-dimensional image displayed on the display surface, and on the basis of an element other than the control target among the working distance, the base length, and the diagonal screen size, the image shooting condition control unit controls the control target so that an enlargement magnification of the three-dimensional image displayed on the display surface is the enlargement magnification designated by the operation unit, and that the viewing distance is WD0·E/E0 with respect to the working distance WD0, the base length 2·E0, and the pupillary distance 2·E.

<14> The surgical image display system according to any one of <3> to <7>, the surgical image display system further including an attention target designation unit that designates an area of an attention target in the three-dimensional image, in which the depth distortion information includes information representing the depth distortion rate in a case where a distance corresponding to a size of an area of the attention target designated by the attention target designation unit is an original distance to the display surface.

<15> The surgical image display system according to any one of <3> to <7>, the surgical image display system further including an attention target designation unit that designates a position of an attention target in the three-dimensional image, and an attention target setting unit that sets, on the three-dimensional image, an area of an organ at a position designated by the attention target setting unit, in which the depth distortion information includes information representing the depth distortion rate in a case where a distance set by the attention target designation unit is an original distance to the display surface, the distance corresponding to a size of an area of the organ.

<16> An image processing device including an output image generation unit that generates an output image presenting a three-dimensional image obtained by shooting an image of a surgical point from two different viewpoints, and information indicating magnitude of difference between a stereoscopic image in the three-dimensional image and a depth direction in a physical three-dimensional space of the surgical point.

<17> An image processing method, in which an image processing device includes an output image generation unit, and generates an output image presenting a three-dimensional image that is a three-dimensional image obtained by shooting an image of a living body from two different viewpoints and that reproduces a stereoscopic image of an observation region shot from the two viewpoints, and depth distortion information representing magnitude of depth distortion in a depth direction of a stereoscopic image space in which the stereoscopic image of the observation region is reproduced by stereoscopically viewing the three-dimensional image.

REFERENCE SIGNS LIST

11 Surgical image display system
21 Image shooting unit
22 Right-camera control unit
23 Left-camera control unit
24 Image processing unit
25 Three-dimensional display unit
26 Viewpoint detection sensor
31L Left camera
31R Right camera
41 Image capturing unit
42 Depth distortion information generation unit
43 Image shooting condition acquisition unit
44 Observation condition acquisition unit
45 Output image generation unit
46 46 Output unit
47 Operation unit

The invention claimed is:

1. A surgical image display system, comprising:
an image shooting unit configured to:
  shoot an image of an observation region of a living body from two viewpoints;
  acquire a three-dimensional image of the observation region; and
  reproduce, based on the three-dimensional image, a stereoscopic image of the observation region;
a depth distortion information generation unit configured to generate depth distortion information that indicates a magnitude of depth distortion in a depth direction of a stereoscopic image space, wherein the stereoscopic image of the observation region is reproduced in the stereoscopic image space; and
an output image generation unit configured to generate an output image that presents the three-dimensional image and the depth distortion information.

2. The surgical image display system according to claim 1, wherein the output image generation unit is further configured to generate the output image in which the depth distortion information is superimposed on the three-dimensional image.

3. The surgical image display system according to claim 1, wherein
the depth distortion information includes information representing a depth distortion rate at a position at which an image point is at a same position in a right-eye image and a left-eye image on a display surface in the stereoscopic image space,
the right-eye image and the left-eye image constitute the three-dimensional image, and
the depth distortion rate is a ratio of a distance of the image point from the display surface in the stereoscopic image space to an original distance of the image point from the display surface in the stereoscopic image space without the depth distortion.

4. The surgical image display system according to claim 3, wherein the depth distortion information further includes information representing a plurality of depth distortion rates of a plurality of points in the depth direction in the stereoscopic image space.

5. The surgical image display system according to claim 3, wherein
one or more object points of which images are shot as one or more image points are at the same position in the right-eye image and the left-eye image in an image shooting space in which the image of the observation region is shot on a reference plane,
the one or more object points include at least one of a first object point, a second object point, or a third object point,
a distance of the third object point to the reference plane is equal to a distance between the first object point and the second object point on the reference plane, in the stereoscopic image space, and
a distance between the first object point and the second object point is the original distance of the third object point from the display surface.

6. The surgical image display system according to claim 3, wherein
the depth distortion information further includes information representing the depth distortion rate with respect to a viewing distance, and
the viewing distance is a distance from eyes of an observer to the display surface.

7. The surgical image display system according to claim 6, wherein the depth distortion information further includes emphasis on the depth distortion rate corresponding to the viewing distance.

8. The surgical image display system according to claim 3, wherein
the depth distortion information further includes information that indicates an optimal viewing distance, and
the optimal viewing distance is a viewing distance at which the depth distortion rate approaches 1 in the stereoscopic image space on the display surface from each of a back side of the display surface and a front side of the display surface.

9. The surgical image display system according to claim 3, further comprising an attention target designation unit configured to designate an area in the three-dimensional image as an attention target, wherein the depth distortion information includes the depth distortion rate in a case where a distance corresponding to a size of the area of the attention target is the original distance from the display surface.

10. The surgical image display system according to claim 3, further comprising:
an attention target designation unit configured to designate a position of an attention target in the three-dimensional image; and
an attention target setting unit configured to set, on the three-dimensional image, an area of an organ of the living body at the designated position, wherein
the depth distortion information includes information representing the depth distortion rate in a case where a distance of the position of the attention target from the attention target designation unit is the original distance to the display surface, and
the distance corresponds to a size of the area of the organ.

11. The surgical image display system according to claim 1, wherein
the depth distortion information further includes information representing a shape of a perfect circle deformed by the depth distortion, and
the perfect circle represents the stereoscopic image space without the depth distortion.

12. The surgical image display system according to claim 1, wherein
the depth distortion information generation unit is further configured to generate the depth distortion information, in an image shooting space on a reference plane, based on each of:
a working distance from the image shooting unit to the reference plane in the stereoscopic image space,
a base length that is a distance between the two viewpoints of the image shooting unit,
a diagonal view angle size that is a diagonal length of an image shooting range on the reference plane of the image shooting unit,
a pupillary distance of an observer who views the three-dimensional image stereoscopically,
a viewing distance that is a distance from eyes of the observer to a display surface, and
a diagonal screen size that is a diagonal length of the three-dimensional image displayed on the display surface,
the depth distortion information is generated corresponding to an object point of which image shot, on the reference plane, as an image point is at a same position in each of a right-eye image and a left-eye image, and
the image point is reproduced on the display surface within the stereoscopic image space.

13. The surgical image display system according to claim 1, further comprising a depth distortion information generation unit configured to generate depth distortion information.

14. The surgical image display system according to claim 1, further comprising:
a three-dimensional display unit configured to:
display, provided that an image point is at a same position in a right-eye image and a left-eye image, the output image, wherein
the right-eye image and the left-eye image constitute the three-dimensional image a display surface, and
the output image is stereoscopically viewable, and
change a viewing distance based on an external signal, wherein
the external signal indicates a position of the display surface in a depth direction in the stereoscopic image space, and
the viewing distance being is a distance from eyes of an observer to the display surface; and
a viewing distance control unit configured to:
set the viewing distance based on the external signal; and
set the viewing distance in the three-dimensional display unit to WD0·E/E0, in an image shooting space in which the image of the observation region is shot on a reference plane, based on each of:
a working distance WD0 of the image shooting unit to the reference plane in the stereoscopic image space,
a base length 2·E0 that is a distance between the two viewpoints of the image shooting unit, and
a pupillary distance 2·E of the observer stereoscopically viewing the three-dimensional image, wherein the viewing distance is set in the three-dimensional display unit to WD0·E/E0 in a case where a position of an object point of which image shot as the image point is at a same position in the right-eye image and the left-eye image on the reference plane.

15. The surgical image display system according to claim 1, further comprising:
an image shooting condition control unit configured to:
control, provided that an object point of which image shot as an image point is at a same position in a right-eye image and a left-eye image, at least two elements, from a plurality of elements, in an image shooting space, wherein
the right-eye image and the left-eye image constitute the three-dimensional image in the image shooting space on a reference plane in the image shooting space, wherein the plurality of elements includes:
a working distance WD0 from the image shooting unit to the reference plane in the stereoscopic image space,
a base length 2·E0 that is a distance between the two viewpoints of the image shooting unit, and
a diagonal screen size that is a diagonal length of an image shooting range on the reference plane of the image shooting unit; and
an operation unit configured to designate, provided that the image point is at a same position in the right-eye image and the left-eye image, an enlargement magnification of the three-dimensional image, wherein
the three-dimensional image is reproduced in the stereoscopic image space on a display surface,
the enlargement magnification of the three-dimensional image is based on each of:
a pupillary distance 2·E of an observer who views the three-dimensional image stereoscopically,
a viewing distance that is a distance from eyes of the observer to the display surface,
a diagonal view angle size that is a diagonal length of the three-dimensional image on the display surface, and
an element from the plurality of elements other than a control target among the working distance, the base length, and the diagonal screen size;
the image shooting condition control unit is configured to control the control target to the enlargement magnification of the three-dimensional image on the display surface and to the viewing distance of WD0·E/E0 with respect to the working distance WD0, the base length 2·E0, and the pupillary distance 2·E.

16. An image processing device, comprising:
a depth distortion information generation unit configured to generate depth distortion information that indicates a magnitude of difference between a stereoscopic image of a three-dimensional image of a surgical point and a depth direction of a physical three-dimensional space of the surgical point; and
an output image generation unit configured to generate an output image and the depth distortion information, wherein
the output image presents the three-dimensional image, and
the three-dimensional image is obtained based on an image of a surgical point obtained from two different viewpoints.

17. An image processing system, comprising:
an image shooting unit configured to:
shoot an image of an observation region of a living body from two viewpoints;
acquire a three-dimensional image of the observation region; and reproduce, based on the three-dimensional image, a stereoscopic image of the observation region;

a depth distortion information generation unit configured to generate depth distortion information that indicates a magnitude of depth distortion in a depth direction of a stereoscopic image space, wherein the stereoscopic image of the observation region is reproduced in the stereoscopic image space, the depth distortion information includes information representing a depth distortion rate at a position at which an image point is at a same position in a right-eye image and a left-eye image on a display surface in the stereoscopic image space, the right-eye image and the left-eye image constitute the three-dimensional image, and the depth distortion rate is a ratio of a distance of the image point from the display surface in the stereoscopic image space to an original distance of the image point from the display surface in the stereoscopic image space without the depth distortion; and an output image generation unit configured to generate an output image that presents the three-dimensional image and the depth distortion information.

* * * * *